(12) United States Patent
Shiroto et al.

(10) Patent No.: US 8,792,319 B2
(45) Date of Patent: *Jul. 29, 2014

(54) RECORDING MEDIUM

(71) Applicants: Pioneer Corporation, Kanagawa (JP); Memory-Tech Holding Inc., Tokyo (JP); Pioneer Digital Design and Manufacturing Corporation, Kanagawa (JP)

(72) Inventors: Takuya Shiroto, Kanagawa (JP); Masayoshi Yoshida, Kanagawa (JP); Hideki Kobayashi, Kanagawa (JP); Masakazu Ogasawara, Kanagawa (JP); Takao Tagiri, Kanagawa (JP); Makoto Suzuki, Ibaraki (JP)

(73) Assignees: Pioneer Corporation, Kanagawa (JP); Memory-Tech Holdings Inc., Tokyo (JP); Pioneer Digital Design and Manufacturing Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,601

(22) Filed: May 29, 2013

(65) Prior Publication Data
US 2013/0322227 A1 Dec. 5, 2013

(30) Foreign Application Priority Data
May 29, 2012 (JP) .................................. 2012-122413

(51) Int. Cl.
*G11B 7/24* (2013.01)

(52) U.S. Cl.
USPC .......................... 369/275.3; 369/283; 369/286

(58) Field of Classification Search
USPC ........... 369/275.1–275.4, 283–286, 277–279, 369/30.03, 30.04, 30.1, 30.18, 30.25, 44.26, 369/44.27, 44.37, 94, 100
See application file for complete search history.

(56) References Cited

U.S. PATENT DOCUMENTS

| | | | |
|---|---|---|---|
| 5,434,836 A | 7/1995 | Kuribayashi et al. | |
| 5,646,932 A | 7/1997 | Kuribayashi et al. | |
| 6,987,714 B2 | 1/2006 | Watabe et al. | |
| 2002/0154584 A1 | 10/2002 | Watabe et al. | |
| 2012/0002519 A1* | 1/2012 | Horigome .................. | 369/44.39 |
| 2013/0188469 A1* | 7/2013 | Yoshida et al. ............ | 369/275.4 |

FOREIGN PATENT DOCUMENTS

| | | |
|---|---|---|
| JP | H08-045080 | 2/1996 |
| JP | H08-279160 | 10/1996 |
| JP | H10-308037 | 11/1998 |
| JP | 3205154 | 6/2001 |
| JP | 2003-323725 | 11/2003 |
| JP | 2004-178781 | 6/2004 |

(Continued)

*Primary Examiner* — Ali Neyzari
(74) *Attorney, Agent, or Firm* — Young & Thompson

(57) ABSTRACT

A recording medium is provided with: a guide layer on which a guide track or guide tracks are formed; and recording layers, wherein (i) an information mark group and (ii) a distinctive mark group are formed in the guide layer, the information mark group being formed on each of a plurality of guide tracks, the distinctive mark group distinguishing a center track out of the plurality of guide tracks on each of which the information mark group is formed, the distinctive mark group including a pair of distinctive record marks which are shifted toward a right side and a left side, respectively, from a track center of the center track, a width of each distinctive record mark is twice or more a width of the guide track.

10 Claims, 25 Drawing Sheets

(56) References Cited

FOREIGN PATENT DOCUMENTS

| | | |
|---|---|---|
| JP | 3665588 | 4/2005 |
| JP | 3693813 | 7/2005 |
| JP | 3729467 | 10/2005 |
| JP | 3744944 | 12/2005 |
| JP | 4037034 | 11/2007 |

* cited by examiner

Synchronous data

Bit data (Bit 0)

Bit data (Bit 1)

RECORDING MEDIUM

CROSS-REFERENCE TO RELATED APPLICATIONS

This application is based upon and claims the benefit of priority of the prior Japanese Patent Application No. 2012-122413, file on May 29, 2012, the entire contents of which are incorporated herein by reference.

FIELD

The present invention relates to a recording medium, such as, for example, an optical disc provided with many recording layers.

BACKGROUND

As the recording medium provided with many recording layers, for example, there is known a recording medium having a plurality of recording layers, each of which is actually a target for at least one of a recording operation and a reproduction operation, and a guide layer on which a guide track or guide tracks for tracking are formed (e.g. a so-called guide layer separation type optical disc) (refer to Patent document 1). A recording/reproducing apparatus for performing at least one of the recording operation and the reproduction operation on such a recording medium irradiates guide laser light and recording/reproduction laser light. The guide laser light is light for reading the guide track(s) in the guide layer. The recording/reproduction laser light is light for performing at least one of the recording operation and the reproduction operation on the recording layer. The recording/reproducing apparatus performs at least one of the recording operation and the reproduction operation by irradiating the recording layer with the recording/reproduction laser light while performing tracking control on the basis of a push-pull signal obtained from return light of the guide laser light.

Incidentally, Patent document 2 to Patent document 11 can be listed as background art documents related to the present invention described later, although they do not disclose the guide layer separation type optical disc.

Patent document 1: Japanese Patent No. 4037034
Patent document 2: Japanese Patent Application Laid Open No. Hei 10-308037
Patent document 3: Japanese Patent No. 3729467
Patent document 4: Japanese Patent No. 3665588
Patent document 5: Japanese Patent No. 3744944
Patent document 6: Japanese Patent Application Laid Open No. 2003-323725
Patent document 7: Japanese Patent Application Laid Open No. 2004-178781
Patent document 8: Japanese Patent Application Laid Open No. Hei 8-279160
Patent document 9: Japanese Patent Application Laid Open No. Hei 8-45080
Patent document 10: Japanese Patent No. 3205154
Patent document 11: Japanese Patent No. 3693813

SUMMARY

By the way, the recording medium as described above is requested to record some data (e.g. data indicating pre-format information, such as address information, clock information, recording start timing information, etc.) in the guide layer in advance. In this case, what is supposed as one example is a method of recording the data into the guide layer by forming a combination of record marks and record spaces in the guide layer, as in a combination of record marks and record spaces formed in the recording layer.

However, in the case where the data is recorded into the guide layer by forming the combination of the record marks and the record spaces in the guide layer, the recording/reproducing apparatus needs to obtain, from the return light of the guide laser light, not only the push-pull signal for tracking but also a RF signal (a so-called sum signal) for reading the data. However, the simultaneous obtainment of both the push-pull signal and the RF signal causes such a technical problem that it likely has some influence on the accuracy of the obtainment of the push-pull signal, because characteristics of the push-pull signal is different from those of the RF signal. In other words, the simultaneous obtainment of both the push-pull signal and the RF signal causes such a technical problem that it has some influence on the tracking control, which is an intended and primary purpose of the guide layer.

Thus, although it is still unknown at the time of filing of this application, the present inventors has developed such a technology that the same information mark group is formed on each of the plurality of guide tracks in the guide layer, the same information mark group includes a pair of record marks which are equidistantly shifted toward a left side and a right side, respectively, from a track center of each guide track (e.g. refer to Japanese Patent Application No. 2012-010085). In this technology, however, since the same information mark group is formed on each of the plurality of guide tracks, one information mark group, which is formed on each of a plurality of guide tracks whose center track is one guide track, is also formed on another guide track which is adjacent to the one guide track. Therefore, although the one information mark group is supposed to be read by the guide laser light whose spot center originally matches the one guide track, the one information mark group is likely read by the guide laser light whose spot center matches the another guide track. At this time, for example, if the information mark group indicates address information, that likely causes erroneous detection of the address information. In other words, the recording/reproducing apparatus which has read the one information mark group by using the guide laser light whose spot center matches the another guide track likely misrecognizes that the another guide track is the one guide track. In view of such circumstances, it is preferable that the center track located near the center out of the plurality of guide tracks is preferably distinguished in order to preferably read the information mark groups formed in the guide layer. In other words, if the center track is preferably distinguished, the one information mark group, which is formed on each of the plurality of guide tracks whose center track is the one guide track, can be preferably read by using the guide laser light whose spot center matches the one guide track. In other words, the preferable distinction of the center track prevent technical disadvantages (e.g. the aforementioned erroneous detection of the address information) based on that the one information mark group, which is formed on each of the plurality of guide tracks whose center track is the one guide track, is read by using the guide laser light whose spot center matches the another guide track than the one guide track.

It is therefore an object of the present invention to provide a recording medium capable of preferably distinguishing the center track located near the center from the plurality of guide tracks on which the information mark group is formed, in order to preferably read the information mark group recorded on each of the plurality of guide tracks in the guide layer, in the optical disc provided with many recording layers described above.

This application discloses a recording medium which is provided with: a guide layer on which a guide track or guide tracks for tracking are formed; and a plurality of recording layers laminated on the guide layer, an information mark group being formed in the guide layer, the information mark group being formed on each of a plurality of guide tracks which are adjacent to one another, an distinctive mark group being formed in the guide layer, the distinctive mark group distinguishing a center track which is a guide track located near a center out of the plurality of guide tracks on each of which the information mark group is formed, the distinctive mark group including a pair of distinctive record marks which are shifted by a predetermined distance toward a right side and a left side, respectively, from a track center of the center track, a width of each distinctive record mark is twice or more a width of the guide track.

The nature, utility, and further features of this invention will be more clearly apparent from the following detailed description with reference to a preferred embodiment of the invention when read in conjunction with the accompanying drawings briefly described below.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Figure 1:
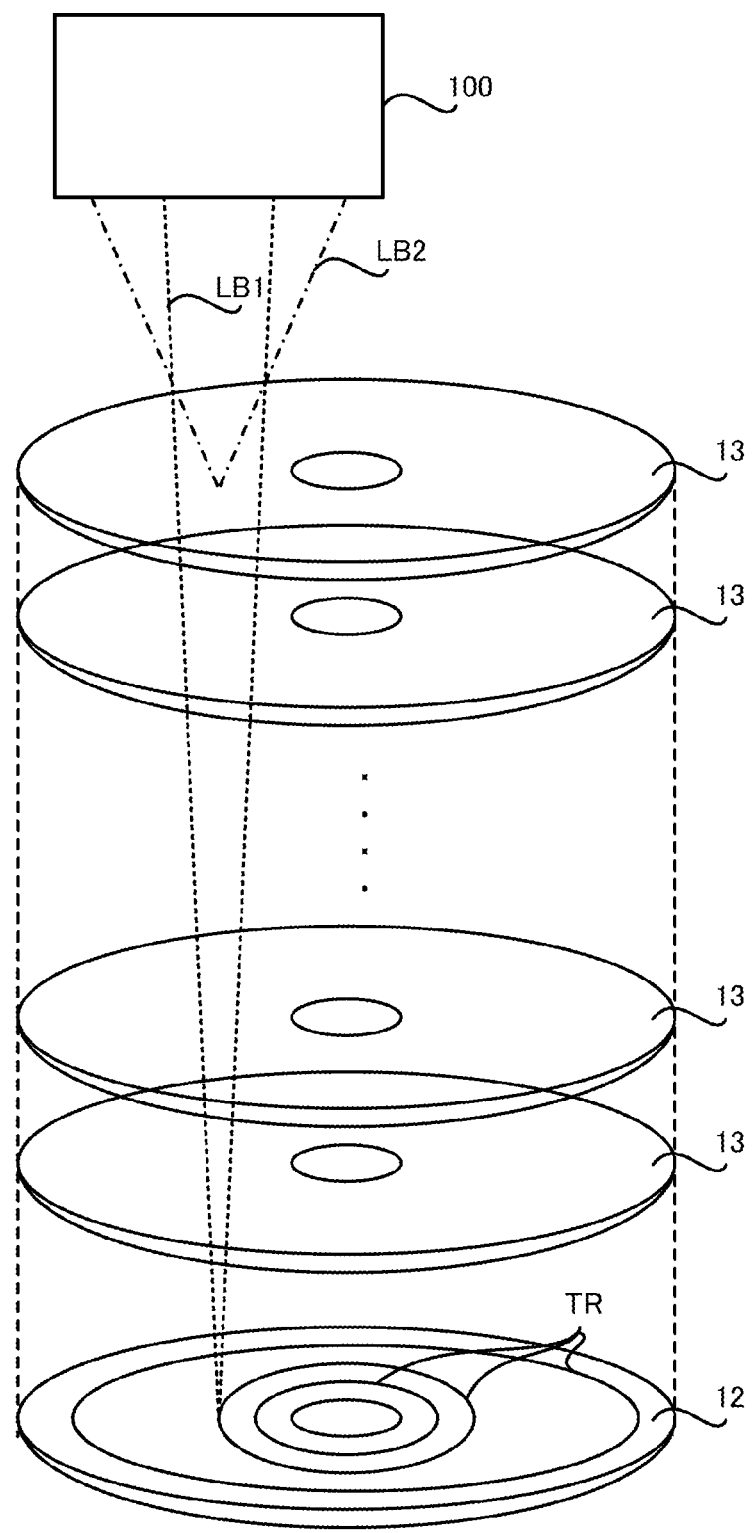
FIG. 1 is a schematic perspective view in which visualization of each layer is facilitated by spacing out a plurality of layers which constitute one optical disc, in lamination direction thereof (in a vertical direction in FIG. 1)

Hereinafter, an embodiment of the recording medium will be explained in order.

<1> The embodiment of the recording medium is provided with: a guide layer on which a guide track or guide tracks for tracking are formed; and a plurality of recording layers laminated on the guide layer, an information mark group being formed in the guide layer, the information mark group being formed on each of a plurality of guide tracks which are adjacent to one another, an distinctive mark group being formed in the guide layer, the distinctive mark group distinguishing a center track which is a guide track located near a center out of the plurality of guide tracks on each of which the information mark group is formed, the distinctive mark group including a pair of distinctive record marks which are shifted by a predetermined distance toward a right side and a left side, respectively, from a track center of the center track, a width of each distinctive record mark is twice or more a width of the guide track.

According to the recording medium in the embodiment, it is provided with the guide layer and the plurality of recording layers. In the guide layer, the guide track or guide tracks for tracking are formed. Thus, a recording/reproducing apparatus for performing at least one of a recording operation and a reproduction operation on the recording medium (more specifically, on the plurality of recording layers provided for the recording medium) can obtain a push-pull signal according to a positional relation between the guide track(s) and the beam spot of the guide laser light on the basis of return light of the guide laser light irradiated onto the guide layer (i.e. guide laser light reflected by the guide layer). As a result, the recording/reproducing apparatus can perform tracking control on the basis of the push-pull signal.

In the embodiment, the information mark group and the distinctive mark group are formed in the guide layer.

The information mark group is a mark group formed in the guide layer in order to record predetermined bit data (e.g. bit data indicating pre-format information, such as address information, clock information, recording start timing information, etc.) in the guide layer. The information mark group is formed on each of the plurality of guide tracks adjacent to one another. In other words, in the embodiment, the same information mark group is formed on each of the plurality of guide tracks adjacent to one another. More specifically, for example, one information mark group is formed on each of a plurality of guide tracks in which one guide track is located near the center (i.e. in which the one guide track is the center track). On the other hand, another information mark group which is different from the one information mark group is formed on each of a plurality of guide tracks in which another guide track which is different from the one guide track is located near the center (i.e. in which the another guide track is the center track). As a result, by assigning different bit data to different information mark groups, it is possible to record the bit data into the guide layer by using the different information mark groups.

The distinctive mark group is a mark group for distinguishing the center track, which is the guide track located near the center (in other words, closest to the center) out of the plurality of guide tracks on each of which the same information mark group is formed. The distinctive mark group may include only one pair of distinctive record marks, or may include a plurality of pairs of distinctive record marks. The pair of distinctive record marks are shifted by the predetermined distance toward the left side and the right side, respectively, from the track center of the center track. In other words, the pair of distinctive record marks is a pair of record marks including a record mark shifted by the predetermined distance to the left side from the track center of the center track and a record mark shifted by the predetermined distance toward the right side from the track center of the center track. In addition, the width (i.e. a length in a direction perpendicular to an extending direction of the guide track and a length in a direction along a radial direction of the recording medium) of each distinctive record mark is twice or more the width of the guide track. In other words, each distinctive record mark is formed to be distributed over two or more guide tracks.

Incidentally, not all the pairs of the distinctive record marks included in the distinctive mark group may be shifted by the same distance from the track center of the center track.

Incidentally, the distinctive mark group may include a pair of first distinctive record marks which are shifted by a first distance toward the left side and the right side, respectively, from the track center of the center track and a pair of second distinctive record marks which are shifted by a second distance (which is different from the first distance) toward the left side and the right side, respectively, from the track center of the center track. Of course, the distinctive mark group may include a pair of first distinctive record marks which are shifted by the first distance toward the left side and the right side, respectively, from the track center of the center track and a pair of second distinctive record marks which are shifted by the first distance toward the left side and the right side, respectively, from the track center of the center track.

Moreover, the distinctive mark group is preferably formed to make a pair with the same information mark group(s). In this case, for example, if a plurality of different information mark groups are formed on respective plurality of guide tracks including a certain guide track as the center track, a plurality of distinctive mark groups corresponding to the respective different information mark groups may be formed. Specifically, for example, a first distinctive mark group including a pair of first distinctive record marks which are shifted by a predetermine distance to the left side and the right side, respectively, from the track center of a first guide track, which is the center track, may be formed so as to correspond to the same first information mark group formed on each of a plurality of guide tracks including the first guide track as the center track. On the other hand, a second distinctive mark group including a pair of second distinctive record marks which are shifted by a predetermine distance to the left side and the right side, respectively, from the track center of the first guide track, which is the center track, may be formed so as to correspond to the same second information mark group formed on each of the plurality of guide tracks including the first guide track as the center track. Alternatively, for example, if a plurality of different information marks are formed on respective plurality of guide tracks including a certain guide track as the center track, a single distinctive mark group commonly corresponding to the plurality of different information mark groups may be formed. Specifically, for example, a first distinctive mark group including a pair of first distinctive record marks which are shifted by a predetermine distance to the left side and the right side, respectively, from the track center of a first guide track, which is the center track, may be formed so as to correspond to both the same first information mark group and the same second information mark group formed on each of a plurality of guide tracks including the first guide track as the center track.

According to the recording medium in the embodiment in which the distinctive mark group as described above is formed, it has the following advantages.

Firstly, according to the embodiment, the distinctive mark group formed in the guide layer is the mark group including the pair of distinctive record marks which are shifted by the predetermined distance toward the left side and the right side, respectively, from the track center of the center track. Thus, even if the distinctive mark group is formed in the guide layer, an average value of a variation in a signal level of the push-pull signal which can be influenced by the distinctive mark group is zero (including, however, a margin small enough to be considered substantially zero). Therefore, the presence of the distinctive mark group hardly has or does not have an adverse influence on the tracking control based on the push-pull signal. Therefore, the recording/reproducing apparatus can perform at least one of the recording operation and the reproduction operation on the plurality of recording layers while performing the preferable tracking control.

On the other hand, in accordance with a difference of a combination of the pairs of distinctive record marks which constitute the distinctive mark group, it is possible to distinguish the center track of the plurality of guide tracks on each of which the same information mark group is formed. The difference of the combination of the pairs of distinctive record marks can be easily read by monitoring a change in an instantaneous value of the variation of the signal level of the push-pull signal. Therefore, according to the embodiment, it is possible to form in the guide layer the distinctive record marks that can be read by using the push-pull signal. In other words, according to the embodiment, it is possible to form in the guide layer the distinctive record marks that do not have to be read by using a RF signal (i.e. a sum signal). Therefore, the recording/reproducing apparatus can distinguish the center track from the plurality of guide tracks on each of which the same information mark group is formed, on the basis of the push-pull signal. As a result, the recording/reproducing apparatus can perform at least one of the recording operation and the reproduction operation on the plurality of recording layers, while preferably reading the bit data according to the information mark group formed in advance in the guide layer.

If the center track cannot be distinguished from the plurality of guide tracks on each of which the same information mark group is formed, the following technical problem occurs. Specifically, in the embodiment, since the same information mark group is formed on each of the plurality of guide tracks, one information mark group formed on each of the plurality of guide tracks including one guide track as the center track is also formed on another guide track adjacent to the one guide track. Therefore, although the one information mark group is supposed to be read by using the guide laser light whose spot center matches the one guide track, there is a possibility that the one information mark group is read by using the guide laser light whose spot center matches the another guide track. At this time, for example, if the information mark group indicates address information, that likely causes the erroneous detection of the address information. In other words, the recording/reproducing apparatus which has read the one information mark group by using the guide laser light whose spot center matches the another guide track likely misrecognizes that the another guide track is the one guide track. In the embodiment, however, the center track can be distinguished from the plurality of guide tracks on each of which the same information mark group is formed. In other words, the recording/reproducing apparatus can determine whether or not the currently traced guide track is the center track. This almost or completely eliminates the possibility that the one information mark group formed on each of the plurality of guide tracks including the one guide track as the center track is read by using the guide laser light whose spot center matches the another guide track. This almost or completely eliminates the possibility of the occurrence of the abovementioned technical problem.

In addition, according to the embodiment, the width of each distinctive record mark is twice or more the width of the guide track. Therefore, the recording/reproducing apparatus can distinguish the center track in accordance with the distinctive mark group without any influence of a deviation of a focus offset (so-called defocus) of the guide laser light.

As described above, according to the embodiment, in order to preferably read the information mark group recorded on each of the plurality of guide tracks in the guide layer, it is possible to preferably distinguish the center track located near the center out of the plurality of guide tracks on each of which the information mark group is formed.

<2> In another aspect of the embodiment of the recording medium, the distinctive mark group includes at least one of (i) the pair of distinctive record marks formed in a same rotational phase position and (ii) the pair of distinctive record marks formed in different rotational phase positions.

According to this aspect, the pair of distinctive record marks may be a pair of record marks which includes a record mark shifted by the predetermined distance to the left side from the track center of the center track and a record mark shifted by the predetermined distance toward the right side from the track center of the center track and which is formed in the same rotational phase position. Alternatively, the pair of distinctive record marks may be a pair of record marks which includes a record mark shifted by the predetermined distance to the left side from the track center of the center track and formed in a first rotational phase position and a record mark shifted by the predetermined distance toward the right side from the track center of the center track and formed in a second rotational phase position different from the first rotational phase position.

<3> In an aspect of the embodiment of the recording medium in which the distinctive mark group includes the pair of distinctive record marks formed in the same rotational phase position, the pair of distinctive record marks formed in the same rotational phase position is formed (i) such that a signal level of a push-pull signal obtained by irradiating the pair of distinctive record marks with guide laser light, whose spot center matches the center track, has an absolute value which is less than or equal to a first threshold and (ii) such that a signal level of a push-pull signal obtained by irradiating the pair of distinctive record marks with the guide laser light, whose spot center matches another guide track than the center track out of the plurality of guide tracks on each of which the information mark group is formed, has an absolute value which is greater than the first threshold.

According to this aspect, the recording/reproducing apparatus can preferably distinguish the center track, by monitoring the signal level of the push-pull signal obtained from the pair of distinctive record marks formed in the same rotational phase position.

Specifically, in this aspect, the pair of distinctive record marks, which are shifted by the predetermined distance toward the left side and the right side, respectively, from the track center of the center track, is formed in the same rotational phase position. Therefore, if the pair of distinctive record marks is irradiated with the guide laser light whose spot center matches the center track, a distribution aspect of the pair of distinctive record marks is bilaterally symmetrical (or comes close to a state of bilateral symmetry) about the spot center. Thus, the signal level of the push-pull signal relatively decreases (e.g. approaches zero). On the other hand, if the pair of distinctive record marks is irradiated with the guide laser light whose spot center matches the guide track other than the center track, the distribution aspect of the pair of distinctive record marks is no longer bilaterally symmetrical (or moves away from the state of bilateral symmetry) about the spot center. Thus, the signal level of the push-pull signal relatively increases. In other words, if the signal level of the push-pull signal obtained in a state in which a certain guide track is irradiated with the guide laser light has an absolute value which is less than or equal to the first threshold (or is less than the first threshold), it is determined that the guide track is highly likely the center track. On the other hand, if the signal level of the push-pull signal obtained in the state in which the certain guide track is irradiated with the guide laser light has an absolute value which is greater than the first threshold (or is greater than or equal to the first threshold), it is determined that the guide track is highly likely not the center track.

<4> In an aspect of the embodiment of the recording medium in which the distinctive mark group includes the pair of distinctive record marks formed in the different rotational phase position, the pair of distinctive record marks formed in the different rotational phase positions is formed such that the signal level of the push-pull signal obtained by irradiating the pair of distinctive record marks with the guide laser light, whose spot center matches the center track has an absolute value which is greater than a first threshold.

According to this aspect, the recording/reproducing apparatus can preferably distinguish the center track by monitoring the signal level of the push-pull signal obtained from the pair of distinctive record marks formed in the different rotational phase positions.

Specifically, in this aspect, the pair of distinctive record marks which are shifted by the predetermined distance toward the left side and the right side, respectively, from the track center of the center track is formed in the different rotational phase positions. Therefore, if the pair of distinctive record marks is irradiated with the guide laser light whose spot center matches the center track, the distribution aspect of the pair of distinctive record marks is not bilaterally symmetrical (or moves away from the state of bilateral symmetry) about the spot center. Thus, the signal level of the push-pull signal relatively increases. In other words, if the signal level of the push-pull signal obtained in a state in which a certain guide track is irradiated with the guide laser light has an absolute value which is greater than the first threshold, it is determined that the guide track is highly likely the center track.

<5> In another aspect of the embodiment of the recording medium, the distinctive mark group is formed such that there are (i) two or more first areas, (ii) two or more second areas, or (iii) one or more first areas and one or more second areas, in each of the plurality of guide tracks on which the distinctive mark group is formed, the first area is an area in which a signal level of a push-pull signal obtained by irradiating guide laser light, whose spot center matches each of the guide tracks, has an absolute value which is greater than a first threshold, the second area is an area in which the signal level of the push-pull signal obtained by irradiating the guide laser light, whose spot center matches each of the guide tracks, has an absolute value which is less than or equal to a second threshold which is less than the first threshold.

According to this aspect, as detailed later by using the drawings, the recording/reproducing apparatus can distinguish the center track, preferably, from the plurality of guide tracks on each of which the same information mark group is formed, in accordance with the difference of the combination of the pairs of distinctive record marks which constitute the distinctive mark group.

<6> In another aspect of the embodiment of the recording medium, the width of each distinctive record mark is half or more a width of a beam spot formed on the guide layer by guide laser light irradiated on the guide layer.

According to this aspect, the width of each distinctive record mark is half or more the width of the beam spot. Therefore, the recording/reproducing apparatus can distinguish the center track in accordance with the distinctive record marks without any influence of the deviation of the focus offset (so-called defocus) of the guide laser light.

Incidentally, the "width of the beam spot" herein in effect allows a margin; i.e., it indicates that the width of the beam spot can vary depending on a state of the focus offset (e.g. an amount of the focus offset).

<7> In another aspect of the embodiment of the recording medium, the guide tracks include groove tracks and land tracks alternately formed, the distinctive mark group includes, as a distinctive mark group for distinguishing a groove center track located near a center out of a plurality of groove tracks on each of which the information mark group is formed, A pair of groove distinctive record marks which are shifted by a predetermined distance toward a right side and a left side, respectively, from a track center of the groove center track, a width of each groove distinctive record mark is twice or more a width of the groove track, And the distinctive mark group includes, as a distinctive mark group for distinguishing a land center track located near a center out of a plurality of land tracks on each of which the information mark group is formed, a pair of land distinctive record marks which are shifted by a predetermined distance toward a right side and a left side, respectively, from a track center of the land center track, a width of each land distinctive record mark is twice or more a width of the land track.

According to this aspect, both the distinctive mark group corresponding to the groove tracks and the distinctive mark group corresponding to the land tracks are formed. Therefore, if the groove tracks are irradiated with the guide laser light, the recording/reproducing apparatus can distinguish the groove center track, preferably, from the plurality of groove tracks on each of which the same information mark group is formed, in accordance with the difference of the combination of the pairs of groove distinctive record marks which constitute the distinctive mark group. In the same manner, if the land tracks are irradiated with the guide laser light, the recording/reproducing apparatus can distinguish the land center track, preferably, from the plurality of land tracks on each of which the same information mark group is formed, in accordance with the difference of the combination of the pairs of land distinctive record marks which constitute the distinctive mark group.

<8> In another aspect of the embodiment of the recording medium, the information mark group is formed in the guide layer such that the same information mark group is formed in a same rotational phase position of each of at least two guide tracks out of a plurality of guide tracks included in a beam spot formed on the guide layer by guide laser light irradiated on the guide layer, the same information mark group including a pair of information record marks which are shifted by a predetermined distance toward a right side and a left side, respectively, from a track center of the each guide track.

According to this aspect, the information mark group is formed in the same rotational phase position of each of at least two guide tracks out of the plurality of guide tracks which are included in the beam spot which is formed on the guide layer by guide laser light. In other words, the same information mark group indicating the same bit data (e.g. bit data indicating 1 bit to several bits or dozen bits) is formed in each of the at least two guide tracks out of the plurality of guide tracks which are included in the beam spot of the guide laser light such that same information mark groups are adjacent to one another along a direction perpendicular to an extending direction of the guide tracks. At this time, the information mark group is formed in each of the at least two guide tracks out of the plurality of guide tracks which are included in the beam spot which is formed by the guide laser light on the guide layer. In other words, the number of the guide tracks on each of which the same information mark group is formed is less than or equal to the number of the guide tracks which are included in the beam spot of the guide laser light and is greater than or equal to 2.

Moreover, the information mark group formed in the same rotational phase position of each of the at least two guide tracks is the mark group including the pair of information record marks which are shifted by the predetermined distance toward the left side and the right side, respectively, from the track center of the guide track. In other words, the information mark group is a mark group including in an arbitrary aspect one or more pairs of information record marks, each pair including a record mark shifted by the predetermined distance to the left side from the track center and a record mark shifted by the predetermined distance toward the right side from the track center. As such a pair of information record marks, there can be listed as one example: a pair of information record marks in which the record mark shifted by the predetermined distance to the left side from the track center and the record mark shifted by the predetermined distance toward the right side from the track center are arranged in this order along the extending direction of the guide track; and a pair of information record marks in which the record mark shifted by the predetermined distance toward the right side from the track center and the record mark shifted by the predetermined distance to the left side from the track center are arranged in this order along the extending direction of the guide track. Therefore, the information mark group may be a mark group including only one pair of information record marks (i.e. a mark group which corresponds to one pair of information record marks), or a mark group obtained by combining one or more pairs of information record marks as described above in an arbitrary aspect. Alternatively, the information mark group may be a mark group obtained by combining one or more pairs of information record marks as described above with another record mark (e.g. a record mark located on the track center) in an arbitrary aspect.

A more specific configuration will be exemplified and explained. For example, it is assumed that the beam spot of the guide laser light includes three guide tracks. In this case, the same information mark group is formed in the same rotational phase position of each of at least two guide tracks out of the k-th guide track (where k is an integer of 1 or more), the (k+1)-th guide track and the (k+2)-th guide track. For example, the same information mark group is formed in a position of the k-th guide track at which the rotational phase position is x degrees (where x is a real number satisfying 0≤x≤360) and a position of the (k+2)-th guide track at which the rotational phase position is x degrees. More specifically, for example, an information mark group may be formed in a position of the first guide track at which the rotational phase position is 10 degrees and a position of the third guide track at which the rotational phase position is 10 degrees, wherein the information mark group may include the pair of information record marks in which the record mark shifted by the predetermined distance to the left side from the track center and the record mark shifted by the predetermined distance toward the right side from the track center are arranged in this order along the extending direction of the guide track. On the other hand, for example, an information mark group may be formed in a position of the fourth guide track at which the rotational phase position is 60 degrees and a position of the sixth guide track at which the rotational phase position is 60 degrees, wherein the information mark group may include the pair of information record marks in which the record mark shifted by the predetermined distance toward the right side from the track center and the record mark shifted by the predetermined distance to the left side from the track center are arranged in this order along the extending direction of the guide track.

Incidentally, all the information mark groups formed in the guide layer are not always the mark group including the pair of record marks described above. For example, one portion of the information mark groups formed in the guide layer may be a mark group which is exactly the pair of information record marks described above (or which is a combination of the one or more pairs of information record marks described above), while another portion of the information mark groups formed in the guide layer may be an arbitrary record mark which does not include the pair of information record marks described above.

According to the recording medium in the embodiment in which the information mark group as described above is formed, it has the following advantages.

Firstly, according to the embodiment, the information mark group formed in the guide layer is the mark group including the pair of information record marks which are shifted by the predetermined distance toward the left side and the right side, respectively, from the track center of the guide track. Thus, even if the information mark group as described above is formed in the guide layer, an average value of a variation of a signal level of the push-pull signal, which can be influenced by the information mark group, is zero (including, however, a margin small enough to be considered substantially zero). Therefore, the presence of the information mark group hardly has or does not have an adverse influence on the tracking control based on the push-pull signal. Therefore, the recording/reproducing apparatus can perform at least one of the recording operation and the reproduction operation on the plurality of recording layers while performing the preferable tracking control.

On the other hand, by assigning different bit data to the information mark groups in accordance with a difference of a combination of the pair(s) of information record marks which constitutes the information mark group, the bit data can be recorded onto the guide layer by using the information mark group. The bit data as described above (i.e. a difference of a combination of the pair(s) of information record marks) can be easily read by monitoring a change in an instantaneous value of the variation of the signal level of the push-pull signal. Therefore, according to the embodiment, it is possible to record onto the guide layer the bit data that can be read by using the push-pull signal. In other words, according to the embodiment, it is possible to record, onto the guide layer, the bit data that does not have to be read by using a RF signal (i.e. a sum signal). Therefore, the recording/reproducing apparatus can perform at least one of the recording operation and the reproduction operation on the plurality of recording layers, while preferably reading the bit data according to the information mark group formed in advance in the guide layer, on the basis of the push-pull signal.

In addition, according to the embodiment, the same information mark group is formed in the same rotational phase position of each of the at least two guide tracks out of the plurality of guide tracks which are included in the beam spot of the guide laser light. Therefore, as detailed later by using the drawings, the recording/reproducing apparatus can read the bit data according to the information mark group without any influence of the deviation of the focus offset (so-called defocus) of the guide laser light.

As described above, according to the recording medium in the embodiment, with respect to the guide layer on which the guide track or guide tracks for tracking are formed, it is possible to preferably record data (e.g. the aforementioned bit data, etc.) while suppressing an influence on the tracking control.

<9> In an aspect of the embodiment of the recording medium in which the same information mark group including the pair of information record marks is formed, the same information mark group is formed in the same rotational phase position of each of the plurality of guide tracks.

According to this aspect, the same information mark group is formed in the same rotational phase position of each of the plurality of guide tracks which are included in the beam spot of the guide laser light. In other words, the same information mark group is formed in the same rotational phase positions of all the plurality of guide tracks which are included in the beam spot of the guide laser light. That is, the number of the guide tracks on each of which the same information mark group is formed is substantially equal to the number of the guide tracks which are included in the beam spot of the guide laser light. Incidentally, the expression of "substantially equal" herein in effect includes a state which can be considered substantially equal in view of a margin of the size of the beam spot which can vary depending on a state of the focus offset (e.g. an amount of the focus offset). Therefore, as detailed later by using the drawings, the recording/reproducing apparatus can read the bit data according to the information mark group without any influence of the deviation of the focus offset (so-called defocus) of the guide laser light.

<10> In an aspect of the recording medium in which the same information mark group including the pair of information record marks is formed, the guide tracks include groove tracks and land tracks alternately formed, the information mark group is formed in a same rotational phase position of each of a plurality of groove tracks which are included in the beam spot, the information mark group including a pair of information record marks which are shifted by a predetermined distance toward a right side and a left side, respectively, from a track center of the each groove track, and the information mark group is formed in a same rotational phase position of each of a plurality of land tracks which are included in the beam spot, the information mark group including a pair of information record marks which are shifted by a predetermined distance toward a right side and a left side, respectively, from a track center of the each land track.

According to this aspect, the information mark group is formed on both the groove tracks and the land tracks. Therefore, if the guide laser light is irradiated on either the groove tracks or the land tracks, the bit data according to the information mark group can be read.

The operation and other advantages of the embodiment will become more apparent from examples explained below.

As explained above, the recording medium in the embodiment is provided with the guide layer and the plurality of recording layers, and the information mark group and the distinctive mark group are formed in the guide layer, and the distinctive mark group includes a pair of distinctive record marks. Therefore, in order to preferably read the information mark group recorded on each of the plurality of guide tracks in the guide layer, it is possible to preferably distinguish the center track located near the center out of the plurality of guide tracks on each of which the information mark group is formed.

EXAMPLES

Hereinafter, examples will be explained with reference to the drawings.

(1) Configuration of Optical Disc

Figure 2:
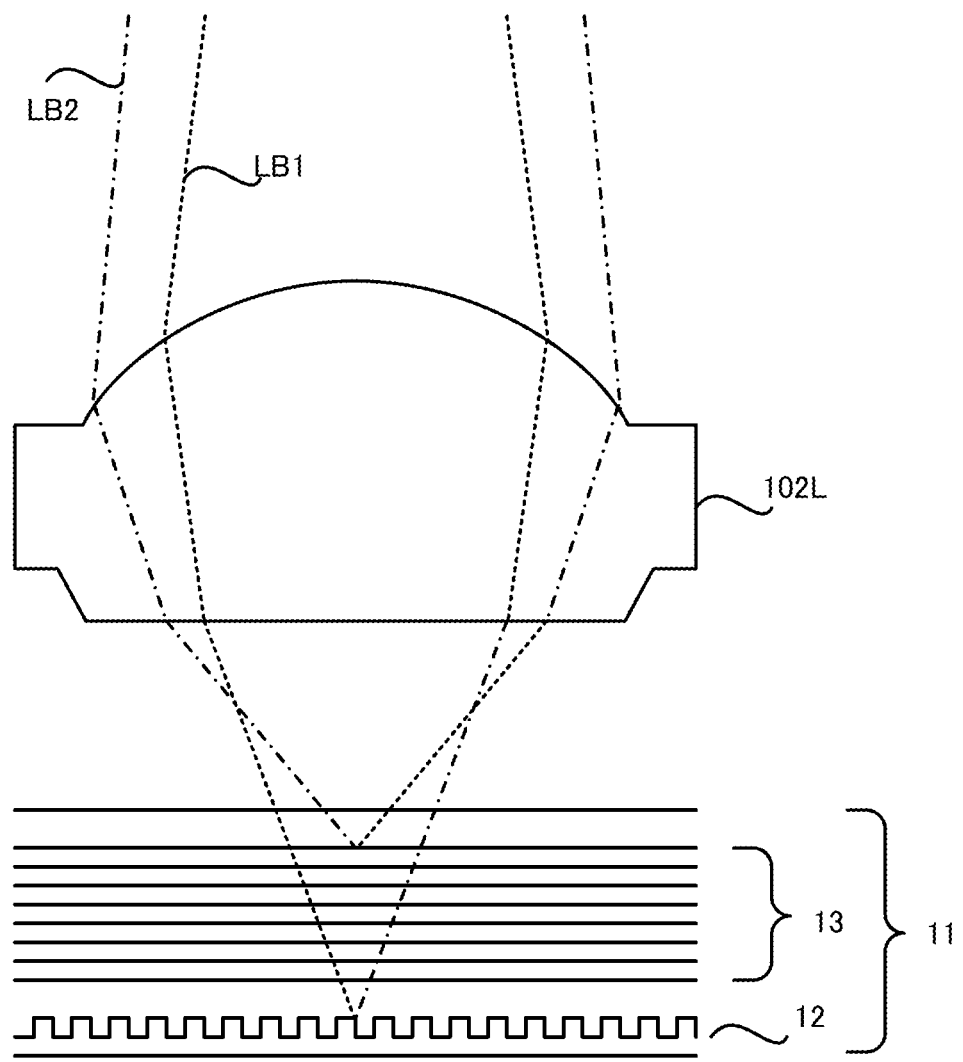
FIG. 2 is a cross sectional view illustrating a cross section of the optical disc, together with aspects of irradiating guide laser light and recording/reproduction laser light.

Firstly, with reference to FIG. 1 and FIG. 2, a configuration of an optical disc 11 will be explained. FIG. 1 is a schematic perspective view in which visualization of each layer is facilitated by spacing out a plurality of layers which constitute one optical disc 11, in lamination direction thereof (in a vertical direction in FIG. 1). FIG. 2 is a cross sectional view illustrating a cross section of the optical disc 11, together with aspects of irradiating guide laser light LB1 and recording/reproduction laser light LB2.

As illustrated in FIG. 1, the optical disc 11 is provided with a single guide layer 12 and a plurality of (i.e. two or more) recording layers 13. In other words, the optical disc 11 is a so-called guide layer separation type optical disc.

When a recording operation for the optical disc 11 (particularly, a recording operation for a desired recording layer 13) is performed, the guide laser light LB1 for tracking, which is focused on the guide layer 12, and the recording/reproduction laser light LB2, which is focused on each of the plurality of recording layers 13, are simultaneously irradiated from a recording/reproduction apparatus 100. On the other hand, when a reproduction operation for the optical disc 11 (particularly, a reproduction operation for a desired recording layer 13) is performed, the guide laser light LB1 and the recording/reproduction laser light LB2 are also simultaneously irradiated from the recording/reproduction apparatus 100. However, when the reproduction operation for the optical disc 11 is performed, the recording/reproduction laser light LB2 may be used for tracking (i.e. the guide laser light LB1 may not be used).

The optical disc 11 preferably adopts a CLV method. On concentric or spiral guide tracks TR (specifically, groove tracks GT and land tracks LT described later), pre-format information (e.g. clock information, address information, recording start timing information, etc.) is recorded in advance in accordance with the CLV method. In the example, the pre-format information as described above is recorded by using information mark group MG1 (refer to FIG. 4 and FIG. 6). The information mark group MG1 includes a pair of information record marks ML1 and MR1 (refer to FIG. 3 and FIG. 5) which are equidistantly shifted toward a right side and a left side, respectively, from a track center. The information mark group MG1 is preferably formed in the guide layer 12 (i.e. the guide tracks TR provided for the guide layer 12) in advance at the time of manufacture of the optical disc 11. Incidentally, the information mark group MG1 including the pair of the information record marks ML1 and MR1 will be described in detail later, with reference to FIG. 3 and the drawings thereafter.

In addition, distinctive mark group MG2 is formed on the guide tracks TR (specifically, groove tracks GT and land tracks LT described later). The distinctive mark group MG2 is for distinguishing a center track CT, which is a guide track TR closest to the center of a plurality of guide tracks TR on which the same information mark groups MG1 are formed. In the example, the distinctive mark group MG2 as described above includes a plurality of pairs of distinctive record marks ML2 and MR2 (refer to FIG. 7 to FIG. 8, and FIG. 10 to FIG. 11) which are equidistantly shifted toward a right side and a left side, respectively, from a track center of the center track CT. The distinctive mark group MG2 is preferably formed in the guide layer 12 (i.e. the guide tracks TR provided for the guide layer 12) in advance at the time of manufacture of the optical disc 11. Incidentally, the distinctive mark group MG2 which includes the pair of distinctive record marks ML2 and MR2 will be described in detail later, with reference to FIG. 3 and the drawings thereafter.

Incidentally, the guide tracks TR formed in the guide layer 12 may be a single spiral. In this case, the groove track GT preferably changes to the land track LT in a predetermined area of the guide layer 12. In the same manner, the land track LT preferably changes to the groove track GT in a predetermined area of the guide layer 12 of the guide layer 12. The guide tracks TR may be double spirals including the groove track GT and the land track LT which are separated.

As illustrated in FIG. 2, the recording/reproduction laser light LB2 is focused on one desired recording layer 13 which is a recording target or a reproduction target, out of the plurality of recording layers 13 laminated on the guide layer 12. The recording/reproduction laser light LB2 is a blue laser beam with a relatively short wavelength, for example, as in a Blu-ray disc (BD). On the other hand, the guide laser light LB1 is a red laser beam with a relatively long wavelength, for example, as in a DVD. The diameter of a beam spot formed on the guide layer 12 by the guide laser light LB1 is, for example, several times as large as the diameter of a beam spot formed on the recording layer 13 by the recording/reproduction laser light LB2.

Each of the plurality of recording layers 13 is a recording layer in which record information can be optically recorded or reproduced, independently. More specifically, each of the plurality of recording layers 13 is made of a semitransparent thin film including a two-photon absorption material. For example, the following materials can be used as the two-photon absorption material: a fluorescent type using a fluorescent material in which fluorescent intensity changes in an area in which two-photon absorption occurs; a refractive-index change type using a photorefractive material in which a refractive index changes due to electron localization; and the like. As the two-photon absorption material of the refractive-index change type, the use of a photochromic compound, a bis(alkylidene)cycloalkanone, or the like is highly expected.

As an optical disc structure using the two-photon absorption material, there are (i) a bulk type in which the entire optical disc 11 is made of the two-photon absorption material and (ii) a layered structure type in which the recording layers 13 made of the two-photon absorption material and spacer layers made of another transparent material are alternately laminated. The layered structure type has the advantage that focus control can be performed by using light reflected on a border between one recording layer 13 and the spacer layer. The bulk type has the advantage that it has less multilayer film formation processes and production costs can be kept low.

Each of the plurality of recording layers 13 may be made of, for example, a dye material or the like, in addition to the two-photon absorption material and the phase-change material described above. In each of the plurality of recording layers 13, the guide tracks TR are not formed in advance in an unrecorded state, and for example, the entire area is a mirror surface or a smooth plane.

Incidentally, in the explanation below, it is assumed that the groove tracks GT and the land tracks LT have a straight structure, for convenience of explanation. The groove tracks GT and the land tracks LT, however, may be wobbled, as occasion demands. For example, each of the groove tracks GT or the lands tracks LT may be formed by that a reflective film, which is made of, for example, a photorefractive material, is formed on a transparent film, which is a base material with uneven grooves formed, and that the reflective film is further buried under a transparent or opaque film, which is a protective film. The side walls of the groove tracks GT and the land tracks LT as described above may be wobbled.

(2) Configurations of Information Mark Group and Distinctive Mark Group Formed on Guide Layer Next, with reference to FIG. 3 to FIG. 12, an explanation will be given to configurations of the information mark group MG1 (i.e. the information mark group MG1 including the pair of information record marks ML1 and MR1 which are equidistantly shifted toward the left side and the right side, respectively, from the track center of the guide track TR) and the distinctive mark group MG2 (i.e. the distinctive mark group MG2 including the pair of distinctive record marks ML2 and MR2 which are equidistantly shifted toward the left side and the right side, respectively, from the track center of the center track CT) which are formed in the guide layer 12.

(2-1) Configuration of Information Mark Group

Firstly, with reference to FIG. 3 to FIG. 6, an explanation will be given to the configuration of the information mark groups MG1 formed in the guide layer 12.

(2-1-1) Configuration of Information Mark Groups Formed on Groove Tracks

Figure 3:
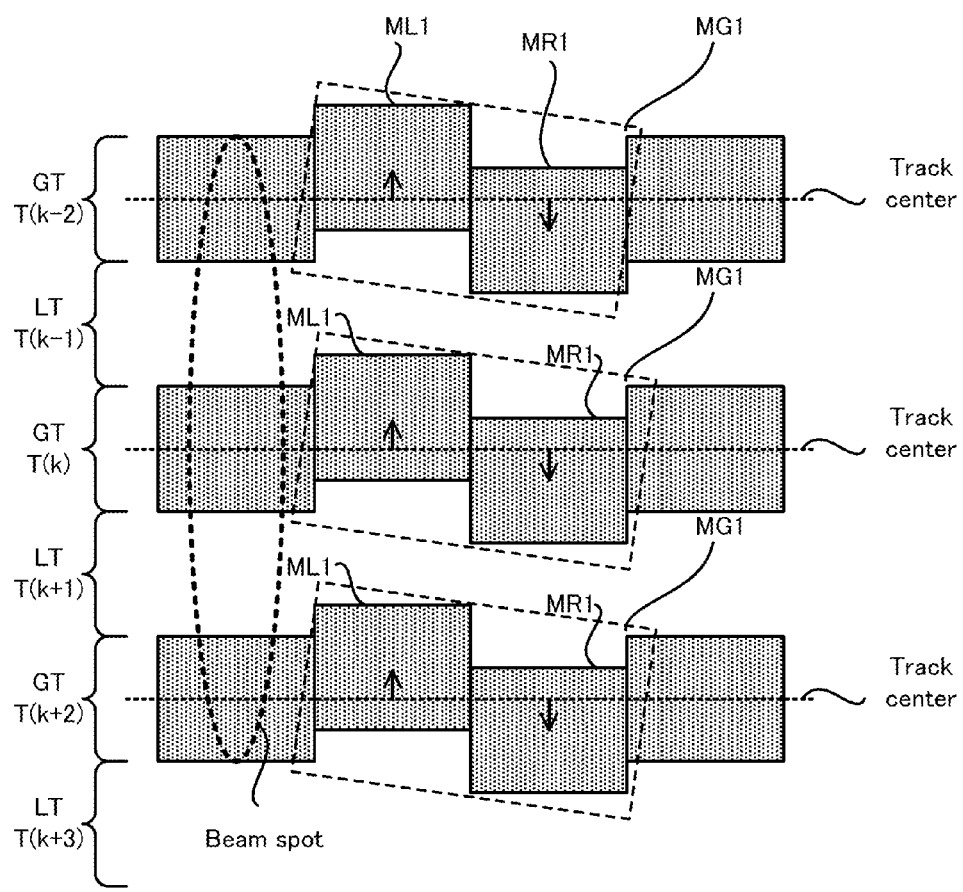
FIG. 3 is a plan view illustrating a configuration of each pair of information record marks which constitutes respective one of information mark groups formed on groove tracks.

Firstly, with reference to FIG. 3 and FIG. 4, an explanation will be given to a configuration of the information mark group MG1 formed on the groove tracks GT out of the information mark groups MG1 formed in the guide layer 12. FIG. 3 is a plan view illustrating a configuration of each pair of information record marks ML1 and MR1 which constitutes the information mark group MG1 formed on groove tracks GT. FIG. 4 are plan views illustrating aspects in which many types of data (specifically, bit data and synchronous data) are recorded by the information mark group MG1 formed on the groove tracks GT.

As illustrated in FIG. 3, the pair of information record marks ML1 and MR1 is formed on each groove track GT. The information record marks ML1 and MR1 are equidistantly shifted toward the left side and the right side, respectively, from the track center of the groove track GT. More specifically, there are formed, on the groove track GT, (i) the information record mark ML1 which is shifted by a predetermined distance to the left side from the track center of the groove track GT (e.g. to the left side with respect to the travel direction of the groove track GT) and (ii) the information record mark MR1 which is shifted by the predetermined distance to the right side from the track center of the groove track GT (e.g. to the right side with respect to the travel direction of the groove track GT).

Each of the information mark groups MG1 formed on the groove tracks GT includes the pair of information record marks ML1 and MR1 as described above. For example, FIG. 3 illustrates that each of the information mark groups MG1 formed on the groove tracks GT is an information mark group MG1 which is exactly the pair of information record marks ML1 and MR1 (i.e. which is obtained from only one pair of information record marks ML1 and MR1). As explained with reference to FIG. 4A to FIG. 4C later, however, each of the information mark groups MG1 formed on the groove tracks GT may be (i) an information mark group MG1 which is obtained by combining a plurality of pairs of information record marks ML1 and MR1, or (ii) an information mark group MG1 which is obtained by combining (ii-1) one or more pairs of information record marks ML1 and MR1 with (ii-2-1) one or more other information record marks (e.g. another information record mark MC1 whose center is located on the track center (refer to FIG. 4A)) or (ii-2-2) areas having no information record mark formed (refer to FIG. 6A)).

In the example, the same information mark group MG1 is formed in the same rotational phase position (i.e. in the same rotational angle position) of each of the plurality of groove tracks GT. In other words, the same information mark group MG1 is formed on each of the plurality of groove tracks GT such that the information mark groups MG1 are adjacent to one another or are arranged along a direction (i.e. a vertical direction in FIG. 3) perpendicular to the extending direction (the direction from the left to the right in FIG. 3) of the groove tracks GT. For example, FIG. 3 illustrates that the same information mark group MG1 is formed in the same rotational phase position of each of three groove tracks GT (i.e. a groove track GT with a track number of "k−2", a groove track GT with a track number of "k", and a groove track GT with a track number of "k+2"), each of the information mark groups MG1 having the information record mark ML1 and the information record mark MR1 arranged in this order along the travel direction of the groove track GT.

In particular, the same information mark group MG1 is formed in the same rotational phase position of each of the plurality of groove tracks GT which are included in the beam spot of the guide laser light LB1 (i.e. the beam spot on the guide layer 12). In other words, the number of the plurality of groove tracks GT in which the same information mark group MG1 is formed in the same rotational phase position is substantially equal to the number of the groove tracks GT which are included in the beam spot of the guide laser light LB1. FIG. 3 illustrates that the number of the plurality of groove tracks GT which are included in the beam spot of the guide laser light LB1 is "three". Therefore, FIG. 3 illustrates that the same information mark group MG1 (i.e. the information mark group MG1 in which the information record mark ML1 and the information record mark MR1 are arranged in this order along the travel direction of the groove track GT) is formed in the same rotational phase position of each of the three groove tracks GT.

Incidentally, FIG. 3 illustrates the information mark groups MG1 in each of which the information record mark ML1 and the information record mark MR1 are arranged in this order along the travel direction of respective one of the groove tracks GT. However, it is also possible to use the information mark groups MG1 in each of which the information record mark MR1 and the information record mark ML1 are arranged in this order along the travel direction of the groove track GT.

Moreover, in FIG. 3, a portion which is concave in comparison with the surroundings is hatched. On the other hand, a portion which is convex in comparison with the surroundings is illustrated in blank (in white). Therefore, in the optical disc 11 in the example, the groove tracks GT are concave, the land tracks LT are convex, and the information record marks ML1 and MR1 are concave. However, the groove tracks GT may be convex, the land tracks LT may be concave, and the information record marks ML1 and MR1 may be convex.

In the example, the information mark groups MG1 as described above are used to record, in the guide layer 12 (particularly, on the groove tracks GT), the pre-format information (e.g. the clock information, the address information, the recording start timing information, etc.) in advance. More specifically, in the example, the same information mark group MG1 formed in the same rotational phase position is used to record, in the guide layer 12, bit data which constitutes one portion of the pre-format information in advance. Therefore, one pre-format information may be obtained by combining (i.e. integrating) a plurality of bit data which are obtained from a plurality of different information mark groups MG1 formed at a plurality of positions in the guide layer 12. Moreover, in the example, the information mark groups MG1 as described above are used to record, in the guide layer 12, synchronous data for synchronization upon reading the bit data which constitutes at least one portion of the pre-format information. However, not only the bit data which constitute at least one portion of the pre-format information and the synchronous data but also any data may be recorded in advance in the guide layer 12 by using the information mark groups MG1.

Figure 4A:
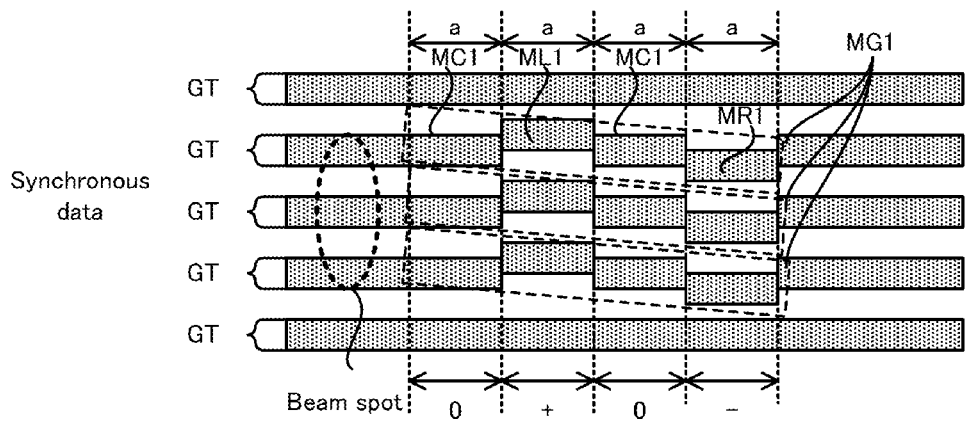
FIG. 4A to FIG. 4C are plan views illustrating aspects in which many types of data (specifically, bit data and synchronous data) are recorded by the information mark groups formed on the groove tracks.

Specifically, as illustrated in FIG. 4A, the information mark groups MG1 in each of which (i) the information record mark MC1 which is located on the track center, (ii) the information record mark ML1 which is shifted by the predetermined distance to the left side from the track center, (iii) the information record mark MC1 which is located on the track center, and (iv) the information record mark MR1 which is shifted by the predetermined distance to the right side from the track center are arranged in this order along the travel direction of the groove track GT may be formed on the groove tracks GT as the information mark groups MG1 each of which constitutes the synchronous data. Incidentally, FIG. 4A illustrates an example in which the length (specifically, the length along the extending direction of the groove track GT) of each of the information record mark MC1, the information record mark ML1 and the information record mark MR1 is all "a".

In this case, the signal level of a push-pull signal, which is generated from return light of the guide laser light LB1 which traces the groove tracks GT on which the information mark groups MG1 are formed as illustrated in FIG. 4A, changes to "0", "+(high)", "0" and "− (low)", because the information record mark MC1, the information record mark ML1, the information record mark MC1, and the information record mark MR1 are read in this order. Incidentally, it is assumed that a state in which the spot center of the beam spot of the guide laser light LB1 is shifted to the left side from the track center of the groove track GT corresponds to a state in which polarity of the push-pull signal is minus. Therefore, the synchronous data is read from the push-pull signal whose signal level changes in order of "0", "+", "0" and "−".

Figure 4B:
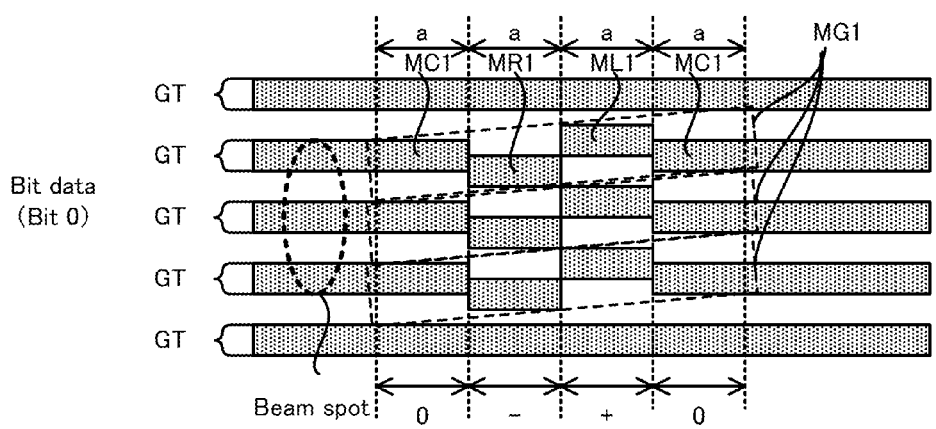

As illustrated in FIG. 4B, the information mark groups MG1 in each of which (i) the information record mark MC1 which is located on the track center, (ii) the information record mark MR1 which is shifted by the predetermined distance to the right side from the track center, (iii) the information record mark ML1 which is shifted by the predetermined distance to the left side from the track center and (iv) the information record mark MC1 which is located on the track center are arranged in this order along the direction of travel of the groove track GT may be formed on the groove tracks GT as the information mark groups MG1 each of which constitutes the bit data (bit 0). Incidentally, FIG. 4B illustrates an example in which the length of each of the information record mark MC1, the information record mark ML1 and the information record mark MR1 is all "a".

In this case, the signal level of a push-pull signal, which is generated from return light of the guide laser light LB1 which traces the groove tracks GT on which the information mark groups MG1 are formed as illustrated in FIG. 4B, changes to "0", "−", "+" and "0", because the information record mark MC1, the information record mark MR1, the information record mark ML1 and the information record mark MC1 are read in this order. Therefore, the bit data (bit 0) is read from the push-pull signal whose signal level changes in order of "0", "−", "+" and "0".

Figure 4C:
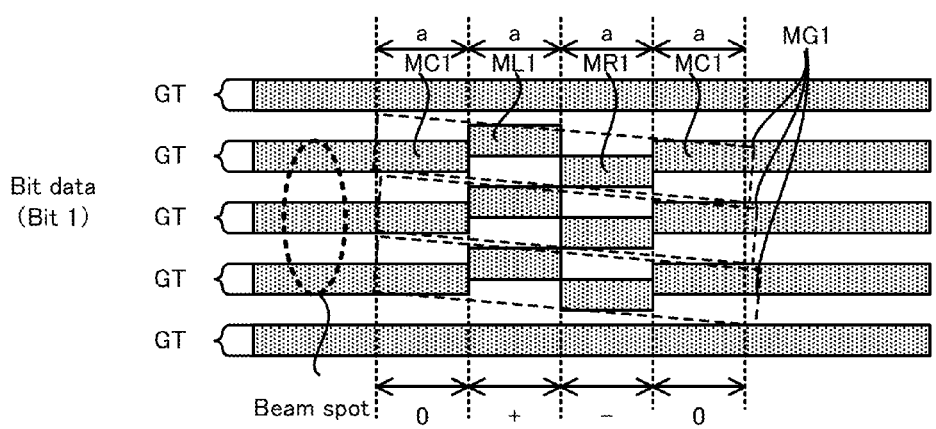

As illustrated in FIG. 4C, the information mark groups MG1 in each of which (i) the information record mark MC1 which is located on the track center, (ii) the information record mark ML1 which is shifted by the predetermined distance to the left side from the track center, (iii) the record mark MR1 which is shifted by the predetermined distance to the right side from the track center and (iv) the information record mark MC1 which is located on the track center are arranged in this order along the direction of travel of the groove track GT may be formed on the groove tracks GT as the information mark groups MG1 each of which constitutes the bit data (bit 1). Incidentally, FIG. 4C illustrates an example in which the length of each of the information record mark MC1, the information record mark ML1 and the information record mark MR1 is all "a".

In this case, the signal level of a push-pull signal, which is generated from return light of the guide laser light LB1 which traces the groove tracks GT on which the information mark groups MG1 are formed as illustrated in FIG. 4C, changes to "0", "+", "−" and "0", because the information record mark MC1, the information record mark ML1, the information record mark MR1 and the information record mark MC1 are read in this order. Therefore, the bit data (bit 1) is read from the push-pull signal whose signal level changes in order of "0", "+", "−" and "0.

Incidentally, the aspects of the information mark groups MG1 illustrated in FIG. 4 (i.e. the information mark group MG1 which constitutes the synchronous data, the information mark group MG1 which constitutes the bit data (bit 0) and the information mark group MG1 which constitutes the bit data (bit 1)) are merely one example. Therefore, three types of information mark groups MG1 indicating aspects other than those illustrated in FIG. 4 may be used to constitute the synchronous data, the bit data (bit 0), and the bit data (bit 1).

(2-1-2) Configuration of Information Mark Group Formed on Land Tracks

Figure 5:
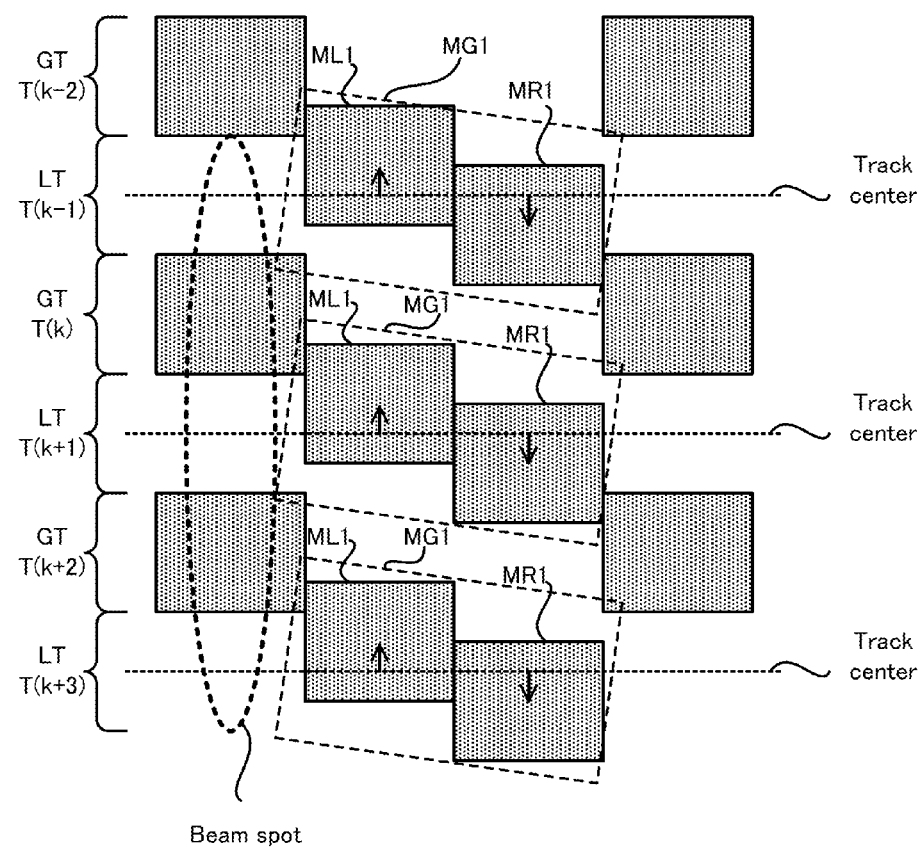
FIG. 5 is a plan view illustrating a configuration of each pair of information record marks which constitutes respective one of information mark groups formed on land tracks.

Next, with reference to FIG. 5 and FIG. 6, an explanation will be given to a configuration of the information mark group MG1 formed on the land tracks LT out of the information mark groups MG1 formed in the guide layer 12. FIG. 5 is a plan view illustrating a configuration of each pair of information record marks ML1 and MR1 which constitutes the information mark group MG1 formed on land tracks LT. FIG. 6 are plan views illustrating aspects in which many types of data (specifically, bit data and synchronous data) are recorded by the information mark group MG1 formed on the land tracks LT.

As illustrated in FIG. 5, the pair of information record marks ML1 and MR1 is formed on each land track LT. The information record marks ML1 and MR1 are equidistantly shifted toward the left side and the right side, respectively, from the track center of the land track LT. More specifically, there are formed, on the land track LT, (i) the information record mark ML1 shifted by the predetermined distance to the left side from the track center of the land track LT (e.g. to the left side with respect to the travel direction of the land track LT) and (ii) the information record mark MR1 which is shifted by the predetermined distance to the right side from the track center of the land track LT (e.g. to the right side with respect to the travel direction of the land track LT).

Each of the information mark groups MG1 formed on the land tracks LT includes the pair of information record marks ML1 and MR1 as described above. For example, FIG. 5 illustrates that each of the information mark groups MG1 formed on the land tracks LT is an information mark group MG1 which is exactly the pair of information record marks ML1 and MR1 (i.e. which is obtained from only one pair of information record marks ML1 and MR1). As explained with reference to FIG. 6 and the like later, however, each of the information mark groups MG1 formed on the land tracks LT may be (i) an information mark group MG1 which is obtained by combining a plurality of pairs of information record marks ML1 and MR1, or (ii) an information mark group MG1 which is obtained by combining (ii-1) one or more pairs of information record marks ML1 and MR1 with (ii-2-1) one or more other information record marks (e.g. another information record mark MC1 whose center is located on the track center (refer to FIG. 4A)) or (ii-2-2) areas having no information record mark formed (refer to FIG. 6A)).

In the example, the same information mark group MG1 is formed in the same rotational phase position (i.e. in the same rotational angle position) of each of the plurality of land tracks LT. In other words, the same information mark group MG1 is formed on each of the plurality of land tracks LT such that the information mark groups MG1 are adjacent to one another or are arranged along a direction (i.e. a vertical direction in FIG. 5) perpendicular to the extending direction (the direction from the left to the right in FIG. 5) of each of the land tracks LT. For example, FIG. 5 illustrates that the same information mark group MG1 is formed in the same rotational phase position of each of three land tracks LT (i.e. a land track LT with a track number of "k−1", a land track LT with a track number of "k+1", and a land track LT with a track number of "k+3"), each of the information mark groups MG1 having the information record mark ML1 and the information record mark MR1 arranged in this order along the travel direction of the land track LT.

In particular, the same information mark group MG1 is formed in the same rotational phase position of each of the plurality of land tracks LT which are included in the beam spot of the guide laser light LB1 (i.e. the beam spot on the guide layer 12). In other words, the number of the plurality of land tracks LT in which the same information mark group MG1 is formed in the same rotational phase position is equal to the number of the land tracks LT which are included in the beam spot of the guide laser light LB1. FIG. 5 illustrates that the number of the plurality of land tracks LT which are included in the beam spot of the guide laser light LB1 is "three". Therefore, FIG. 5 illustrates that the same information mark group MG1 (i.e. the information mark group MG1 in which the information record mark ML1 and the information record mark MR1 are arranged in this order along the travel direction of the land track LT) is formed in the same rotational phase position of each of the three land tracks LT.

Incidentally, FIG. 5 illustrates the information mark groups MG in each of which the information record mark ML1 and the information record mark MR1 are arranged in this order along the travel direction of respective one of the land tracks LT. However, it is also possible to use the information mark groups MG1 in each of which the information record mark MR1 and the information record mark ML1 are arranged in this order along the travel direction of the land track LT.

In the example, the information mark groups MG1 as described above are used to record, in the guide layer 12 (particularly, on the land tracks LT), the pre-format information (e.g. the clock information, the address information, the recording start timing information, etc.) in advance. More specifically, in the example, the same information mark group MG1 formed in the same rotational phase position is used to record, in the guide layer 12, the bit data which constitutes one portion of the pre-format information in advance. Therefore, one pre-format information is obtained by combining (i.e. integrating) a plurality of bit data which are obtained from a plurality of different information mark groups MG1 formed at a plurality of positions in the guide layer 12. Moreover, in the example, the information mark groups MG1 as described above are used to record, in the guide layer 12, the synchronous data for synchronization upon reading the bit data which constitutes at least one portion of the pre-format information. However, not only the bit data which constitute at least one portion of the pre-format information and the synchronous data but also any data may be recorded in advance in the guide layer 12 by using the information mark groups MG1.

Figure 6A:
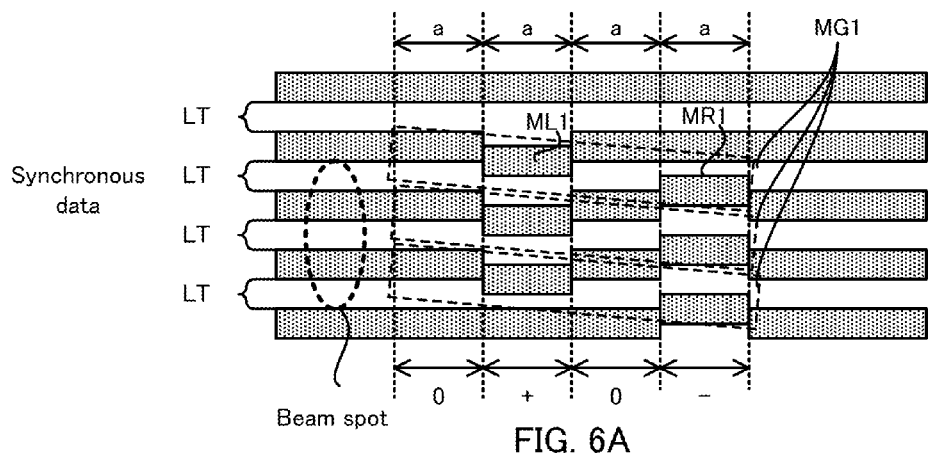
FIG. 6A to FIG. 6C are plan views illustrating aspects in which many types of data (specifically, bit data and synchronous data) are recorded by the information mark groups formed on the land tracks.

Specifically, as illustrated in FIG. 6A, the information mark groups MG1 in each of which (i) the area having no information record mark formed, (ii) the information record mark ML1 which is shifted by the predetermined distance to the left side from the track center, (iii) the area having no information record mark formed, and (iv) the information record mark MR1 which is shifted by the predetermined distance to the right side from the track center are arranged in this order along the travel direction of the land track LT may be formed on the land tracks LT as the information mark groups MG1 each of which constitutes the synchronous data. Incidentally, FIG. 6A illustrates an example in which the length of each of the area having no information record mark formed, the information record mark ML1 and the information record mark MR1 is all "a".

In this case, the signal level of a push-pull signal, which is generated from return light of the guide laser light LB1 which traces the land tracks LT on which the information mark groups MG1 are formed as illustrated in FIG. 6A, changes to "0", "+", "0" and "−", because the area having no information record mark formed, the information record mark ML1, the area having no information record mark formed, and the information record mark MR1 are read in this order. Therefore, the synchronous data is read from the push-pull signal whose signal level changes in order of "0", "+", "0" and "−".

Figure 6B:
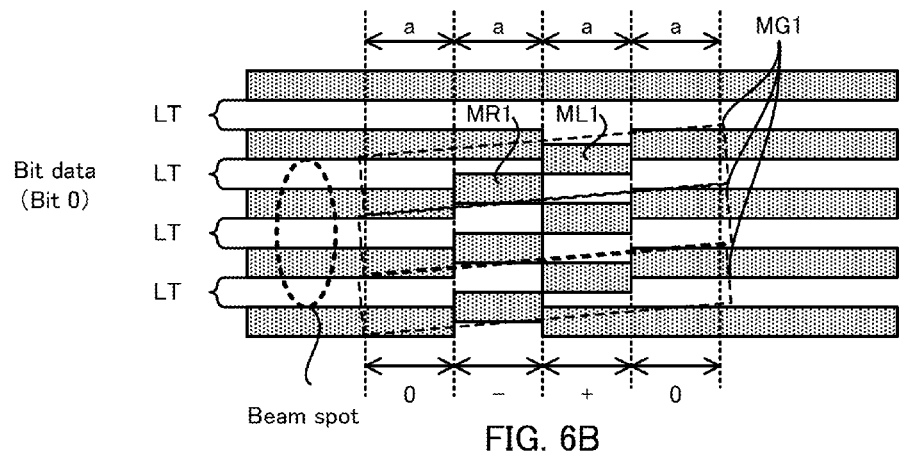

As illustrated in FIG. 6B, the information mark groups MG1 in each of which (i) the area having no information record mark formed, (ii) the information record mark MR1 which is shifted by the predetermined distance to the right side from the track center, (iii) the information record mark ML1 which is shifted by the predetermined distance to the left side from the track center, and (iv) the area having no information record mark formed are arranged in this order along the travel direction of the land track LT may be formed on the land tracks LT as the information mark groups MG1 each of which constitutes the bit data (bit 0). Incidentally, FIG. 6B illustrates an example in which the length of each of the area having no information record mark formed, the information record mark ML1 and the information record mark MR1 is all "a".

In this case, the signal level of a push-pull signal, which is generated from return light of the guide laser light LB1 which traces the land tracks LT on which the information mark groups MG1 are formed as illustrated in FIG. 6B, changes to "0", "−", "+" and "0", because the area having no information record mark formed, the information record mark MR1, the information record mark ML1, and the area having no information record mark formed are read in this order. Therefore, the bit data (bit 0) is read from the push-pull signal whose signal level changes in order of "0", "−", "+" and "0".

Figure 6C:
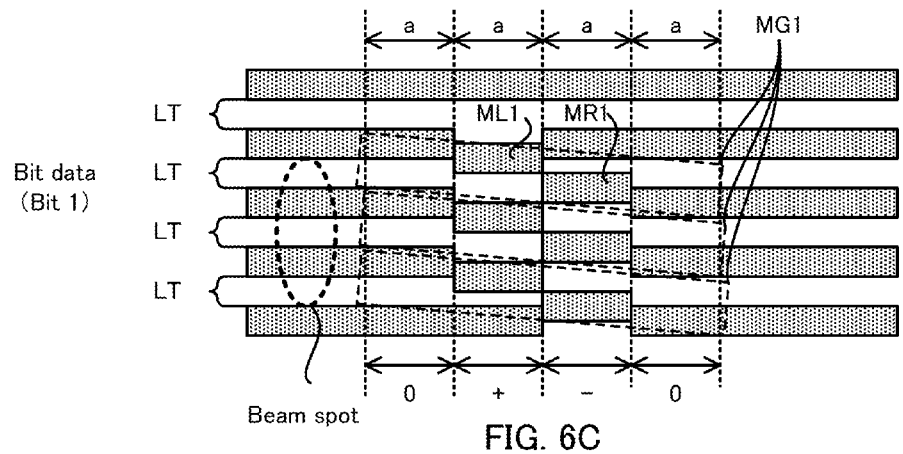

As illustrated in FIG. 6C, the information mark groups MG1 in each of which (i) the area having no information record mark formed, (ii) the information record mark ML1 which is shifted by the predetermined distance to the left side from the track center, (iii) the information record mark MR1 which is shifted by the predetermined distance to the right side from the track center, and (iv) the area having no information record mark formed are arranged in this order along the travel direction of the land tracks LT may be formed on the land tracks LT as the information mark groups MG1 each of which constitutes the bit data (bit 1). Incidentally, FIG. 6C illustrates an example in which the length of each of the area having no information record mark formed, the information record mark ML1 and the information record mark MR1 is all "a".

In this case, the signal level of a push-pull signal, which is generated from return light of the guide laser light LB1 which traces the land tracks LT on which the information mark groups MG1 are formed as illustrated in FIG. 6C, changes to "0", "+", "−" and "0", because the area having no information record mark formed, the information record mark ML1, the information record mark MR1, and the area having no information record mark formed are read in this order. Therefore, the bit data indicative of bit 1 is read from the push-pull signal whose signal level changes in order of "0", "+", "−" and "0".

Incidentally, the aspects of the information mark groups MG1 illustrated in FIG. 6 (i.e. the information mark group MG1 which constitutes the synchronous data, the information mark group MG1 which constitutes the bit data (bit 0) and the information mark group MG1 which constitutes the bit data (bit 1)) are merely one example. Therefore, three types of information mark groups MG1 indicating aspects other than those illustrated in FIG. 6 may be used to constitute the synchronous data, the bit data (bit 0), and the bit data (bit 1).

The information mark groups MG1 formed on the land tracks LT as described above are preferably formed simultaneously with the formation of the groove tracks GT, at the time of manufacture of the optical disc 11. The groove tracks GT and the information record marks MR1 and ML1 are concave, and thus, a cutting process using cutting laser light is performed on positions corresponding to the groove tracks GT and the information mark groups MG1, at the time of manufacture of the optical disc 11. In other words, the cutting laser light is irradiated on the positions corresponding to the groove tracks GT, the positions corresponding to the information record marks MR1, and the positions corresponding to the information record marks ML1. On the other hand, the land tracks LT are convex, and thus, the cutting process using the cutting laser light does not have to be performed on positions corresponding to the land tracks LT, at the time of manufacture of the optical disc 11. In other words, the cutting laser light does not have to be irradiated on the positions corresponding to the land tracks LT. Thus, if the information mark groups MG1 formed on the land tracks LT are formed simultaneously with the formation of the groove tracks GT, the cutting laser light does not have to be irradiated at all at the time of formation of the land tracks LT (in other words, it is only necessary to turn on or off the cutting laser light at the time of formation of the groove tracks GT). Therefore, a manufacturing process of the optical disc 11 is simplified.

(2-2) Configuration of Distinctive Mark Group

Next, with reference to FIG. 7 to FIG. 12, an explanation will be given to the configuration of the distinctive mark group MG2 formed in the guide layer 12.

(2-2-1) Configuration of Distinctive Mark Group Formed on Groove Tracks

Figure 7:
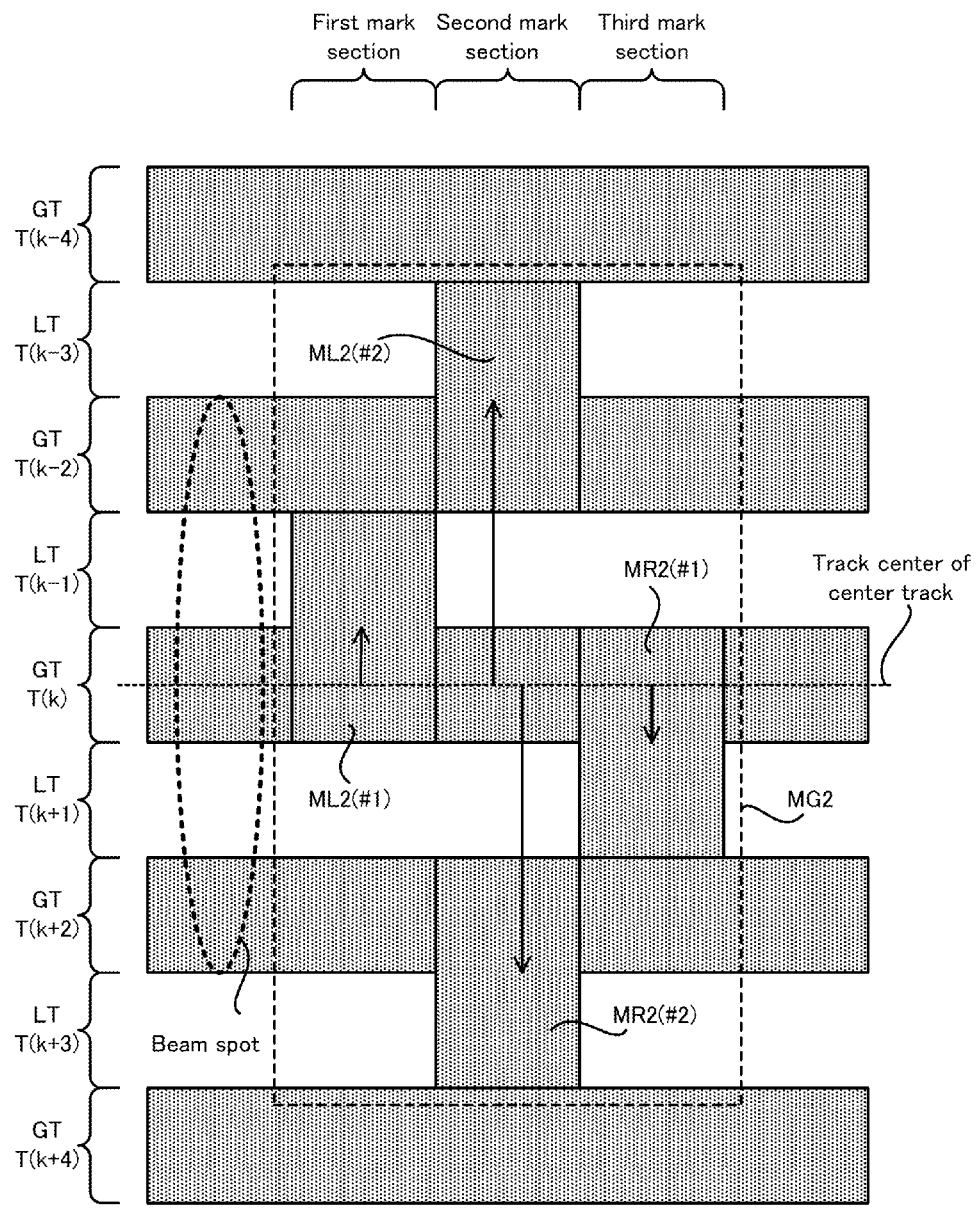
FIG. 7 is a plan view illustrating a configuration of a distinctive mark group for the information mark groups formed on the groove tracks.
Figure 8:
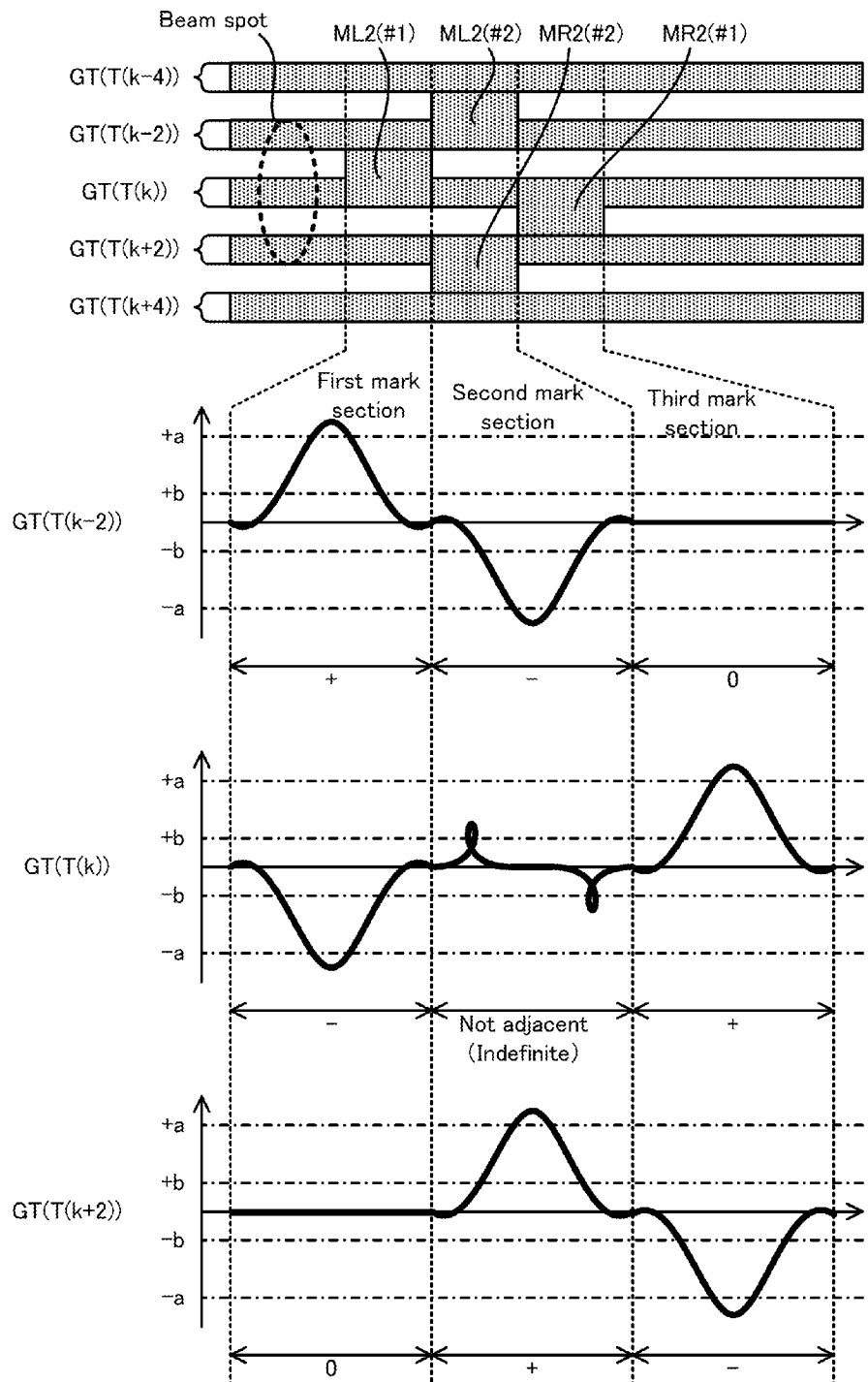
FIG. 8 is graphs illustrating the signal level of push-pull signals obtained from return light of the guide laser light which traces the groove tracks on which the distinctive mark group is formed.
Figure 9:
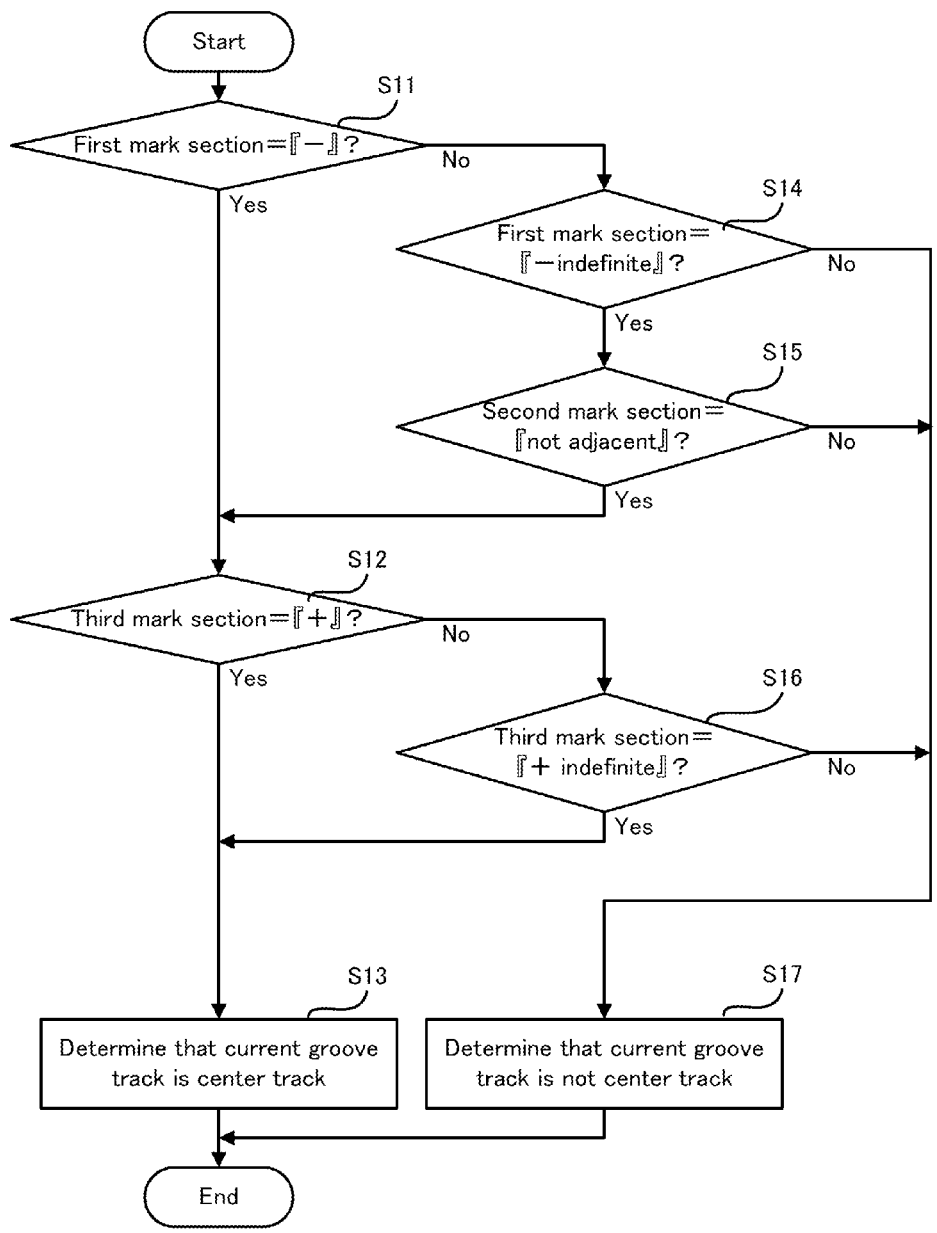
FIG. 9 is a flowchart illustrating an operation of distinguishing a center track by using the distinctive mark group illustrated in FIG. 7.

Firstly, with reference to FIG. 7 to FIG. 9, an explanation will be given to a configuration of the distinctive mark group MG2 for the information mark groups MG1 formed on the groove tracks GT (i.e. for distinguishing the center track of the information mark groups MG1 formed on the groove tracks GT), out of the distinctive mark groups MG2. FIG. 7 is a plan view illustrating the configuration of the distinctive mark group MG2 for the information mark groups MG1 formed on the groove tracks GT. FIG. 8 is graphs illustrating the signal level of push-pull signals obtained from return light of the guide laser light LB1 which traces the groove tracks GT on which the distinctive mark group MG2 is formed. FIG. 9 is a flowchart illustrating an operation of distinguishing the center track CT by using the distinctive mark group MG2 illustrated in FIG. 7.

Incidentally, FIG. 7 to FIG. 9 illustrate an example of the configuration of the distinctive mark group MG2 for distinguishing the groove track GT with a track number of "k" (i.e. the center track CT), in the case where the same information mark group MG1 is formed on the same rotational phase position of each of the groove track GT with a track number of "k−2", the groove track GT with a track number of "k", and the groove track GT with a track number of "k+2" (refer to FIG. 3).

As illustrated in FIG. 7, the distinctive mark group MG2 includes the pair of distinctive record marks ML2 and MR2 which are equidistantly shifted toward the left side and the right side, respectively, from the track center of the center track CT. Specifically, the distinctive mark group MG2 includes (i) the distinctive record mark ML2 which is shifted by a predetermined distance to the left side from the track center of the center track CT (e.g. to the left side with respect to the travel direction of the center track CT) and (ii) the distinctive record mark MR2 which is shifted by the predetermined distance to the right side from the track center of the center track CT (e.g. to the right side with respect to the travel direction of the center track CT).

The pair of distinctive record marks ML2 and MR2 may be formed in the same rotational phase position. FIG. 7 illustrates an example in which a pair of distinctive record marks ML2(#2) and MR2(#2) are formed in the same rotational phase position. Alternatively, the pair of distinctive record marks ML2 and MR2 may be formed in different rotational phase positions. FIG. 7 illustrates an example in which a pair of distinctive record marks ML2(#1) and MR2(#1) are formed in different rotational phase positions.

The distinctive mark group MG2 is formed of the pair of distinctive record marks ML2 and MR2 as described above. For example, FIG. 7 illustrates that the distinctive mark group MG2 formed on the groove tracks GT is a distinctive mark group MG2 including the pair of distinctive record marks ML2(#2) and MR2(#2) formed in the same rotational phase position and the pair of distinctive record marks ML2(#1) and MR2(#1) formed in the different rotational phase positions. The distinctive mark group MG2 formed on the groove tracks GT may include only one pair of distinctive record marks ML2 and MR2, or may be a distinctive mark group MG2 obtained by combining (i) one or more pairs of distinctive record marks ML2 and MR2 with (ii-1) one or more other record marks (e.g. another distinctive record mark whose center is located on the track center of the center track CT) or with (ii-2) areas having no distinctive record mark formed.

In the example, a width (i.e. a length in a direction perpendicular to the direction of travel of the groove track GT (i.e. a radial direction of the optical disc 10) and a length in a vertical direction of FIG. 7) of each of the distinctive record mark ML2 and the distinctive record mark MR2 which constitute the distinctive mark group MG2 is twice or more the width of the guide track TR (or a width of the groove track GT). FIG. 7 illustrates an example in which the width of each of the distinctive record mark ML2 and the distinctive record mark MR2 is twice the width of the guide track TR. The width of each of the distinctive record mark ML2 and the distinctive record mark MR2 may be twice or less the width of the guide track TR and greater than the width of the guide track TR.

Incidentally, FIG. 7 illustrates an example of the distinctive mark group MG2 in which the distinctive record mark ML2 and the distinctive record mark MR2 are arranged in this order along the travel direction of the groove track GT. However, it is also possible to use the distinctive record mark MG2 in which the distinctive record mark MR2 and the distinctive record mark ML2 are arranged in this order along the travel direction of the groove track GT.

Moreover, FIG. 7 illustrates an example in which the groove tracks GT are concave, the land tracks LT are convex, and the distinctive record marks ML2 and MR2 are concave. However, the groove tracks GT may be convex, the land tracks LT may be concave, and the distinctive record marks ML2 and MR2 may be convex.

In the example, the distinctive mark group MG2 as described above is used to distinguish the center track CT from the plurality of groove tracks GT on which the same information mark groups MG1 are formed. After the center track CT is distinguished, the pre-format information indicated by the information mark group MG1 is read on the basis of the push-pull signal generated from the return light of the guide laser light LB1 which traces the center track CT (i.e. the guide laser light LB1 whose spot center is located on the center track CT).

When the center track CT is distinguished, the signal level of the push-pull signal obtained from the return light of the guide laser light LB1 which traces the groove track GT on which the distinctive mark group MG2 is formed is compared with a predetermined first threshold a (where a is a positive real number) and a predetermined second threshold b (where b is a positive real number smaller than a). The comparison between the signal level of the push-pull signal and the first threshold a and the comparison between the signal level and the second threshold b as described above are performed in each unit in which the distinctive record marks ML2 and/or MR2 are formed (which is expressed by a "mark section" in FIG. 7).

Specifically, firstly, in accordance with comparison result between the signal level of the push-pull signal and the first threshold and the comparison result between the signal level of the push-pull signal and the second threshold b, it is determined what section each mark section is. As illustrated in FIG. 8, if the signal level of the push-pull signal is greater than +a (i.e. +a<signal level), the mark section is determined to be a "+ section". Moreover, if the signal level of the push-pull signal is less than −a (i.e. signal level<−a), the mark section is determined to be a "− section". If the signal level of the push-pull signal is less than or equal to +a and is greater than +b (i.e. +b<signal level≤+a), the mark section is determined to be a "+ indefinite section". If the signal level of the push-pull signal is greater than or equal to −a and is less than −b (i.e. −a≤signal level<−b), the mark section is determined to be a "− indefinite section". If the signal level of the push-pull signal is greater than −b and is less than or equal to b (i.e. −b≤signal level≤b), the mark section is determined to be a "zero (0) section".

More specifically, the first graph in FIG. 8 illustrates the signal level of the push-pull signal generated from the return light of the guide laser light LB1 which traces the groove track GT with a track number of "k−2". The signal level indicates that the first mark section is the "+ section", that the second mark section is the "− section", and that the third mark section is the "0 section".

In the same manner, the second graph in FIG. 8 illustrates the signal level of the push-pull signal generated from the return light of the guide laser light LB1 which traces the groove track GT with a track number of "k". The signal level indicates that the first mark section is the "− section", that the second mark section is the "+ indefinite section and − indefinite section", and that the third mark section is the "+ section".

Incidentally, it is preferable that the second mark section is determined to be the "0 section". In the actual recording/reproducing apparatus, however, due to a tracking deviation of the guide laser light LB1, a deviation of a mounting position of a photo-detector for receiving the return light of the guide laser light LB1 and the like, the signal level which is greater than +b or which is less than −b is detected in some cases. Alternatively, in the actual recording/reproducing apparatus, due to the tracking deviation of the guide laser light LB1, a deviation of the mounting position of a photo-detector for receiving the return light of the guide laser light LB1 and the like, the signal level which is greater than +a or which is less than −a is detected in some cases. If, however, the signal level which is greater than +b or +a or which is less than −b or −a is detected in the second mark section, both of the signal level which is greater than +b or +a and the signal level which is less than −b or −a should be detected. Therefore, if both of the signal level which is greater than +b or +a and the signal level which is less than −b or −a are detected in a single mark section, the mark section is preferably determined to be a "not-adjacent section (i.e. a section having a relatively high possibility of being the center track CT)".

In the same manner, the third graph in FIG. 8 illustrates the signal level of the push-pull signal generated from the return light of the guide laser light LB1 which traces the groove track GT with a track number of "k+2". The signal level indicates that the first section is the "0 section", that the second mark section is the "+ section", and that the third mark section is the "− section".

After that, it is determined whether the groove track GT traced by the guide laser light LB1 is the center track CT or not, in accordance with a combination of the determination results in the respective mark sections.

Specifically, as illustrated in FIG. 9, firstly, it is determined whether or not the first mark section is the "− section" (step S11).

As a result of the determination in the step S11, if it is determined that the first mark section is the "− section" (the step S11: Yes), then, it is determined whether or not the third mark section is the "+ section" (step S12).

As a result of the determination in the step S12, if it is determined that the third mark section is the "+ section" (the step S12: Yes), it is determined that the groove track GT currently traced by the guide laser light LB1 is the center track CT (step S13).

On the other hand, as a result of the determination in the step S12, if it is determined that the third mark section is not the "+ section" (the step S12: No), then, it is determined whether or not the third mark section is the "+ indefinite section" (step S16).

As a result of the determination in the step S16, if it is determined that the third mark section is the "+ indefinite section" (the step S16: Yes), it is determined that the groove track GT currently traced by the guide laser light LB1 is the center track CT (the step S13).

On the other hand, as a result of the determination in the step S16, if it is determined that the third mark section is not the "+ indefinite section (the step S16: No), it is determined that the groove track GT currently traced by the guide laser light LB1 is not the center track CT (step S17).

On the other hand, as a result of the determination in the step S11, if it is determined that the first mark section is not the "− section" (the step S11: No), then, it is determined whether or not the first mark section is the "− indefinite section" (step S14).

As a result of the determination in the step S14, if it is determined that the first mark section is the "− indefinite section" (the step S14: Yes), then, it is determined whether or not the second mark section is the "not-adjacent section" (step S15).

As a result of the determination in the step S15, if it is determined that second mark section is the "not-adjacent section" (the step S15: Yes), the step S12 is performed.

On the other hand, as a result of the determination in the step S15, if it is determined that second mark section is not the "not-adjacent section" (the step S15: No), it is determined that the groove track GT currently traced by the guide laser light LB1 is not the center track CT (the step S17).

On the other hand, as a result of the determination in the step S14, if it is determined that the first mark section is not the "− indefinite section" (the step S14: No), it is determined that the groove track GT currently traced by the guide laser light LB1 is not the center track CT (the step S17).

An example in cases where the operation illustrated in FIG. 9 is specifically applied to the distinctive mark group MG2 illustrated in FIG. 8 will be explained below.

The signal level of the push-pull signal generated from the return light of the guide laser light LB1 which traces the groove track GT with a track number of "k−2" indicates that the first mark section is the "+ section", that the second mark section is the "− section", and that the third mark section is the "0 section". Therefore, in this case, it is determined that the first mark section is not the "− section" (the step S11: No) and it is determined that the first mark section is not the "− indefinite section" (the step S14: No). Therefore, it is determined that the groove track GT currently traced by the guide laser light LB1 (i.e. the groove track GT with a track number of "k−2") is not the center track CT (the step S17).

Then, the signal level of the push-pull signal generated from the return light of the guide laser light LB1 which traces the groove track GT with a track number of "k" indicates that the first mark section is the "− section", that the second mark section is the "not-adjacent section", and that the third mark section is the "+ section". Therefore, in this case, it is determined that the first mark section is the "− section" (the step S11: Yes) and it is determined that the third mark section is the "+ section" (the step S12: Yes). Therefore, it is determined that the groove track GT currently traced by the guide laser light LB1 (i.e. the groove track GT with a track number of "k") is the center track CT (the step S13).

In the same manner, the signal level of the push-pull signal generated from the return light of the guide laser light LB1 which traces the groove track GT with a track number of "k+2" indicates that the first mark section is the "0 section", that the second mark section is the "+ section", and that the third mark section is the "− section". Therefore, in this case, it is determined that the first mark section is not the "− section" (the step S11: No) and it is determined that the first mark section is not the "− indefinite section" (the step S14: No).

Therefore, it is determined that the groove track GT currently traced by the guide laser light LB1 (i.e. the groove track GT with a track number of "k+2") is not the center track CT (the step S17).

As described above, the center track CT is preferably distinguished by using the distinctive mark group MG2.

Incidentally, the aspects of the distinctive mark groups MG2 illustrated in FIG. 7 and FIG. 8 are merely one example. Therefore, the distinctive mark group MG2 indicating an aspect other than those illustrated in FIG. 7 and FIG. 8 (i.e. an arbitrary distinctive mark group MG2 including one or more pairs of at least one of distinctive record marks ML2 and MR2 formed in the same rotational phase position and distinctive record marks ML2 and MR2 formed in the different rotational phase positions) may be used to distinguish the center track CT. In this case, naturally, the flowchart illustrated in FIG. 9 is preferably changed in accordance with the distinctive mark group MG2 indicating the aspect other than those illustrated in FIG. 7 and FIG. 8.

Moreover, FIG. 7 illustrates an example in which the distinctive record mark ML2(#1), the pair of distinctive record marks ML2(#2) and MR2(#2), and the distinctive record mark MR2(#1) are formed continuously (in other words, without a gap). However, the distinctive record mark ML2(#1), the pair of distinctive record marks ML2(#2) and MR2(#2), and the distinctive record mark MR2(#1) may be formed discretely (in other words, with gaps or at intervals).

(2-2-2) Configuration of Distinctive Mark Group Formed on Land Tracks

Figure 10:
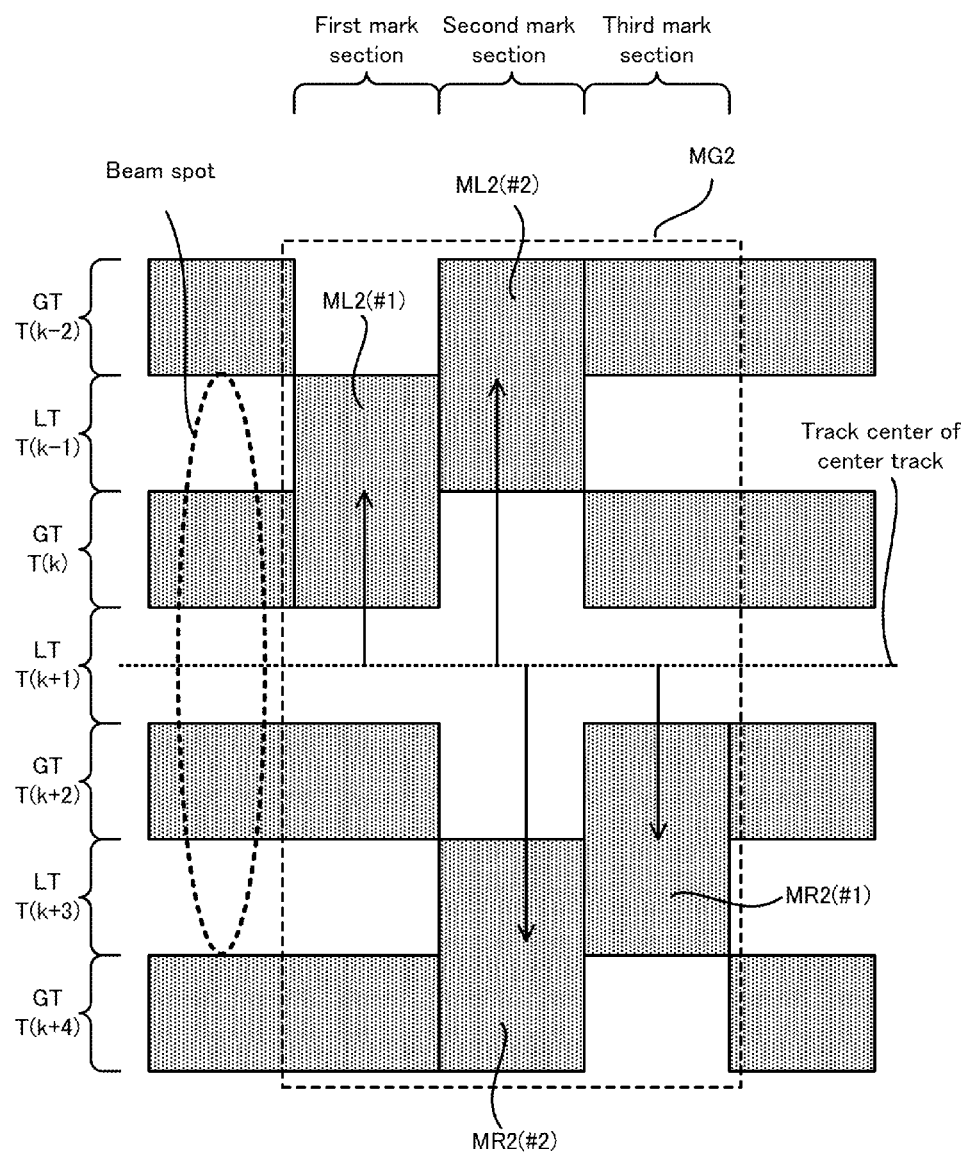
FIG. 10 is a plan view illustrating a configuration of a distinctive mark group for the information mark groups formed on the land tracks.
Figure 11:
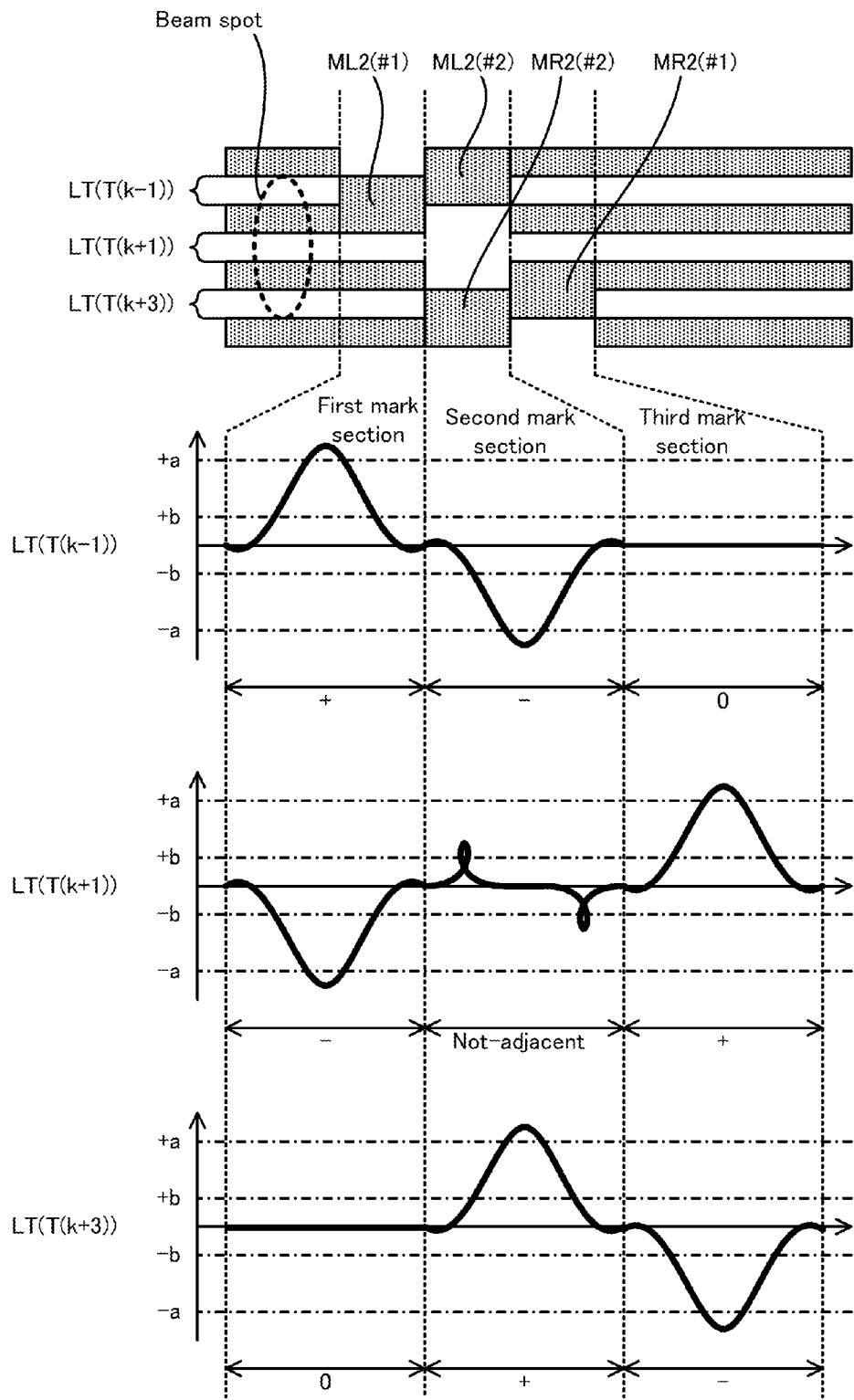
FIG. 11 is graphs illustrating the signal level of push-pull signals obtained from return light of the guide laser light which traces the land tracks on which the distinctive mark group is formed.
Figure 12:
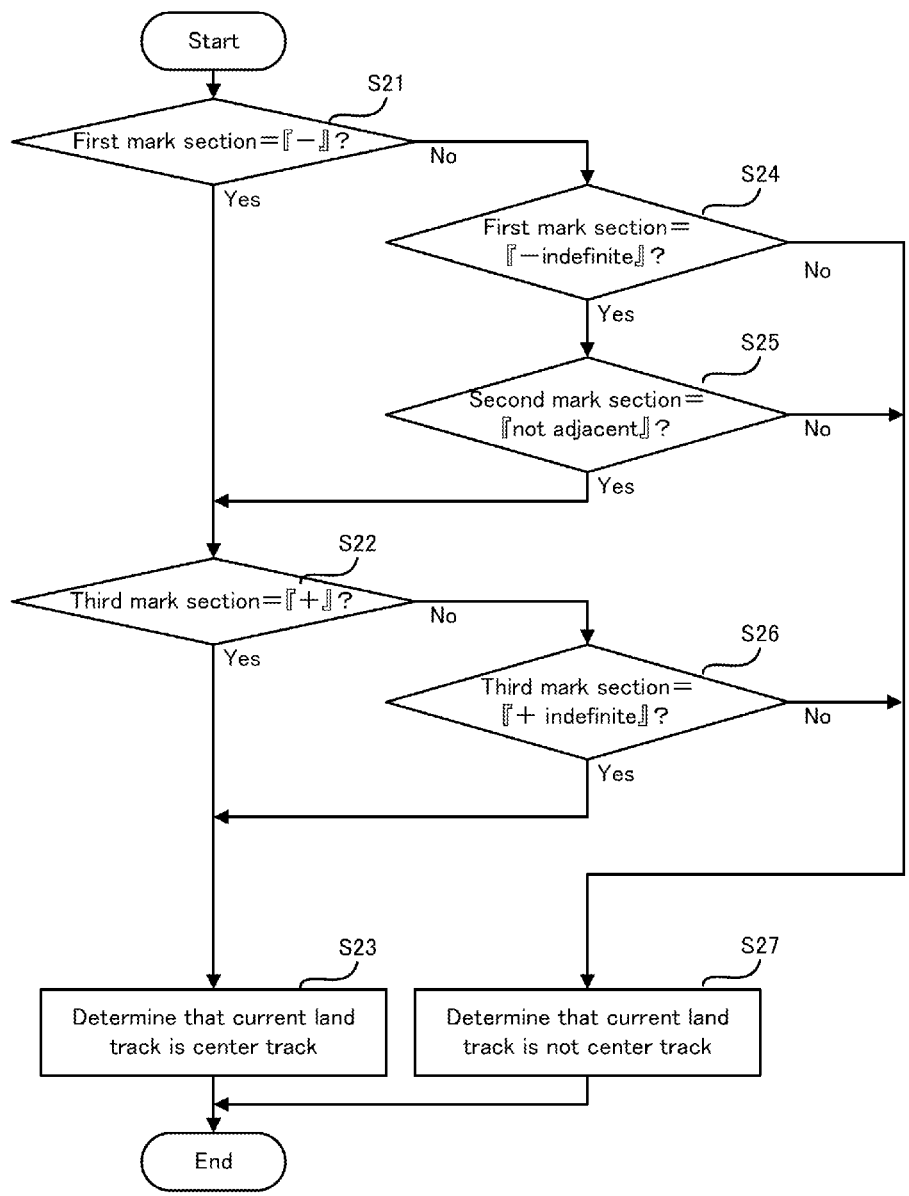
FIG. 12 is a flowchart illustrating an operation of distinguishing the center track by using the distinctive mark group illustrated in FIG. 10.

Next, with reference to FIG. 10 to FIG. 12, an explanation will be given to a configuration of the distinctive mark group MG2 for the information mark groups MG1 formed on the land tracks LT (i.e. for distinguishing the center track of the information mark groups MG1 formed on the land tracks LT), out of the distinctive mark groups MG2. FIG. 10 is a plan view illustrating the configuration of the distinctive mark group MG2 for the information mark groups MG1 formed on the land tracks LT. FIG. 11 is graphs illustrating the signal level of push-pull signals obtained from return light of the guide laser light LB1 which traces the land tracks LT on which the distinctive mark group MG2 is formed. FIG. 12 is a flowchart illustrating an operation of distinguishing the center track CT by using the distinctive mark group MG1 illustrated in FIG. 10.

Incidentally, FIG. 10 to FIG. 12 illustrate an example of the configuration of the distinctive mark group MG2 for distinguishing the land track LT with a track number of "k+1" (i.e. the center track CT), in the case where the same information mark group MG1 is formed on the same rotational phase position of each of the land track LT with a track number of "k−1", the land track LT with a track number of "k+1", and the land track LT with a track number of "k+3" (refer to FIG. 5).

As illustrated in FIG. 10, the distinctive mark group MG2 formed on the land tracks LT, as in the distinctive mark group MG2 formed on the groove tracks GT, includes the pair of distinctive record marks ML2 and MR2 which are equidistantly shifted toward the left side and the right side, respectively, from the track center of the center track CT. Therefore, characteristics of the distinctive mark group MG2 formed on the land tracks LT, which is same as the characteristics of the distinctive mark group MG2 formed on the groove tracks GT, will not be explained to avoid redundancy.

In the example, the distinctive mark group MG2 as described above is used to distinguish the center track CT from the plurality of land tracks LT on which the same information mark groups MG1 are formed. After the center track CT is distinguished, the pre-format information indicated by the information mark group MG1 is read on the basis of the push-pull signal generated from the return light of the guide laser light LB1 which traces the center track CT (i.e. the guide laser light LB1 whose spot center is located on the center track CT).

When the center track CT is distinguished, the signal level of the push-pull signal obtained from the return light of the guide laser light LB1 which traces the land tracks LT on which the distinctive mark group MG2 is formed is compared with the predetermined first threshold a and the predetermined second threshold b. The comparison between the signal level of the push-pull signal and the first threshold a and the comparison between the signal level and the second threshold b as described above are performed in each unit in which the distinctive record marks ML2 and/or MR2 are formed (i.e. the "mark section"). In other words, even regarding the distinctive mark group MG2 formed on the land tracks LT, it is determined what section each mark section is, as in the distinctive mark group MG2 formed on the groove tracks GT.

More specifically, the first graph in FIG. 11 illustrates the signal level of the push-pull signal generated from the return light of the guide laser light LB1 which traces the land track LT with a track number of "k−1". The signal level indicates that the first section is the "+ section", that the second mark section is the "− section", and that the third mark section is the "0 section".

In the same manner, the second graph in FIG. 11 illustrates the signal level of the push-pull signal generated from the return light of the guide laser light LB1 which traces the groove track GT with a track number of "k+1". The signal level indicates that the first section is the "− section", that the second mark section is the "not-adjacent section", and that the third mark section is the "+ section".

In the same manner, the third graph in FIG. 11 illustrates the signal level of the push-pull signal generated from the return light of the guide laser light LB1 which traces the groove track GT with a track number of "k+3". The signal level indicates that the first section is the "0 section", that the second mark section is the "+ section", and that the third mark section is the "− section".

After that, it is determined whether the land track LT traced by the guide laser light LB1 is the center track CT or not, in accordance with a combination of the determination results in the respective mark sections.

Specifically, as illustrated in FIG. 12, firstly, it is determined whether or not the first mark section is the "− section" (step S21).

As a result of the determination in the step S21, if it is determined that the first mark section is the "− section" (the step S21: Yes), then, it is determined whether or not the third mark section is the "+ section" (step S22).

As a result of the determination in the step S22, if it is determined that the third mark section is the "+ section" (the step S22: Yes), it is determined that the land track LT currently traced by the guide laser light LB1 is the center track CT (step S23).

On the other hand, as a result of the determination in the step S22, if it is determined that the third mark section is not the "+ section" (the step S22: No), then, it is determined whether or not the third mark section is the "+ indefinite section" (step S26).

As a result of the determination in the step S26, if it is determined that the third mark section is the "+ indefinite section" (the step S26: Yes), it is determined that the land track LT currently traced by the guide laser light LB1 is the center track CT (the step S23).

On the other hand, as a result of the determination in the step S26, if it is determined that the third mark section is not the "+ indefinite section (the step S26: No), it is determined that the land track LT currently traced by the guide laser light LB1 is not the center track CT (step S27).

On the other hand, as a result of the determination in the step S21, if it is determined that the first mark section is not the "− section" (the step S21: No), then, it is determined whether or not the first mark section is the "− indefinite section" (step S24).

As a result of the determination in the step S24, if it is determined that the first mark section is the "− indefinite section" (the step S24: Yes), then, it is determined whether or not the second mark section is the "not-adjacent section" (step S25).

As a result of the determination in the step S25, if it is determined that second mark section is the "not-adjacent section" (the step S25: Yes), the step S22 is performed.

On the other hand, as a result of the determination in the step S25, if it is determined that second mark section is not the "not-adjacent section" (the step S25: No), it is determined that the land track LT currently traced by the guide laser light LB1 is not the center track CT (the step S27).

On the other hand, as a result of the determination in the step S24, if it is determined that the first mark section is not the "− indefinite section" (the step S24: No), it is determined that the land track LT currently traced by the guide laser light LB1 is not the center track CT (the step S27).

An example in cases where the operation illustrated in FIG. 12 is specifically applied to the distinctive mark group MG2 illustrated in FIG. 11 will be explained below.

The signal level of the push-pull signal generated from the return light of the guide laser light LB1 which traces the land track LT with a track number of "k−1" indicates that the first mark section is the "+ section", that the second mark section is the "− section", and that the third mark section is the "0 section". Therefore, in this case, it is determined that the first mark section is not the "− section" (the step S21: No) and it is determined that the first mark section is not the "− indefinite section" (the step S24: No). Therefore, it is determined that the land track LT currently traced by the guide laser light LB1 (i.e. the land track LT with a track number of "k−1") is not the center track CT (the step S27).

Then, the signal level of the push-pull signal generated from the return light of the guide laser light LB1 which traces the land track LT with a track number of "k+1" indicates that the first mark section is the "− section", that the second mark section is the "not-adjacent section", and that the third mark section is the "+ section". Therefore, in this case, it is determined that the first mark section is the "− section" (the step S21: Yes) and it is determined that the third mark section is the "+ section" (the step S22: Yes). Therefore, it is determined that the land track LT currently traced by the guide laser light LB1 (i.e. the land track LT with a track number of "k+1") is the center track CT (the step S23).

In the same manner, the signal level of the push-pull signal generated from the return light of the guide laser light LB1 which traces the land track LT with a track number of "k+3" indicates that the first mark section is the "0 section", that the second mark section is the "+ section", and that the third mark section is the "− section". Therefore, in this case, it is determined that the first mark section is not the "− section" (the step S21: No) and it is determined that the first mark section is not the "− indefinite section" (the step S24: No). Therefore, it is determined that the land track LT currently traced by the guide laser light LB1 (i.e. the land track LT with a track number of "k+3") is not the center track CT (the step S27).

As described above, the center track CT is preferably distinguished by using the distinctive mark group MG2.

Incidentally, the aspects of the distinctive mark groups MG2 illustrated in FIG. 10 and FIG. 11 are merely one example. Therefore, the distinctive mark group MG2 indicating an aspect other than those illustrated in FIG. 10 and FIG. 11 (i.e. an arbitrary distinctive mark group MG2 including one or more pairs of at least one of distinctive record marks ML2 and MR2 formed in the same rotational phase position and distinctive record marks ML2 and MR2 formed in the different rotational phase positions) may be used to distinguish the center track CT. In this case, naturally, the flowchart illustrated in FIG. 12 is preferably changed in accordance with the distinctive mark group MG2 indicating the aspect other than those illustrated in FIG. 10 and FIG. 11.

Figure 13:
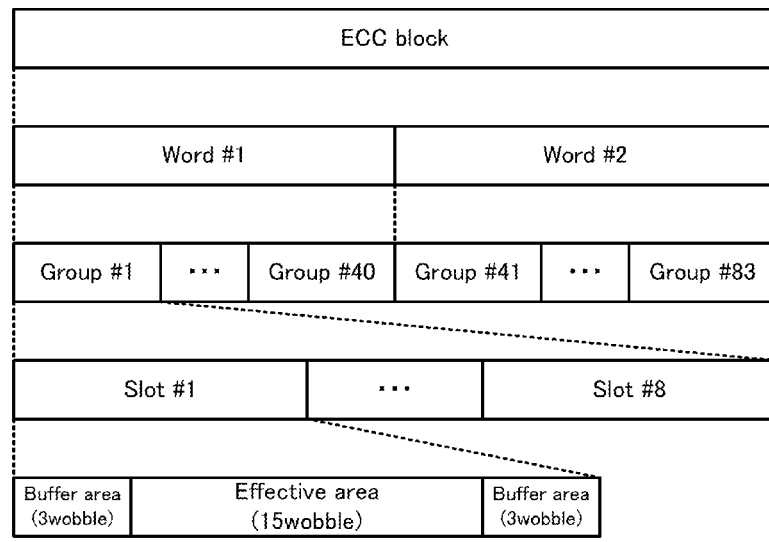
FIG. 13 is a data structure diagram illustrating a data structure of the guide layer (and further, recording layers)
Figure 14:
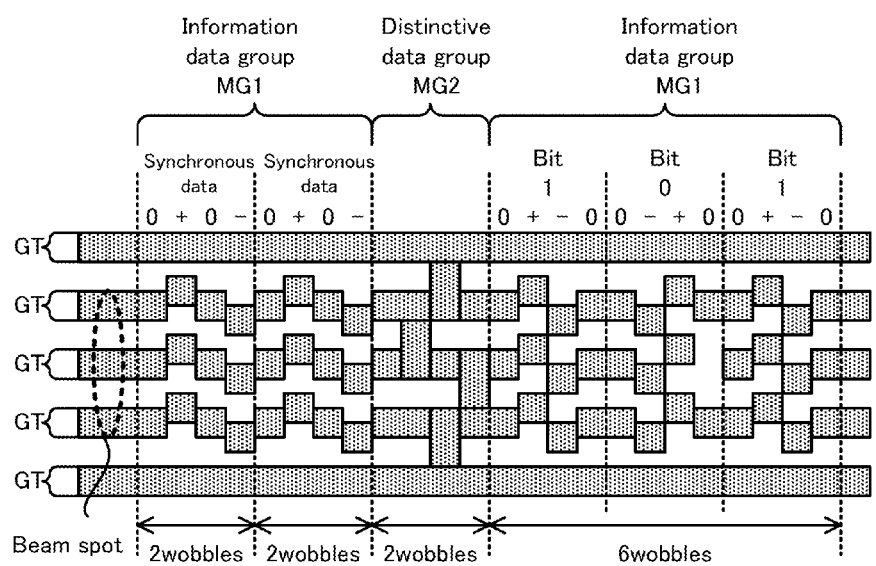
FIG. 14 is a plan view illustrating one example of the information mark groups and the distinctive mark group formed in particular slots.
Figure 15:
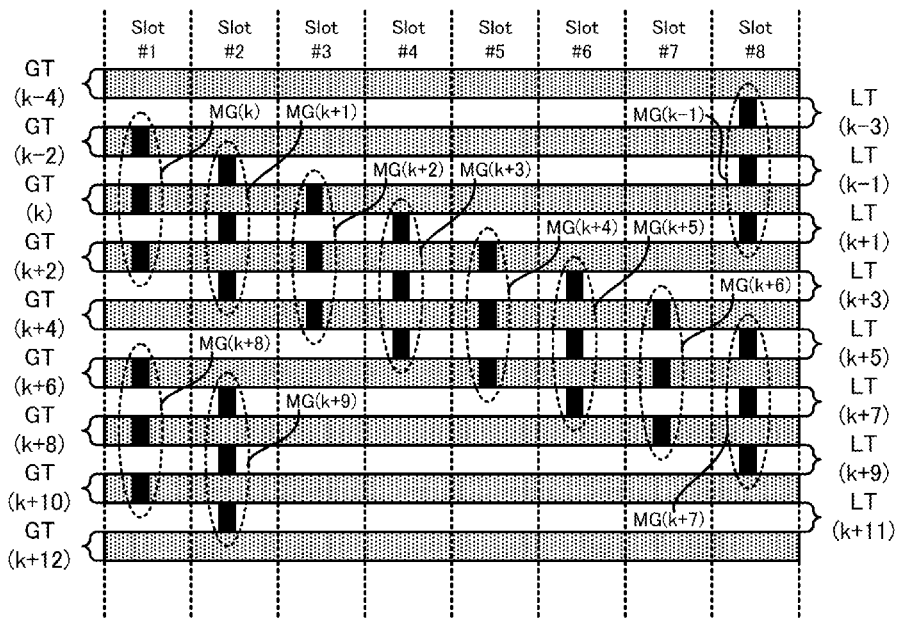
FIG. 15 is a plan view illustrating an aspect in which a plurality of information mark groups and a plurality of distinctive mark groups are distributed and recorded in a plurality of slots.

(2-3) Aspect of Distribution of Information Mark Groups and Distinctive Mark Group Next, with reference to FIG. 13 to FIG. 15, an aspect of a distribution of the information mark group MG1 and the distinctive mark group MG2 formed in the guide layer 12 will be explained. FIG. 13 is a data structure diagram illustrating a data structure of the guide layer 12 (and further, recording layers 13). FIG. 14 is a plan view illustrating one example of the information mark group MG1 and the distinctive mark group MG2 formed in particular slots. FIG. 15 is a plan view illustrating an aspect in which a plurality of information mark groups MG1 and a plurality of distinctive mark groups MG2 are distributed and recorded in a plurality of slots.

As illustrated in FIG. 13, each of the recording layers 13 is divided by a unit of ECC block. In other words, the record information recorded on the recording layer 13 is recorded by the unit of ECC block. Thus, as in the recording layers 13, the guide layer 12 is also divided by the unit of ECC block. In other words, the pre-format information (e.g. the address information, the clock information, the recording start timing information, etc.) recorded in the guide layer 12 is recorded by the unit of ECC block.

One ECC block is subdivided into two words. One word is subdivided into 40 groups or 43 groups. One group is subdivided into eight slots. One slot has a size corresponding to 21 wobbles. Incidentally, the "wobble" herein indicates, for example, a wobble defined in a Blu-ray standard. Out of the 21 wobbles, each of three wobbles corresponding to a header and three wobbles corresponding to a footer corresponds to a buffer area for preventing interference with adjacent slots. Therefore, one slot can substantially record therein information with a size corresponding to at most 15 wobbles.

As illustrated in FIG. 14, five types of information mark groups MG1 which indicates two synchronous data and three bit data are formed by using 10 wobbles out of the 15 wobbles. In addition, as illustrated in FIG. 14, a distinctive mark group MG2 for distinguishing the center track CT of three groove tracks GT on which three types of information mark groups MG1 indicating the three bit data are formed is formed by using two wobbles out of the wobbles. In other words, in the example illustrated in FIG. 14, 3-bit bit data can be recorded in one slot.

In the example illustrated in FIG. 14, one distinctive mark group MG2 is used to distinguish the center track CT of the three groove tracks GT on which the respective three type of information mark groups MG1 indicating the three bit data are formed. Therefore, after the center track CT is distinguished by using the distinctive mark group MG2 illustrated in FIG. 14, the three types of information mark groups MG1 indicating the three bit data illustrated in FIG. 14 are read.

Incidentally, in order to distinguish the center track CT of three groove tracks in another slot on which other information mark groups MG1 are formed, another distinctive mark group MG2 formed in the another slot is used. In other words, in the example, the information mark group MG1 and the distinctive mark group MG2 are associated with each other by a slot unit. The information mark group MG1 and the distinctive mark group MG2 may be associated with each other by another unit other than the slot unit.

As illustrated in FIG. 15, in the example, the unit of the slot as described above is used to record different information mark groups MG1 such that the different information mark groups MG1 are not repeatedly formed in the same rotational phase position of the same group track GT or the same land track LT. In addition, the unit of the slot as described above is used to record different distinctive mark groups MG2 such that the different distinctive mark groups MG2 are not repeatedly formed in the same rotational phase position of the same group track GT or the same land track LT. Hereinafter, the information mark group(s) MG1 which is (are) formed in the same rotational phase positions of the respective plurality of guide tracks TR whose center is the guide track TR with a track number of "k", and the distinctive mark group MG2 associated with the information mark group(s) MG1 are referred to as a mark group MG(k).

As illustrated in FIG. 15, it is assumed that the mark group MG(k) is formed in a slot #1. In this case, the mark group MG(k) is formed not only on the groove track GT with a track number of "k" but also on the groove track GT with a track number of "k−2" and the groove track GT with a track number of "k+2" in the same manner. Therefore, other mark groups MG other than the mark group MG(k) are not formed in the position of the slot #1 on the guide tracks TR which are from the groove track GT with a track number of "k−2" to the groove track GT with a track number of "k+2". By this, the mark group MG(k) and the other mark groups MG other than the mark group MG(k) are not repeatedly formed in the same rotational phase position on the same guide track TR.

On the other hand, the other mark groups MG other than the mark groups MG(k) may be formed in slots other than the slot #1, even on the guide tracks TR which are from the groove track with a track number of "k−2" to the groove track GT with a track number of "k+2". In other words, in the example, the certain mark group MG(k) and the other mark group MG (e.g. a mark group MG(k−4) to a mark group MG(k−1), and a mark group MG(k+1) to a mark group MG(k+4)) formed on the guide track TR on which the mark group MG(k) is formed are preferably formed in different slots. By this, the mark group MG(k) and the other mark group MG other than the mark group MG(k) are not repeatedly formed in the same rotational phase position on the same guide track TR.

For example, FIG. 15 illustrates that a MG(k−1) is formed in the position of a slot #8 on each of a land track LT with a track number of "k−3", the land track LT with a track number of "k−1", and the land track LT with a track number of "k+1". In the same manner, for example, FIG. 15 illustrates that a MG(k+1) is formed in the position of a slot #2 on each of the land track LT with a track number of "k−1", the land track LT with a track number of "k+1", and a land track LT with a track number of "k+3". In the same manner, for example, FIG. 15 illustrates that a MG(k+2) is formed in the position of a slot #3 on each of the groove track GT with a track number of "k", the groove track GT with a track number of "k+2", and a groove track GT with a track number of "k+4". In the same manner, for example, FIG. 15 illustrates that a MG(k+3) is formed in the position of a slot #4 on each of the land track LT with a track number of "k+1", the land track LT with a track number of "k+3", and a land track LT with a track number of "k+5". In the same manner, for example, FIG. 15 illustrates that a MG(k+4) is formed in the position of a slot #5 on the groove track GT with a track number of "k+2", the groove track GT with a track number of "k+4", and a groove track GT with a track number of "k+6". As described above, if rotational phase positions, in which the mark groups MG are formed, are separated by a unit of the slot, the mark group MG(k−1) to the mark group MG(k+4), whose record marks are formed on at least one of the guide tracks TR which are from the groove track GT with a track number of "k−2" to the groove track GT with a track number of "k+2", are not formed in a mutually overlap position (i.e. in the same rotational phase position).

Now, a brief explanation of the operation in cases where the recording/reproducing apparatus 100 traces the groove track GT with a track number of "k" (hereinafter referred to as a "groove track GT(k)", as occasion demands) will be given. In this case, the recording/reproducing apparatus 100 determines that the groove track GT(k) is the center track CT by using the distinctive mark group MG2 included in the mark groups MG(k) formed in the slot #1. The recording/reproducing apparatus 100 then reads the bit data and the like from the information mark groups MG1 included in the mark groups MG(k). Even after that, the recording/reproducing apparatus 100 continues tracing the groove track GT(k). At this time, there is also a possibility that the recording/reproducing apparatus 100 reads another mark groups which are formed in the slot #2 to the slot #8. However, according to the distinctive mark groups MG2 included in the another mark groups which are formed in the slot #2 to the slot #8, it is determined that the groove track GT(k) is not the center track CT. Therefore, the recording/reproducing apparatus 100 does not read the bit data and the like from the information mark groups MG1 included in the another mark groups which are formed in the slot #2 to the slot #8. In other words, the recording/reproducing apparatus 100 reads the bit data indicated by the information mark groups MG1 associated with the relevant distinctive mark group MG2 (in other words, included in the same slot) only in cases where the guide track TR is determined to be the center track CT.

Now, an optical disc in a comparative example in which the distinctive mark group MG2 is not formed will be explained. Even in the optical disc in the comparative example, the recording/reproducing apparatus 100 can read the bit data and the like from the information mark groups MG1 included in the mark groups MG(k) which are formed in the slot #1, by tracing the groove track GT(k). In the optical disc in the comparative example, however, the recording/reproducing apparatus 100 can also read the information mark groups MG1 included in the mark groups MG(k) which are formed in the slot #1 even by tracing a groove track GT(k−2) or a groove track GT(k+2) which are different from the groove track GT(k). In this case, if the bit data indicated by the information mark groups MG1 is the address information, there is such a risk that the recording/reproducing apparatus 100 misrecognizes the address information at a currently tracing position. In other words, there is a possibility that the recording/reproducing apparatus 100 misrecognizes that it is tracing the groove track GT(k) despite actually tracing the groove track GT(k−2) or GT(k+2). As a result, the appropriate recording operation and the appropriate reproduction operation are not likely to be performed. In the example, however, the recording/reproducing apparatus 100 does not read the information mark groups MG1 included in the mark groups MG(k) which are formed in the slot #1 if the recording/reproducing apparatus 100 traces the groove track GT(k−2) and the groove track GT(k+2) which are different from the groove track GT(k). Therefore, the technical problem of the optical disc in the comparative example does not occur.

Incidentally, shift amounts (shift quantity) of the information record marks ML1 and MR1 from the respective track centers may be unified in all the information mark groups MG1, or may be different in each information mark group MG1. For example, in the example illustrated in FIG. 15, the shift amounts of the information record marks ML1 and MR1, which constitute the information mark groups MG1 included in the mark group MG(k), from the respective track centers may be the same as or different from shift amounts of the information record marks ML1 and MR1, which constitute the information mark groups MG1 included in the other mark groups MG other than the mark group MG(k), from the respective track centers. In short, it is enough that the shift amounts of the information record marks ML1 and MR1, which constitute the information mark groups MG1, from the respective track centers are unified at least in the same information mark group MG1. For example, it is enough that the shift amounts of the information record mark ML1 and MR1, which constitute the information mark groups MG1 included in the mark group MG(k), from the respective track centers are unified at least in the information mark group MG1 included in the same mark group MG(k).

Moreover, shift amounts (shift quantity) of the distinctive record marks ML2 and MR2 from the track centers of the respective center tracks CT may be unified in all the distinctive mark groups MG2, or may be different in each distinctive mark group MG2. For example, in the example illustrated in FIG. 15, the shift amounts of the distinctive record marks ML2 and MR2, which constitute the distinctive mark group MG2 included in the mark group MG(k), from the track center of the center track CT may be the same as or different from shift amounts of the distinctive record marks ML2 and MR2, which constitute the distinctive mark group MG2 included in the other mark group MG other than the mark group MG(k), from the track centers of the respective center tracks CT. Alternatively, the shift amounts of the distinctive record marks ML2 and MR2 from the track center of the center track CT may be different in the same distinctive mark group MG2. For example, in the example illustrated in FIG. 15, the shift amounts of first distinctive record marks ML2 and MR2, which constitute the distinctive mark group MG2 included in the mark group MG(k), from the track center of the center track CT may be different from the shift amount of second distinctive record marks ML2 and MR2, which constitute the distinctive mark group MG2 included in the mark group MG(k), from the tack center of the center track CT.

(2-4) Characteristics of Information Mark Groups and Distinctive Mark Groups

Next, the characteristics of the information mark group MG1 and the distinctive mark group MG2 in the example will be explained.

Firstly, as described above, regardless of the presence/absence of the information mark group MG1 and the distinctive mark group MG2, the push-pull signal according to a positional relation between the center of the beam spot of the guide laser light LB1 and the track centers of the guide tracks TR is obtained from the return light of the guide laser light LB1 which traces the guide tracks TR. As a result, tracking control based on the push-pull signal is performed.

On the other hand, the signal level of the push-pull signal, which is obtained from the return light of the guide laser light LB1 which traces the guide tracks TR on which the information mark groups MG1 are formed, varies depending on the pattern of the information record marks ML1 and MR1 which constitute the information mark groups MG1 (refer to FIG. 4, and FIG. 6). In other words, in the example, the signal level of the push-pull signal varies depending on the positional relation between the spot center of the beam spot of the guide laser light LB1 and the information record marks ML1 and MR1 which constitute the information mark groups MG1. However, each of the information mark groups MG1 is made of the pair of information record marks ML1 and MR1 which are equidistantly shifted toward the left side and the right side, respectively, from the track center, and thus, an average value (i.e. an integrated value) of the variation of the signal level of the push-pull signal is zero. Therefore, even if the information mark groups MG1 are formed on the guide tracks TR, the information mark groups MG1 hardly have or do not have a significant adverse influence on the tracking control based on the push-pull signal (e.g. an adverse influence by which the normal tracking control cannot be performed). Therefore, even if the information mark groups MG1 are formed on the guide tracks TR, the tracking control is preferably performed, substantially as in cases where the information mark groups MG1 are not formed on the guide tracks TR.

In addition, as described above, various data (e.g. the synchronous data and the bit data described above) is read from the variation of the signal level of the push-pull signal. In other words, in the example, by forming in the guide layer 12 the information mark groups MG1 each of which includes the pair of information record marks ML1 and MR1, it is possible to record the various data read by using the push-pull signal. That is, in the example, by forming in the guide layer 12 the information mark groups MG1 each of which includes the pair of information record marks ML1 and MR1, it is possible to record into the guide layer 12 the various data that does not have to be read by using an RF signal.

In addition, the signal level of the push-pull signal, which is obtained from the return light of the guide laser light LB1 which traces the guide tracks TR on which the distinctive mark group MG2 is formed, varies depending on the pattern of the distinctive record marks ML2 and MR2 which constitute the distinctive mark group MG2 (refer to FIG. 8 and FIG. 11). In other words, in the example, the signal level of the push-pull signal varies depending on the positional relation between the spot center of the beam spot of the guide laser light LB1 and the distinctive record marks ML2 and MR2 which constitute the distinctive mark group MG2. However, the distinctive mark group MG2 is made of the pair of distinctive record marks ML2 and MR2 which are equidistantly shifted toward the left side and the right side, respectively, from the track center of the center track CT, and thus, an average value (i.e. an integrated value) of the variation of the signal level of the push-pull signal is zero. Therefore, even if the distinctive mark group MG2 is formed on the guide tracks TR, the distinctive mark group MG2 hardly has or does not have a significant adverse influence on the tracking control based on the push-pull signal (e.g. an adverse influence by which the normal tracking control cannot be performed). Therefore, even if the distinctive mark group MG2 is formed on the guide tracks TR, the tracking control is preferably performed, substantially as in cases where the distinctive mark group MG2 is not formed on the guide tracks TR.

In addition, as described above, it is possible to preferably determine whether or not the currently traced guide track TR is the center track CT, from the variation of the signal level of the push-pull signal. In other words, in the example, by forming in the guide layer 12 the distinctive mark group MG2 which includes the pair of distinctive record marks ML2 and MR2, it is possible to distinguish the center track CT by using the push-pull signal. That is, in the example, by forming in the guide layer 12 the distinctive mark group MG2 which includes the pair of distinctive record marks ML2 and MR2, it is possible to distinguish the center track CT without using the RF signal.

Figure 16:
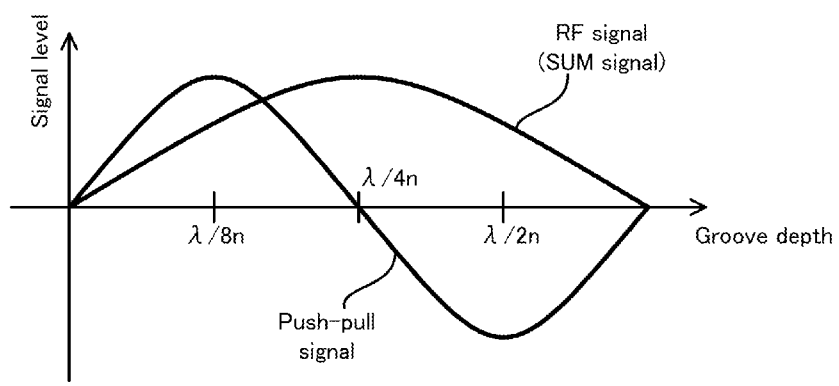
FIG. 16 is a graph illustrating a relation between a depth of concave portions of the groove tracks (i.e. a relative depth of the groove tracks with respect to the land tracks) and the signal level of a push-pull signal, and a relation between the depth and the signal level of a RF signal.

Now, with reference to FIG. 16, an explanation of an advantage realized by reading the information mark groups MG1 and the distinctive mark group MG2 formed in the guide layer 12 from the push-pull signal used for the tracking control will be given. FIG. 16 is a graph illustrating a relation between a depth of concave portions of the groove tracks GT (i.e. a relative depth of the groove tracks GT with respect to the land tracks LT) and the signal level of the push-pull signal, and a relation between the depth and a signal level of an RF signal.

As illustrated in FIG. 16, the signal level of the push-pull signal which is used for the tracking control is the best when the depth of the groove tracks GT is $\lambda/8n$ (i.e. $\lambda \div (8 \times n)$). On the other hand, the signal level of the RF signal which is not used for the tracking control is the best when the depth of the groove tracks GT is $\lambda/4n$ (i.e. $\lambda \div (4 \times n)$). If the mark groups which need to be read by using the RF signal are formed, it is necessary to consider not only the signal level (i.e. signal characteristics) of the push-pull signal but also the signal level (i.e. signal characteristics) of the RF signal.

In the example, however, the information mark groups MG1 and the distinctive mark group MG2, which can be read by using the push-pull signal originally used for the tracking control, are recorded in the guide layer 12. Therefore, it is enough to consider the signal level (i.e. signal characteristics) of the push-pull signal. In other words, it is not necessary to consider the signal level (i.e. signal characteristics) of the RF signal.

Thus, in the example, the depth of the groove tracks GT (moreover, the depth of the information record marks ML1 and MR1, and the depth of the distinctive record marks ML2 and MR2) may be set to be less than $\lambda/6n$. This provides preferable signal characteristics of the push-pull signal, and thus, the tracking control is preferably performed, and the information mark groups MG1 and the distinctive mark group MG2 are preferably read.

Alternatively, the depth of the groove tracks GT (moreover, the depth of the information record marks ML1 and MR1, and the depth of the distinctive record marks ML2 and MR2) may be set to be equal to $\lambda/8n$. This provides the best signal characteristics of the push-pull signal, and thus, the tracking control is preferably performed, and the information mark groups MG1 and the distinctive mark groups MG2 are preferably read.

Figure 17:
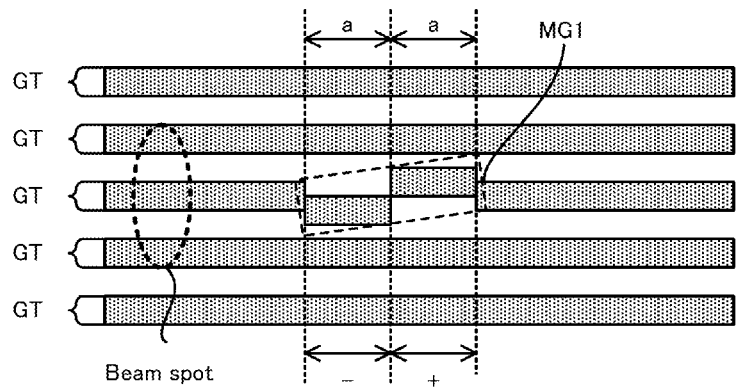
FIG. 17 is a plan view illustrating a comparative example in which the information mark group is formed on a single groove track.
Figure 18:
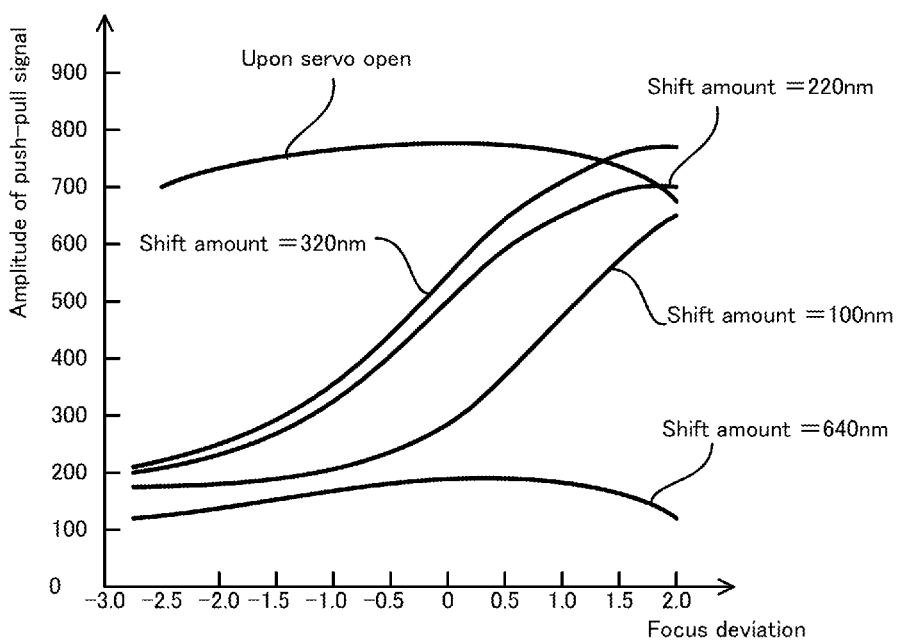
FIG. 18 is a graph illustrating a relation between a focus deviation and the amplitude of the push-pull signal.
Figure 19A:
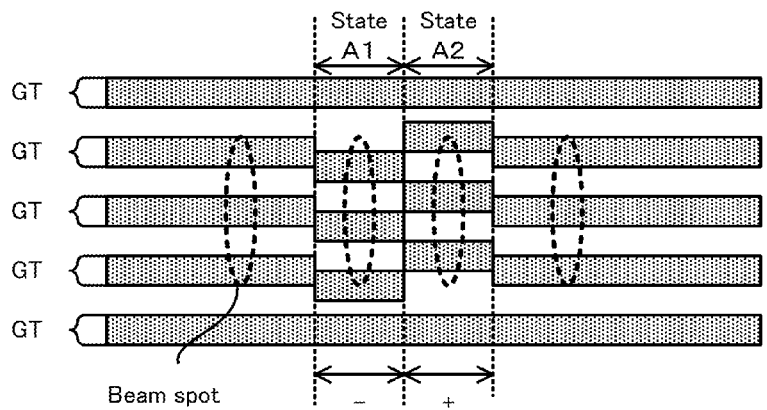
FIG. 19A to FIG. 19C are plan views illustrating a positional relation among a pair of information record marks, the groove track(s), and a beam spot of the guide laser light on the guide layer.
Figure 19B:
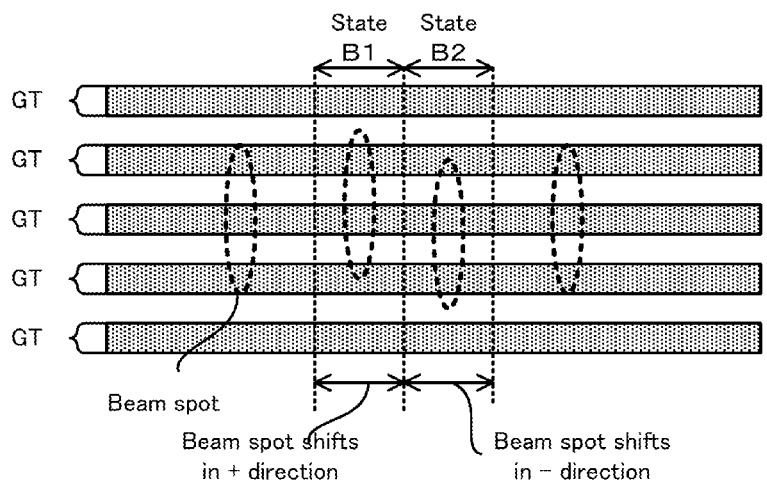
Figure 19C:
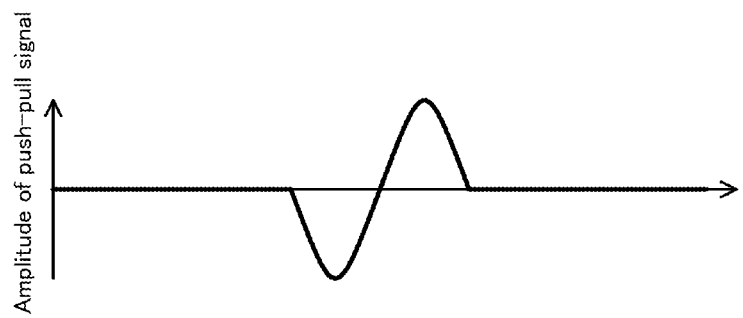

In addition, in the example, the same information mark group MG1 is formed in the same rotational phase position of each of the plurality of groove tracks GT. In the same manner, in the example, the same information mark group MG1 is formed in the same rotational phase position of each of the plurality of land tracks LT. Thus, it is possible to reduce a dependence on a focus deviation (focus offset) of the guide laser light LB1 (specifically, to preferably read the pre-format information indicated by the information mark groups MG1 even if the focus deviation is increased). Hereinafter, with reference to FIG. 17 to FIG. 19, an explanation of an effect of reducing the dependence on the focus deviation will be given. FIG. 17 is a plan view illustrating a comparative example in which the information mark group MG1 is formed on a single groove track. FIG. 18 is a graph illustrating a relation between the focus deviation and the amplitude of the push-pull signal. FIG. 19A to FIG. 19C are plan views illustrating a positional relation among the pair of information record marks ML1 and MR1, the groove track(s) GT, and the beam spot of the guide laser light LB1 in the guide layer 12.

As illustrated in FIG. 17, it is assumed that the information mark group MG1 is formed on a single groove track GT. At this time, the amplitudes of the push-pull signals are illustrated in FIG. 18, in the case where the shift amount of the pair of the information record mark ML1 and MR1, which constitute the information mark group MG1, from the track center is set to four types of 100 nm, 200 nm, 320 nm and 640 nm. As is clear from FIG. 18, in the comparative example in which the information mark group MG1 is formed on the single groove track GT, as the focus deviation increases (e.g. increases in a negative direction in FIG. 18), the amplitude of the push-pull signal decreases. As a result, there is a possibility that the tracking control is not preferably performed, and that the pre-format information recorded in the guide layer 12 using the information mark group MG1 cannot be preferably read. This is supposedly because only one information mark group MG1 cannot be preferably read if the degree of defocus becomes stronger in accordance with an increasing focus deviation.

On the other hand, according to the example, the same information mark group MG1 is formed in the same rotational phase position of each of the plurality of groove tracks GT (or the plurality of land tracks LT), and thus, the amplitude of the push-pull signal is substantially the same as the amplitude of the push-pull signal which is obtained in a tracking servo open state. In other words, the dependence on the focus deviation of the amplitude of the push-pull signal in the example is substantially the same as the dependence on the focus deviation of the amplitude of the push-pull signal in the tracking servo open state. As a result, in the example, the tracking control is preferably performed, and the pre-format information recorded in the guide layer 12 using the information mark groups MG1 is preferably read.

Here, the state of the beam spot of the guide laser light LB1 when tracing the information record mark MR1 which is shifted to the right side from the track center (refer to a state A1 in FIG. 19A) is substantially the same as the state of the beam spot of the guide laser light LB1 which is shifted to the left side (shifted by about 270 degrees in phase) from the track center in the tracking servo open state (refer to a state B1 in FIG. 19B). In the same manner, the state of the beam spot of the guide laser light LB1 when tracing the information record mark ML1 which is shifted to the left side from the track center (refer to a state A2 in FIG. 19A) is substantially the same as the state of the beam spot of the guide laser light LB1 which is shifted to the right side (shifted by about 90 degrees in phase) from the track center in the tracking servo open state (refer to a state B2 in FIG. 19B). Therefore, the waveform of the push-pull signal obtained from the guide laser light LB1 in the state illustrated in FIG. 19A is substantially the same as the waveform of the push-pull signal obtained from the guide laser light LB1 illustrated in FIG. 19B (refer to FIG. 19C). Thus, as described above, the dependence on the focus deviation of the amplitude of the push-pull signal in the example is substantially the same as the dependence on the focus deviation of the amplitude of the push-pull signal in the tracking servo open state.

Incidentally, in each of the technologies or techniques disclosed in the aforementioned patent documents 3 and 6 to 11, in order to record single data onto the single record track, record pits or wobbles which are formed on the single record track are merely shifted from side to side as illustrated in FIG. 17. In other words, the technologies or techniques disclosed in the aforementioned patent documents 3 and 6 to 11 are different from the example, because the same data is not recorded in the same rotational phase position of the plurality of record tracks (in other words, because pits or wobbles indicating the same data are not formed) in the technologies or techniques disclosed in the aforementioned patent documents 3 and 6 to 11.

In addition, in the example, the width of each of the distinctive record marks ML2 and MR2 is twice or more the width of the guide track TR. Thus, even in the distinctive mark group MG2, as in the information mark groups MG1, it is possible to reduce the dependence on the focus deviation (focus offset) of the guide laser light LB1 (specifically, to preferably read the distinctive mark group MG2 even if the focus deviation is increased).

Incidentally in each of the technologies or techniques disclosed in the aforementioned patent documents 2 to 5, the record pits each having the same width as that of the record track are merely formed. In other words, the technologies or techniques disclosed in the aforementioned patent documents 2 to 5 are different from the example, because the record pits each having a width which is twice or more the width of the record track are not formed in the technologies or techniques disclosed in the aforementioned patent documents 2 to 5.

In addition, according to the example, the information mark groups MG1 are formed on both the groove tracks GT and the land tracks LT. Thus, in comparison with an optical disc in which the information mark groups MG1 are formed only on either the groove tracks GT or the land track LT, it is possible to increase the size of the pre-format information which can be recorded in the guide layer 12. This further facilitates the reading of the pre-format information recorded in the guide layer 12, in comparison with the optical disc in which the information mark groups MG1 are formed only on either the groove tracks GT or the land track LT.

In addition, according to the example, the distinctive mark groups MG2 are formed on both the groove tracks GT and the land tracks LT. Thus, in comparison with an optical disc in which the distinctive mark group MG2 is formed only on either the groove tracks GT or the land track LT, the determination of whether or not to be the center track CT is performed for both the groove tracks GT and the land tracks LT. Thus, even if the information mark groups MG1 are formed on both the groove tracks GT and the land tracks LT, the information mark groups MG1 are preferably read.

In addition, according to the example, the information mark group MG1, which constitutes the synchronous data, includes the information record mark MC1 located on the track center in addition to the pair of information record marks ML1 and MR1. Thus, even if a reference value of the signal level of the push-pull signal (e.g. zero level) varies, the variation in the signal level of the push-pull signal according to the pair of information record marks ML1 and MR1 can be preferably recognized. Hereinafter, with reference to FIG. 20, an explanation of the advantage that the variation in the signal level of the push-pull signal according to the pair of information record marks ML1 and MR1 can be preferably recognized even if the reference value of the signal level of the push-pull signal varies will be given. FIG. 20 are graphs illustrating the push-pull signal obtained from the information mark group MG1 which constitutes the synchronous data, and which includes the pair of information record marks ML1 and MR1 and the information record mark MC1 located on the track center.

Figure 20A:
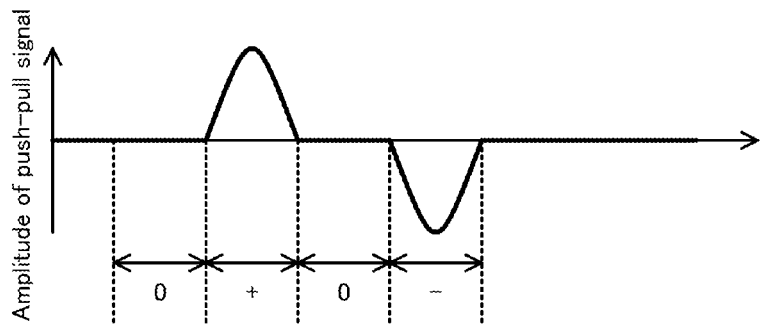
FIG. 20A and FIG. 20B are graphs illustrating the push-pull signal obtained from the information mark group which constitutes the synchronous data and which includes a pair of information record marks and an information record mark located on a track center.

As illustrated in FIG. 20A, if the reference value of the signal level of the push-pull signal does not vary, the variation of the signal level of the push-pull signal according to the pair of information record marks ML1 and MR1 are preferably recognized by using a so-called default zero level.

Figure 20B:
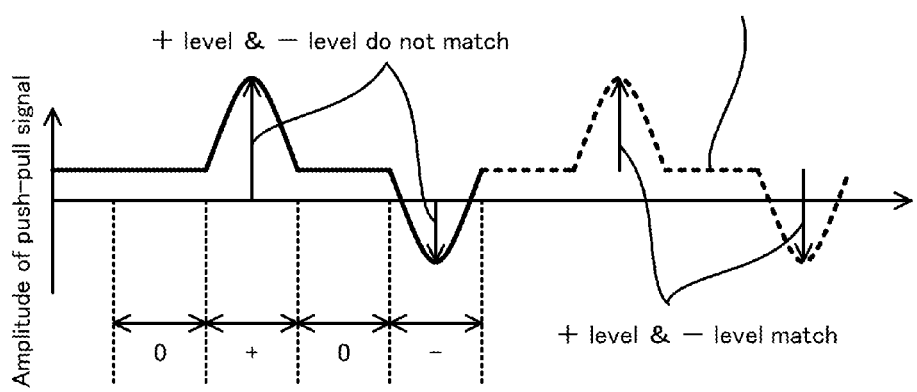

On the other hand, as illustrated by a solid line on the left side of FIG. 20B, if the reference value of the signal level of the push-pull signal varies (e.g. is shifted in the positive direction), the use of the so-called default zero level may make the signal level of the push-pull signal according to the information record mark ML1 different from the signal level of the push-pull signal according to the information record mark MR1. This may result in a reduction in reliability of the reading of the information record marks ML1 and MR1 based on the push-pull signal.

In the example, however, as illustrated by a dashed line on the right side of FIG. 20B, it is possible to adjust the reference value of the signal level of the push-pull signal by using the signal level of the push-pull signal according to the information record mark MC1 located on the track center. Therefore, even if the reference value of the signal level of the push-pull signal (e.g. zero level) varies, the variation of the signal level of the push-pull signal according to the pair of information record marks ML1 and MR1 can be preferably recognized.

(3) Modified Examples

Next, with reference to FIG. 21 to FIG. 28, modified examples of the optical disc 11 in the example will be explained. Incidentally, hereinafter, each example corresponds to a modified example of the distinctive mark group MG2.

(3-1) First Modified Example

Figure 21:
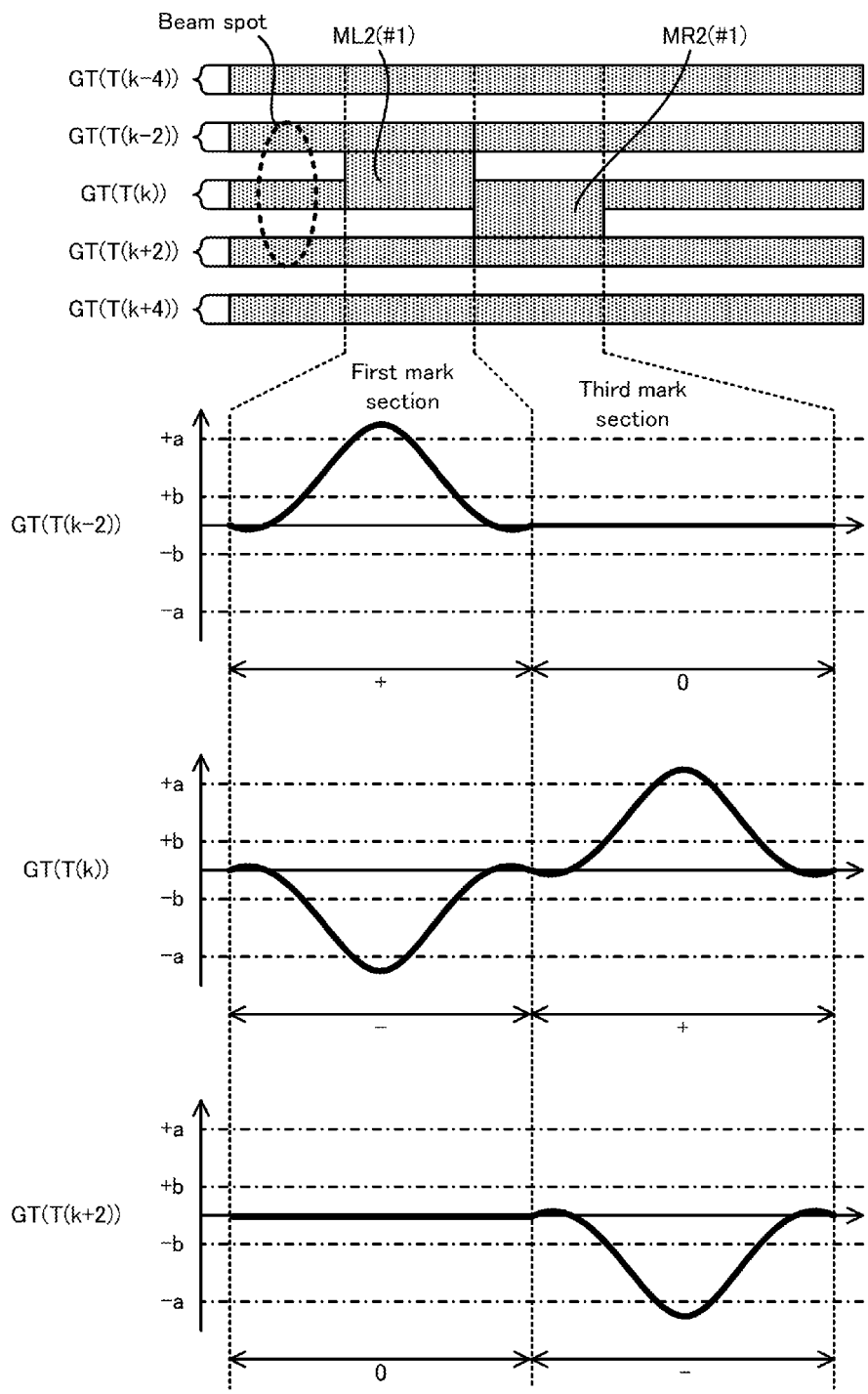
FIG. 21 is graphs illustrating the signal level of push-pull signals obtained from return light of the guide laser light which traces the groove track on which a distinctive mark group in a first modified example is formed, in association with a configuration of the distinctive mark group in the first modified example formed on the groove track.
Figure 22:
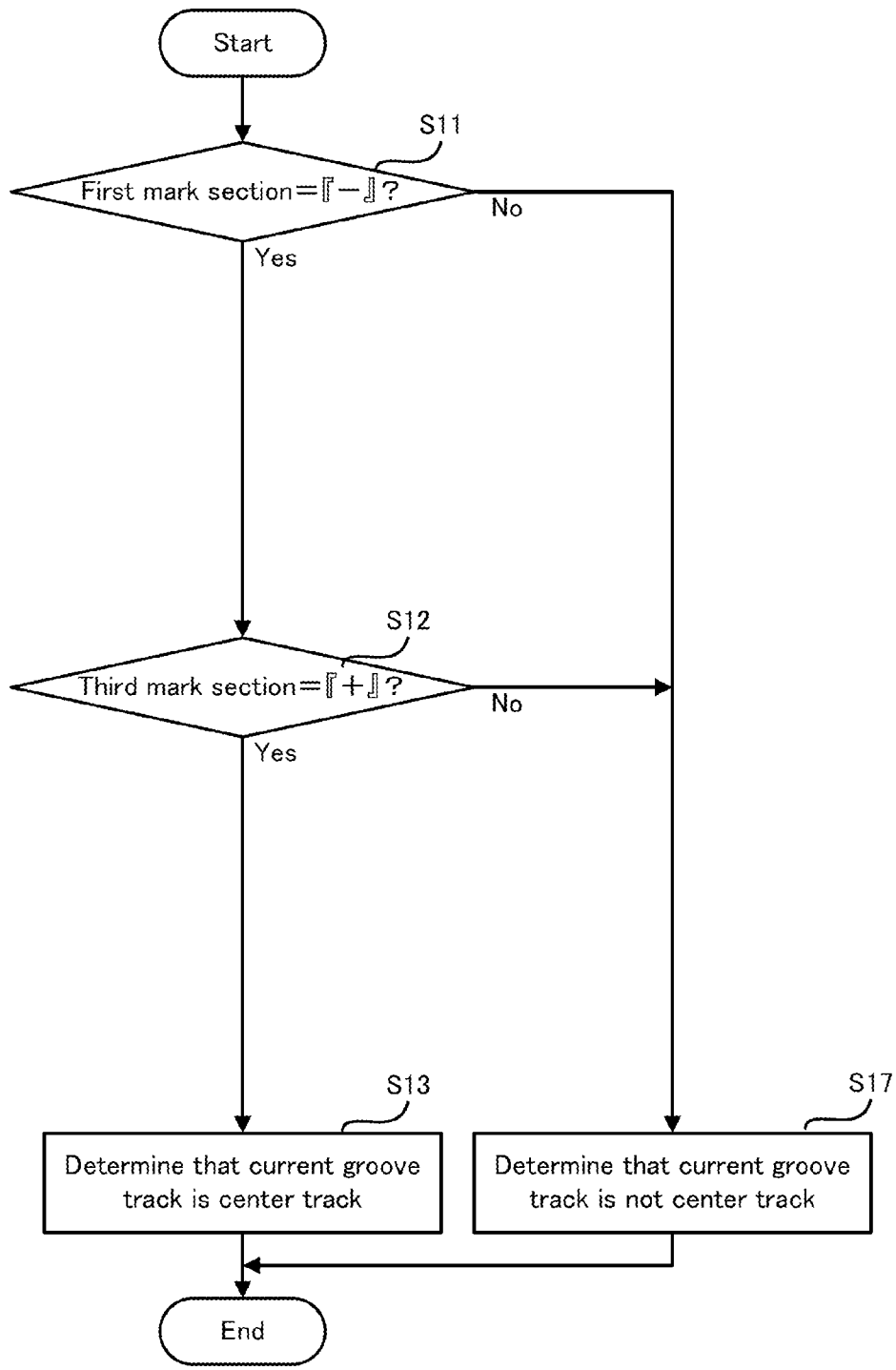
FIG. 22 is a flowchart illustrating an operation of distinguishing the center track by using the distinctive mark group in the first modified example illustrated in FIG. 21.

Firstly, with reference to FIG. 21 and FIG. 22, a first modified example will be explained. FIG. 21 is graphs illustrating the signal level of push-pull signals obtained from return light of the guide laser light LB1 which traces the groove track GT on which a distinctive mark group MG2 in a first modified example is formed, in association with a configuration of the distinctive mark group MG2 in the first modified example formed on the groove track GT. FIG. 22 is a flowchart illustrating an operation of distinguishing the center track CT by using the distinctive mark group MG2 in the first modified example illustrated in FIG. 21.

As illustrated in FIG. 21, in the first modified example, the distinctive mark group MG2 formed on the groove track GT includes only one pair of distinctive record marks ML2 and MR2 formed in different rotational phase positions, but does not include a pair of distinctive record marks ML2 and MR2 formed in the same rotational phase position. In other words, the distinctive mark group MG2 in the first modified example is different from the aforementioned distinctive mark group MG2 (refer to FIG. 7 and FIG. 8), because the distinctive mark group MG2 in the first modified example includes a distinctive record mark ML2(#1) corresponding to the first mark section and a distinctive record mark MR2(#1) corresponding to the third mark section but does not include a pair of distinctive record marks ML2(#2) and MR2(#2) corresponding to the second mark section.

In the first modified example, as illustrated in the first graph in FIG. 21, the signal level of the push-pull signal generated from the return light of the guide laser light LB1 which traces the groove track GT with a track number of "k−2" indicates that the first mark section is the "+ section" and that the third mark section is the "0 section".

In the same manner, as illustrated in the second graph in FIG. 21, the signal level of the push-pull signal generated from the return light of the guide laser light LB1 which traces the groove track GT with a track number of "k" indicates that the first mark section is the "− section" and that the third mark section is the "+ section".

In the same manner, as illustrated the third graph in FIG. 21, the signal level of the push-pull signal generated from the return light of the guide laser light LB1 which traces the groove track GT with a track number of "k+2" indicates that the first mark section is the "0 section" and that the third mark section is the "− section".

In this case, in order to determine whether or not the groove track GT traced by the guide laser light LB1 is the center track CT, as illustrated in FIG. 22, firstly, it is determined whether or not the first mark section is the "− section" (step S11).

As a result of the determination in the step S11, if it is determined that the first mark section is the "− section" (the step S11: Yes), then, it is determined whether or not the third mark section is the "+ section" (step S12).

As a result of the determination in the step S12, if it is determined that the third mark section is the "+ section" (the step S12: Yes), it is determined that the groove track GT currently traced by the guide laser light LB1 is the center track CT (step S13).

On the other hand, as a result of the determination in the step S12, if it is determined that the third mark section is not the "+ section" (the step S12: No), it is determined that the groove track GT currently traced by the guide laser light LB1 is not the center track CT (step S17).

On the other hand, as a result of the determination in the step S11, if it is determined that the first mark section is not the "− section" (the step S11: Yes), it is determined that the groove track GT currently traced by the guide laser light LB1 is not the center track CT (the step S17).

An example in cases where the operation illustrated in FIG. 22 is specifically applied to the distinctive mark group MG2 illustrated in FIG. 21 will be explained below.

The signal level of the push-pull signal generated from the return light of the guide laser light LB1 which traces the groove track GT with a track number of "k−2" indicates that the first mark section is the "+ section" and that the third mark section is the "0 section". Therefore, in this case, it is determined that the first mark section is not the "− section" (the step S11: No). Therefore, it is determined that the groove track GT currently traced by the guide laser light LB1 (i.e. the groove track GT with a track number of "k−2") is not the center track CT (the step S17).

Then, the signal level of the push-pull signal generated from the return light of the guide laser light LB1 which traces the groove track GT with a track number of "k" indicates that the first mark section is the "− section" and that the third mark section is the "+ section". Therefore, in this case, it is determined that the first mark section is the "− section" (the step S11: Yes) and it is determined that the third mark section is the "+ section" (the step S12: Yes). Therefore, it is determined that the groove track GT currently traced by the guide laser light LB1 (i.e. the groove track GT with a track number of "k") is the center track CT (the step S13).

In the same manner, the signal level of the push-pull signal generated from the return light of the guide laser light LB1 which traces the groove track GT with a track number of "k+2" indicates that the first mark section is the "0 section" and that the third mark section is the "− section". Therefore, in this case, it is determined that the first mark section is not the "− section" (the step S11: No). Therefore, it is determined that the groove track GT currently traced by the guide laser light LB1 (i.e. the groove track GT with a track number of "k+2") is not the center track CT (the step S17).

As described above, even in the first modified example, the center track CT is preferably distinguished by using the distinctive mark group MG2.

Particularly in the first modified example, only one pair of distinctive record marks ML2 and MR2 (i.e. only two distinctive record marks ML2 and MR2) is used to determine whether or not the groove track GT traced by the guide laser light LB1 is the center track CT. Thus, the size of an area in which the distinctive mark group MG2 is formed (e.g. a length in the direction of travel of the groove track GT) can be set to be relatively short.

In addition, in the first modified example, it is possible to form the distinctive mark group MG2 so as to be included in five guide tracks TR (i.e. from the guide track TR with a track number of k−2 to the guide track TR with a track number of k+2). Thus, if different distinctive mark groups MG2 are formed in the same rotational phase position of different guide tracks TR, it is possible to relatively narrow the interval between the different distinctive mark groups MG2.

In addition, in the first modified example, the operation for determining whether or not the groove track GT traced by the guide laser light LB1 is the center track CT (in other words, algorithm and the operation illustrated in FIG. 21) is relatively simplified.

(3-2) Second Modified Example

Figure 23:
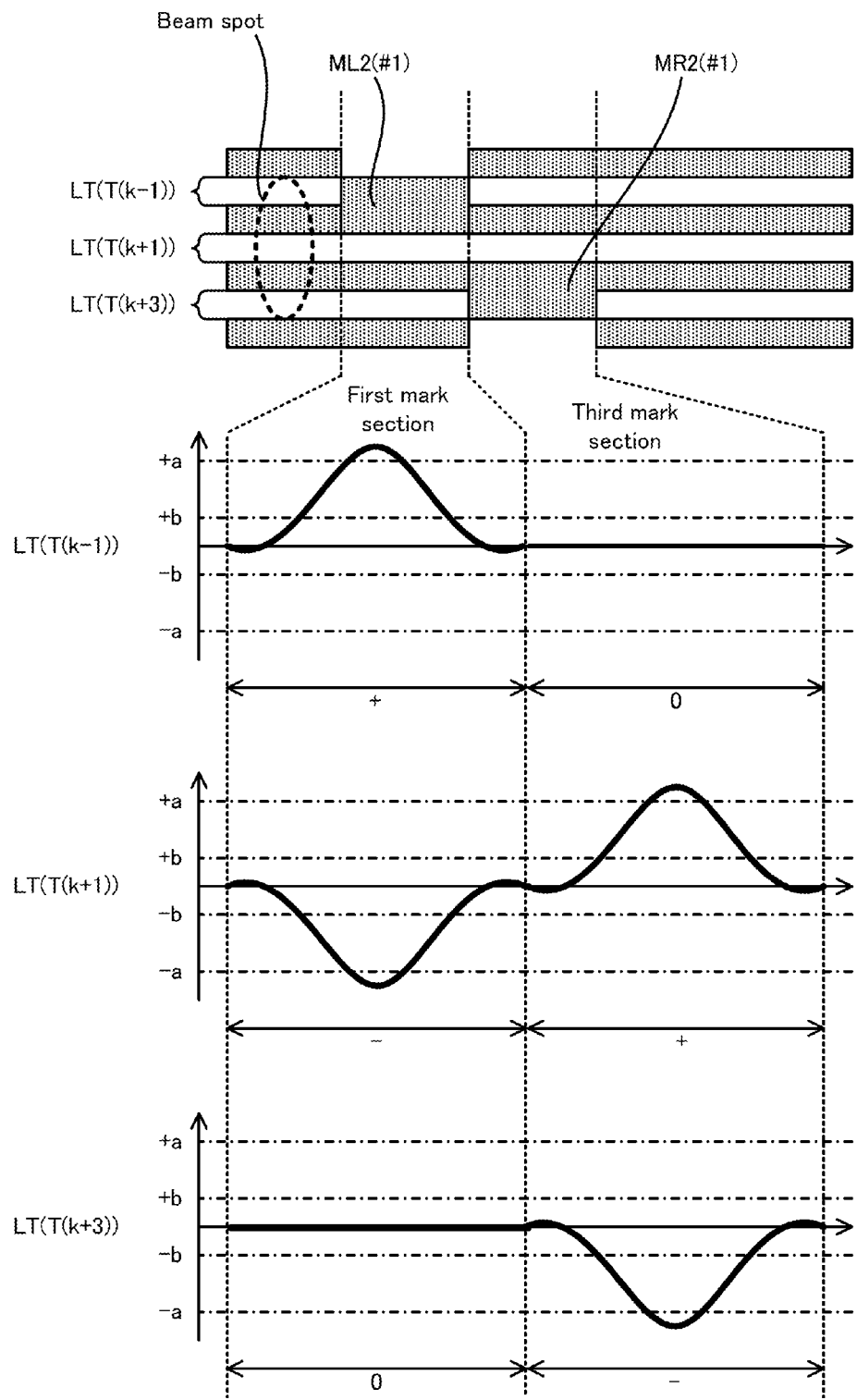
FIG. 23 is graphs illustrating the signal level of push-pull signals obtained from return light of the guide laser light which traces the land tracks on which a distinctive mark group in a second modified example is formed, in association with a configuration of the distinctive mark group in the second modified example formed on the land tracks.
Figure 24:
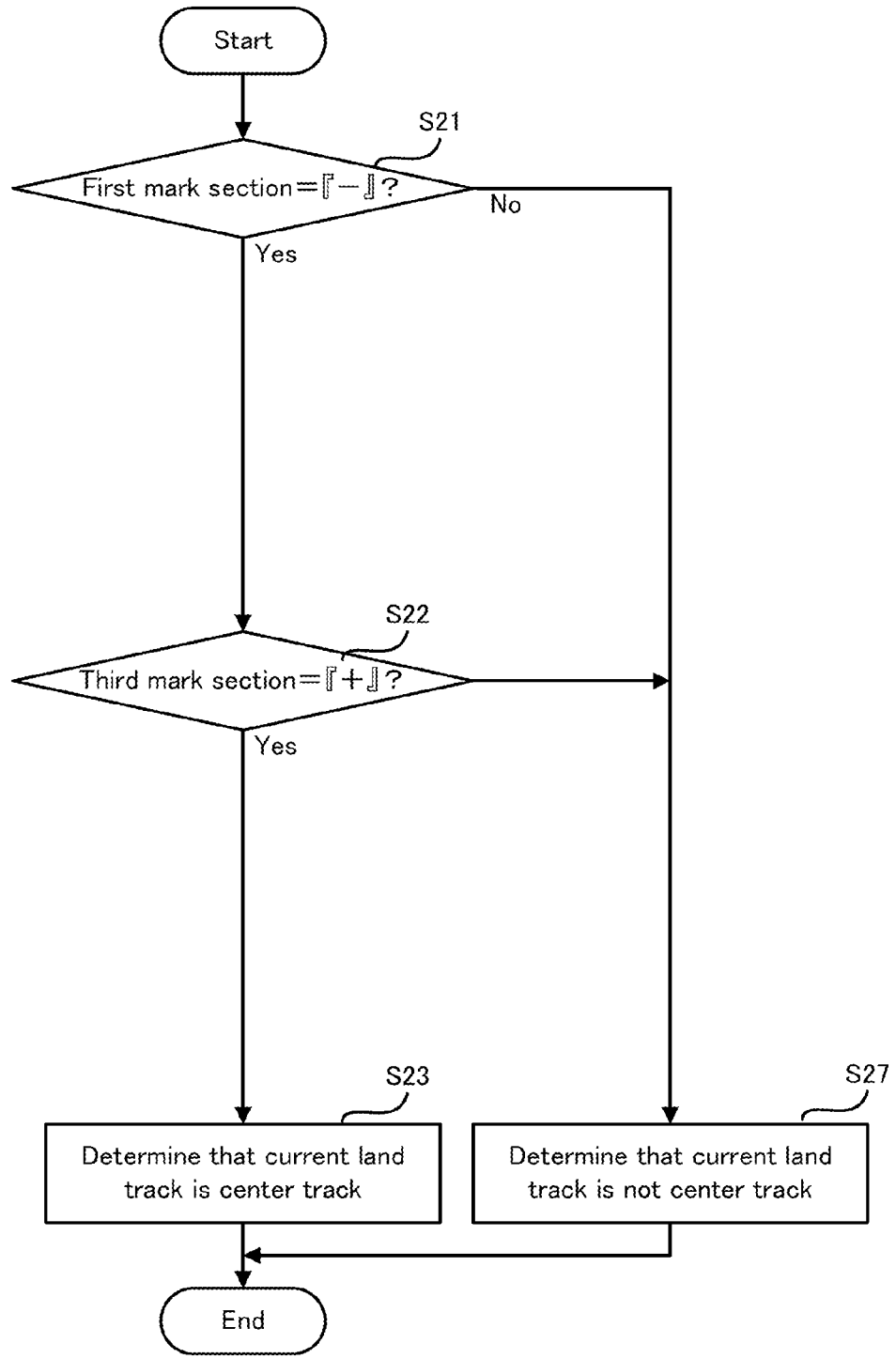
FIG. 24 is a flowchart illustrating an operation of distinguishing the center track by using the distinctive mark group in the second modified example illustrated in FIG. 23.

Next, with reference to FIG. 23 and FIG. 24, a second modified example will be explained. FIG. 23 is graphs illustrating the signal level of push-pull signals obtained from return light of the guide laser light LB1 which traces the land tracks LT on which a distinctive mark group MG2 in a second modified example is formed, in association with a configuration of the distinctive mark group MG2 in the second modified example formed on the land tracks LT. FIG. 24 is a flowchart illustrating an operation of distinguishing the center track CT by using the distinctive mark group MG2 in the second modified example illustrated in FIG. 23.

As illustrated in FIG. 23, in the second modified example, the distinctive mark group MG2 formed on the land tracks LT includes only one pair of distinctive record marks ML2 and MR2 formed in different rotational phase positions, but does not include a pair of distinctive record marks ML2 and MR2 formed in the same rotational phase position. In other words, the distinctive mark group MG2 in the second modified example is different from the aforementioned distinctive mark group MG2 (refer to FIG. 10 and FIG. 11), because the distinctive mark group MG2 in the second modified example includes a distinctive record mark ML2(#1) corresponding to the first mark section and a distinctive record mark MR2(#1) corresponding to the third mark section but does not include a pair of distinctive record marks ML2(#2) and MR2(#2) corresponding to the second mark section.

In the second modified example, as illustrate in the first graph in FIG. 23, the signal level of the push-pull signal generated from the return light of the guide laser light LB1 which traces the land track LT with a track number of "k−1" indicates that the first mark section is the "+ section" and that the third mark section is the "0 section".

In the same manner, as illustrated in the second graph in FIG. 23, the signal level of the push-pull signal generated from the return light of the guide laser light LB1 which traces the land track LT with a track number of "k+1" indicates that the first mark section is the "− section" and that the third mark section is the "+ section".

In the same manner, as illustrated in the third graph in FIG. 23, the signal level of the push-pull signal generated from the return light of the guide laser light LB1 which traces the groove track GT with a track number of "k+3" indicates that the first mark section is the "0 section" and that the third mark section is the "− section".

In this case, in order to determine whether or not the land track LT traced by the guide laser light LB1 is the center track CT, as illustrated in FIG. 24, firstly, it is determined whether or not the first mark section is the "− section" (step S21).

As a result of the determination in the step S21, if it is determined that the first mark section is the "− section" (the step S21: Yes), then, it is determined whether or not the third mark section is the "+ section" (step S22).

As a result of the determination in the step S22, if it is determined that the third mark section is the "+ section" (the step S22: Yes), it is determined that the land track LT currently traced by the guide laser light LB1 is the center track CT (step S23).

On the other hand, as a result of the determination in the step S22, if it is determined that the third mark section is not the "+ section" (the step S22: No), it is determined that the land track LT currently traced by the guide laser light LB1 is not the center track CT (step S27).

As a result of the determination in the step S21, if it is determined that the first mark section is not the "− section" (the step S21: No), it is determined that the land track LT currently traced by the guide laser light LB1 is not the center track CT (the step S27).

An example in cases where the operation illustrated in FIG. 24 is specifically applied to the distinctive mark group MG2 illustrated in FIG. 23 will be explained below.

The signal level of the push-pull signal generated from the return light of the guide laser light LB1 which traces the land track LT with a track number of "k−1" indicates that the first mark section is the "+ section" and that the third mark section is the "0 section". Therefore, in this case, it is determined that the first mark section is not the "− section" (the step S21: No). Therefore, it is determined that the land track LT currently traced by the guide laser light LB1 (i.e. the land track LT with a track number of "k−1") is not the center track CT (the step S27).

Then, the signal level of the push-pull signal generated from the return light of the guide laser light LB1 which traces the land track LT with a track number of "k+1" indicates that the first mark section is the "− section" and that the third mark section is the "+ section". Therefore, in this case, it is determined that the first mark section is the "− section" (the step S21: Yes) and it is determined that the third mark section is the "+ section" (the step S22: Yes). Therefore, it is determined that the land track LT currently traced by the guide laser light LB1 (i.e. the land track LT with a track number of "k+1") is the center track CT (the step S23).

In the same manner, the signal level of the push-pull signal generated from the return light of the guide laser light LB1 which traces the land track LT with a track number of "k+3" indicates that the first mark section is the "0 section" and that the third mark section is the "− section". Therefore, in this case, it is determined that the first mark section is not the "− section" (the step S21: No). Therefore, it is determined that the land track LT currently traced by the guide laser light LB1 (i.e. the land track LT with a track number of "k+3") is not the center track CT (the step S27).

As described above, even in the second modified example, the center track CT is preferably distinguished by using the distinctive mark group MG2. In addition, even in the second modified example, it is possible to preferably receive various benefits which can be received in the first modified example.

(3-3) Third Modified Example

Figure 25:
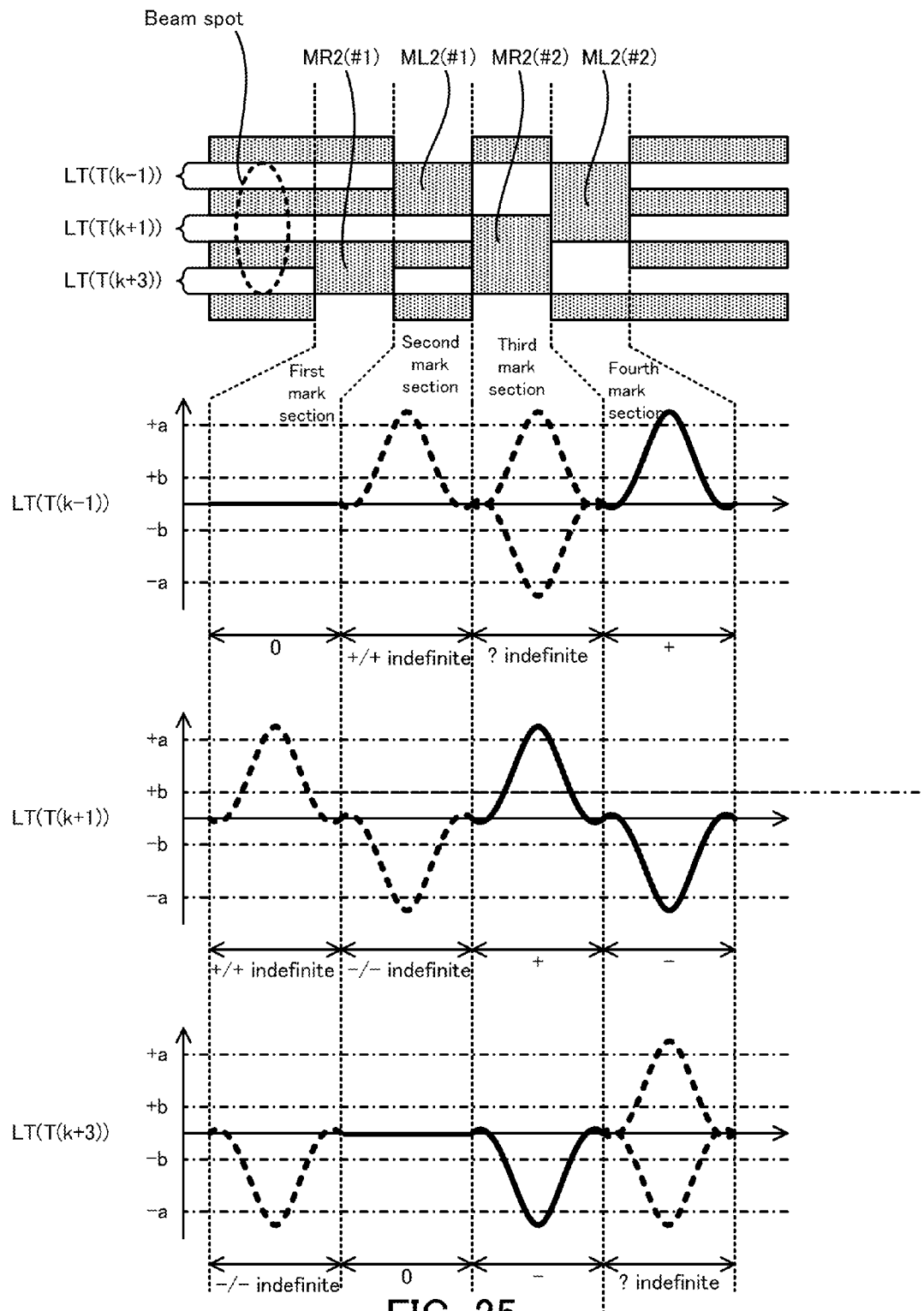
FIG. 25 is graphs illustrating the signal level of push-pull signals obtained from return light of the guide laser light which traces the land tracks on which a distinctive mark group in a third modified example is formed, in association with a configuration of the distinctive mark group in the third modified example formed on the land tracks.
Figure 26:
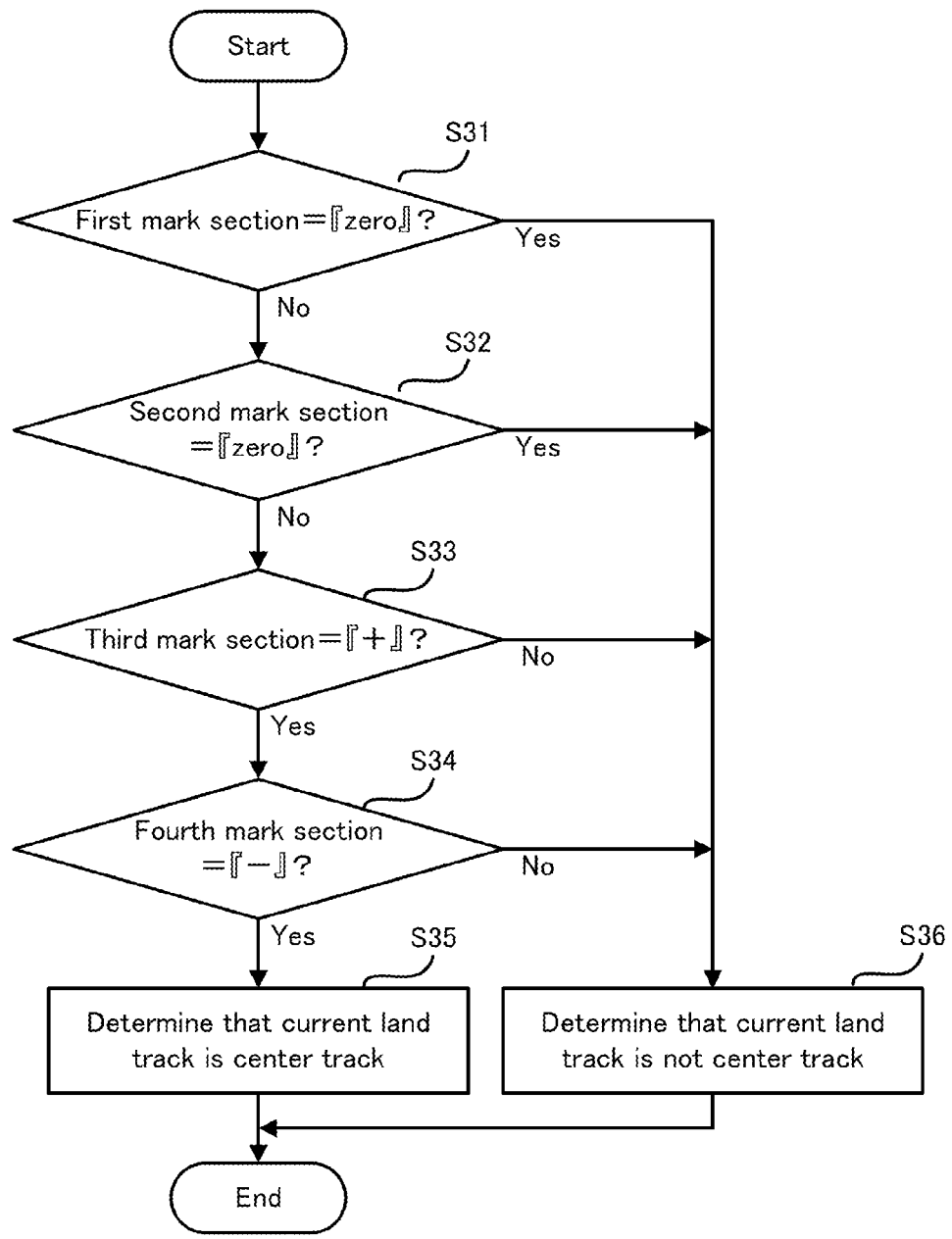
FIG. 26 is a flowchart illustrating an operation of distinguishing the center track by using the distinctive mark group in the third modified example illustrated in FIG. 25.

Next, with reference to FIG. 25 and FIG. 26, a third modified example will be explained. FIG. 25 is graphs illustrating the signal level of push-pull signals obtained from return light of the guide laser light LB1 which traces the land tracks LT on which a distinctive mark group MG2 in a third modified example is formed, in association with a configuration of the distinctive mark group MG2 in the third modified example formed on the land tracks LT. FIG. 26 is a flowchart illustrating an operation of distinguishing the center track CT by using the distinctive mark group MG2 in the third modified example illustrated in FIG. 25.

As illustrated in FIG. 25, in the third modified example, the distinctive mark group MG2 formed on the land tracks LT includes a plurality of pairs of distinctive record marks ML2 and MR2 formed in different rotational phase positions. Specifically, the distinctive mark group MG2 includes a pair of distinctive record marks ML2(#1) and MR2(#1) formed in different rotational phase positions and a pair of distinctive record marks ML#2) and MR#2) formed in different rotational phase positions. The distinctive mark group MG2 may include a pair of distinctive record marks ML2 and MR2 formed in the same rotational phase position.

Particularly in the third modified example, the pair of distinctive record marks ML2 and MR2 is formed such that two or more mark sections are determined to be the "0 section", the "+ section", or the "− section" when each land track LT is traced. In other words, the pair of distinctive record marks ML2 and MR2 is formed such that the two or more mark sections are not determined to be the "not-adjacent section", the "+ indefinite section", or the "− indefinite section" when each land track LT is traced.

Incidentally, the mark section in which the distinctive record marks ML2 and MR2 are not included in the beam spot may be regarded as a mark section which is certainly determined to be the "0 section". Moreover, the mark section in which the distinctive record marks ML2 and MR2 each having a width which is three times or more the width of the guide track TR are included in the beam spot may be treated as a mark section which is certainly determined to be the "+ section" or the "− section". On the other hand, the mark section in which the distinctive record marks ML2 and MR2 each having a width which is twice or less (or which is less than three times) the width of the guide track TR are included in the beam spot tends to be determined to be the "+ section" or the "+ indefinite section", or the "− section" or the "− indefinite section". Therefore, in order that the two or more mark sections are determined to be the "0 section", the "+ section", or the "− section", the distinctive mark group MG2 may be formed such that the two or more mark sections on each land track LT are mark sections in which the distinctive record marks ML2 and MR2 are not included in the beam spot, or mark sections in which the distinctive record marks ML2 and MR2 each having a width which is three times or more the width of the guide track TR are included in the beam spot.

Specifically, as illustrated in the first graph in FIG. 25, the signal level of the push-pull signal generated from the return light of the guide laser light LB1 which traces the land track LT with a track number of "k−1" is as follows. Firstly, in the first mark section, the distinctive record marks ML2 and MR2 are not included in the beam spot, and thus, the first mark section is determined to be the "0 section". In the second mark section, the distinctive record mark ML2(#1) having a width which is twice the width of the guide track TR is included in the beam spot, and thus, the second mark section is likely determined to be the "+ indefinite section (or the + section according to circumstances)". In the third mark section, only one portion of the distinctive record mark MR2(#2) having a width which is three times the width of the guide track TR is included in the beam spot (namely, practically, the distinctive record mark MR2(#2) having a width which is twice the width of the guide track TR is included in the beam spot), and thus, the third mark section is likely determined to be the "− indefinite section" or the "+ indefinite section". In the fourth mark section, the distinctive record mark ML2(#2) having a width which is three times the width of the guide track TR is included in the beam spot, and thus, the fourth mark section is determined to be the "+ section". Therefore, according to the example illustrated in FIG. 25, if the land track LT with a track number of "k−1" is traced, the first mark section and the fourth mark section are determined to be the "0 section" and the "+ section", respectively.

In the same manner, as illustrated in the second graph in FIG. 25, the signal level of the push-pull signal generated from the return light of the guide laser light LB1 which traces the land track LT with a track number of "k+1" is as follows. Firstly, in the first mark section, the distinctive record mark MR2(#1) having a width which is twice the width of the guide track TR is included in the beam spot, and thus, the first mark section is likely determined to be the "+ indefinite section (or the + section according to circumstances)". In the second mark section, the distinctive record mark ML2(#1) having a width which is twice the width of the guide track TR is included in the beam spot, and thus, the second mark section is likely determined to be the "− indefinite section (or the − section according to circumstances)". In the third mark section, the distinctive record mark MR2(#2) having a width which is three times the width of the guide track TR is included in the beam spot, and thus, the third mark section is determined to be the "+ section". In the fourth mark section, the distinctive record mark ML2(#2) having a width which is three times the width of the guide track TR is included in the beam spot, and thus, the fourth mark section is determined to be the "− section". Therefore, according to the example illustrated in FIG. 25, if the land track LT with a track number of "k+1" is traced, the third mark section and the fourth mark section are determined to be the "+ section" and the "− section", respectively.

In the same manner, as illustrated in the third graph in FIG. 25, the signal level of the push-pull signal generated from the return light of the guide laser light LB1 which traces the land track LT with a track number of "k+3" is as follows. Firstly, in the first mark section, the distinctive record mark MR2(#1) having a width which is twice the width of the guide track TR is included in the beam spot, and thus, the first mark section is likely determined to be the "− indefinite section (or the − section according to circumstances)". In the second mark section, the distinctive record marks ML2 and MR2 are not included in the beam spot, and thus, the second mark section is determined to be the "0 section". In the third mark section, the distinctive record mark MR2(#2) having a width which is three times the width of the guide track TR is included in the beam spot, and thus, the third mark section is determined to be the "− section". In the fourth mark section, only one portion of the distinctive record mark ML2(#2) having a width which is three times the width of the guide track TR is included in the beam spot, and thus, the fourth mark section is likely determined to be the "− indefinite section" or the "+ indefinite section". Therefore, according to the example illustrated in FIG. 25, if the land track LT with a track number of "k+3" is traced, the second mark section and the third mark section are determined to be the "0 section" and the "− section", respectively.

In this case, in order to determine whether or not the land track LT traced by the guide laser light LB1 is the center track CT, as illustrated in FIG. 26, firstly, it is determined whether or not the first mark section is the "0 section" (step S31).

As a result of the determination in the step S31, if it is determined that the first mark section is the "0 section" (the step S31: Yes), it is determined that the land track LT currently traced by the guide laser light LB1 is not the center track CT (step S36).

On the other hand, as a result of the determination in the step S31, if it is determined that the first mark section is not the "0 section" (the step S31: No), it is determined whether or not the second mark section is the "0 section" (step S32).

As a result of the determination in the step S32, if it is determined that the second mark section is the "0 section" (the step S32: Yes), it is determined that the land track LT currently traced by the guide laser light LB1 is not the center track CT (the step S36).

On the other hand, as a result of the determination in the step S32, if it is determined that the second mark section is not the "0 section" (the step S32: No), it is determined whether or not the third mark section is the "+ section" (step S33).

As a result of the determination in the step S33, if it is determined that the third mark section is not the "+ section" (the step S33: No), it is determined that the land track LT currently traced by the guide laser light LB1 is not the center track CT (the step S36).

On the other hand, as a result of the determination in the step S33, if it is determined that the third mark section is the "+ section" (the step S33: Yes), it is determined whether or not the fourth mark section is the "− section" (step S34).

As a result of the determination in the step S34, if it is determined that the fourth mark section is not the "− section" (the step S34: No), it is determined that the land track LT currently traced by the guide laser light LB1 is not the center track CT (the step S36).

On the other hand, as a result of the determination in the step S34, if it is determined that the fourth mark section is the "− section" (the step S34: Yes), it is determined that the land track LT currently traced by the guide laser light LB1 is the center track CT (step S35).

As described above, even in the third modified example, the center track CT is preferably distinguished by using the distinctive mark group MG2. In addition, even in the third modified example, it is possible to preferably receive the various benefits which can be received in the first modified example.

Moreover, in the third modified example, the two or more mark sections which are determined to be the "0 section", the "+ section", or the "− section" are ensured when each land track LT is traced. As a result, the center track CT can be distinguished by using the two or more mark sections which are determined to be the "0 section", the "+ section", or the "− section". Therefore, it is possible to relatively improve an accuracy of distinguishing the center track CT.

Incidentally, the aspect of the distinctive mark group MG2 illustrated in FIG. 25 is merely an example. Therefore, as long as the two or more mark sections which are determined to be the "0 section", the "+ section", or the "− section" are ensured when each land track LT is traced, the distinctive mark group MG2 may have an arbitrary aspect. In this case, naturally, the flowchart illustrated in FIG. 26 is preferably changed in accordance with the distinctive mark group MG2 indicating the arbitrary aspect other than the aspect illustrated in FIG. 25.

The distinctive mark group MG2 formed on the land tracks LT was explained above. However, the same applies to the distinctive mark group MG2 formed on the groove tracks GT. In other words, the distinctive mark group MG2 may be formed on the groove tracks GT such that two or more mark sections which are determined to be the "0 section", the "+ section", or the "− section" are ensured when each groove track GT is traced.

(3-4) Fourth Modified Example

Figure 27:
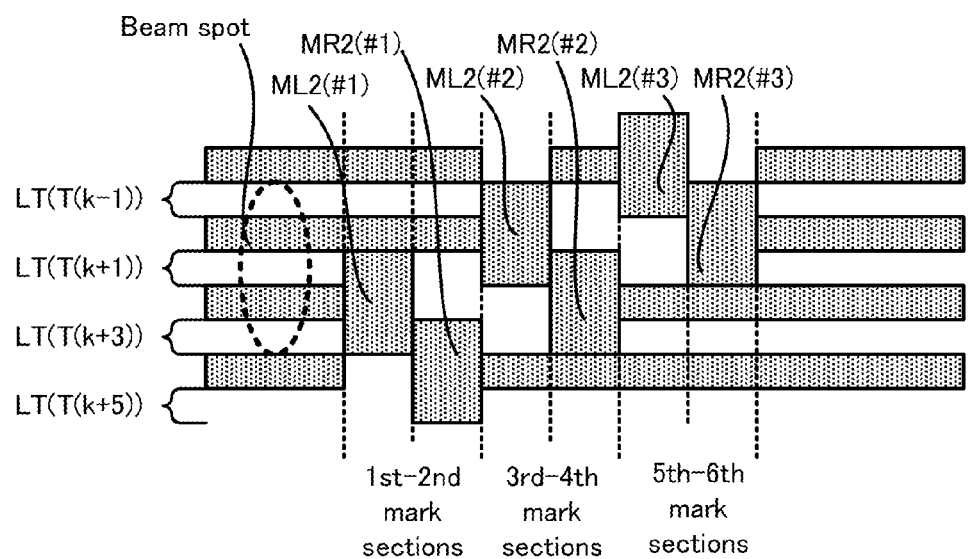
FIG. 27 is a plan view illustrating a configuration of a distinctive mark group in a fourth embodiment formed on land tracks.
Figure 28:
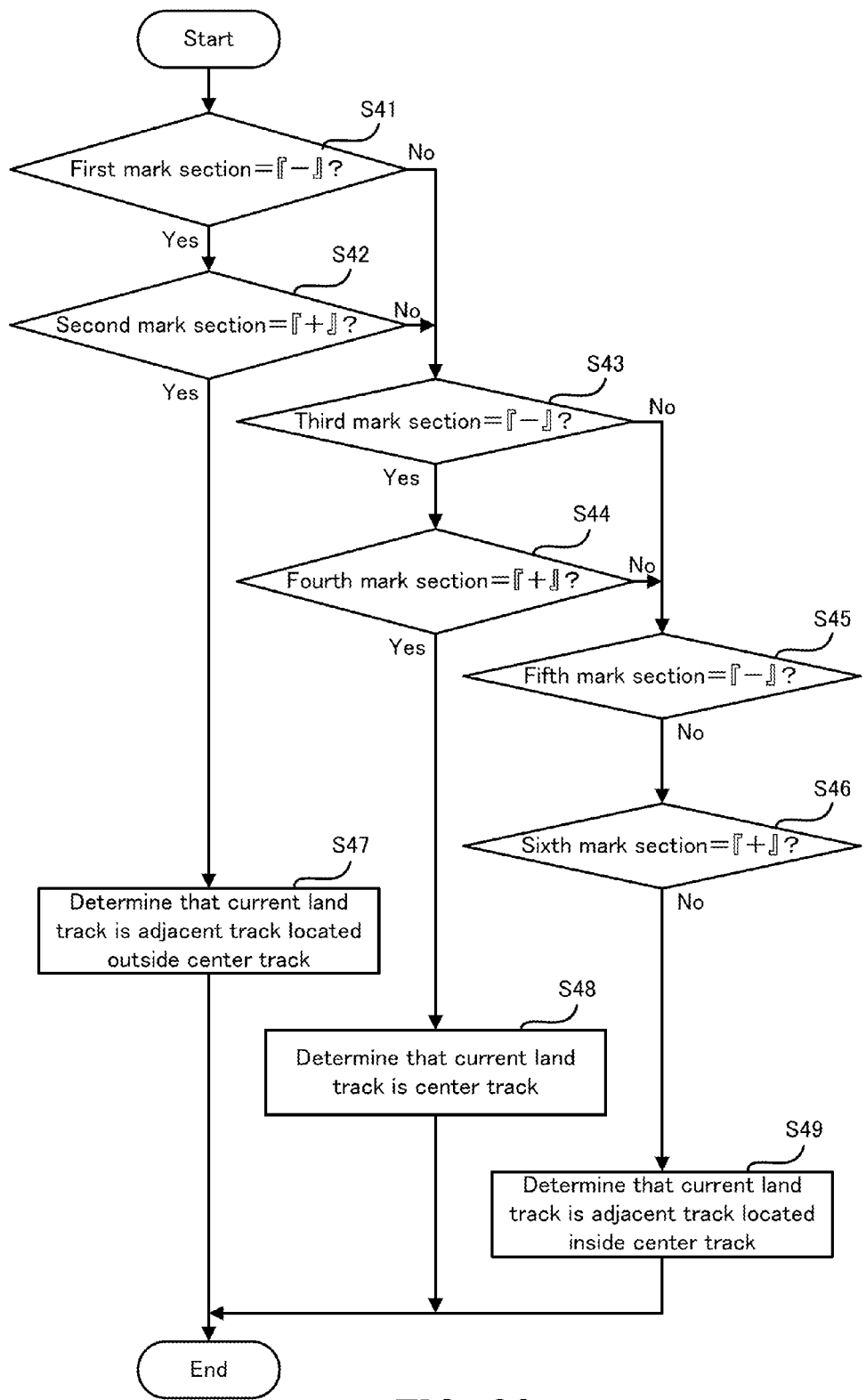
FIG. 28 is a flowchart illustrating an operation of distinguishing the center track by using the distinctive mark group in the fourth modified example illustrated in FIG. 27.

Next, with reference to FIG. 27 and FIG. 28, a fourth modified example will be explained. FIG. 27 is a plan view illustrating a configuration of a distinctive mark group MG2 in the fourth modified example formed on land tracks LT. FIG. 28 is a flowchart illustrating an operation of distinguishing the center track CT by using the distinctive mark group MG2 in the fourth modified example illustrated in FIG. 27.

As illustrated in FIG. 27, in the fourth modified example, the distinctive mark group MG2 formed in the same slot includes a pair of distinctive record marks ML2 and MR2 which are equidistantly shifted toward the left side and the right side, respectively, from the track center of each land track LT. Specifically, the distinctive mark group MG2 includes (i) a pair of record marks ML2(#1) and MR2(#1) which are equidistantly shifted toward the left side and the right side, respectively, from the track center of the land track LT with a track number of "k+3" and which are formed in different rotational phase positions (first and second mark sections), (ii) a pair of record marks ML2(#2) and MR2(#2) which are equidistantly shifted toward the left side and the right side, respectively, from the track center of the land track LT with a track number of "k+1" and which are formed in different rotational phase positions (third and fourth mark sections), and (iii) a pair of record marks ML2(#3) and MR2(#3) which are equidistantly shifted toward the left side and the right side, respectively, from the track center of the land track LT with a track number of "k−1" and which are formed in different rotational phase positions (fifth and sixth mark sections).

In the fourth modified example, the pair of record marks ML2(#1) and MR2(#1) formed in the first and second mark sections is used to determine whether or not the currently traced land track LT is a land track LT located outside the center track CT (i.e. adjacent to and outside the center track CT). Specifically, as illustrated in FIG. 28, if it is determined that the first mark section is the "− section" (step S41: Yes) and if it is determined that the second mark section is the "+ section" (step S42: Yes), it is determined that the currently traced land track LT is the land track LT located outside the center track CT (step S47).

In the same manner, in the fourth modified example, the pair of record marks ML2(#2) and MR2(#2) formed in the third and fourth mark sections is used to determine whether or not the currently traced land track LT is the center track CT. Specifically, as illustrated in FIG. 28, if it is determined that the third mark section is the "− section" (step S43: Yes) and if it is determined that the fourth mark section is the "+ section" (step S44: Yes), it is determined that the currently traced land track LT is the center track CT (step S48).

In the same manner, in the fourth modified example, the pair of record marks ML2(#3) and MR2(#3) formed in the fifth and sixth mark sections is used to determine whether or not the currently traced land track LT is a land track LT located inside the center track CT (i.e. adjacent to and inside the center track CT). Specifically, as illustrated in FIG. 28, if it is determined that the fifth mark section is the "− section" (step S45: Yes) and if it is determined that the sixth mark section is the "+ section" (step S46: Yes), it is determined that the currently traced land track LT is the land track LT located inside the center track CT (step S49).

As described above, even in the fourth modified example, the center track CT is preferably distinguished by using the distinctive mark group MG2. In addition, even in the fourth modified example, it is possible to preferably receive the various benefits which can be received in the first modified example.

Incidentally, it can be said that the distinctive mark group MG2 illustrated in FIG. 27 includes (i) a pair of record marks ML2(#1) and MR2(#3) which are equidistantly shifted toward the right side and the left side, respectively, from the track center of the center track CT, (ii) a pair of record marks ML2(#3) and MR2(#1) which are equidistantly shifted toward the left side and the right side, respectively, from the track center of the center track CT, and (iii) a pair of record marks ML2(#2) and MR2(#2) which are equidistantly shifted toward the left side and the right side, respectively, from the track center of the center track CT. Therefore, it can be said that the distinctive mark group MG2 in the fourth modified example also includes a plurality of pairs of distinctive record marks ML2 and MR2 which are equidistantly shifted toward the left side and the right side, respectively, from the track center of the center track CT.

The invention may be embodied in other specific forms without departing from the spirit or essential characteristics thereof.

The present example is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium comprising:
  a guide layer on which a guide track or guide tracks for tracking are formed; and
  a plurality of recording layers laminated on the guide layer,
  an information mark group being formed in the guide layer, the information mark group being formed on each of a plurality of guide tracks which are adjacent to one another,
  an distinctive mark group being formed in the guide layer, the distinctive mark group distinguishing a center track which is a guide track located near a center out of the plurality of guide tracks on each of which the information mark group is formed, the distinctive mark group including a pair of distinctive record marks which are shifted by a predetermined distance toward a right side and a left side, respectively, from a track center of the center track, a width of each distinctive record mark is twice or more a width of the guide track.

2. The recording medium according to claim 1, wherein the distinctive mark group includes at least one of (i) the pair of distinctive record marks formed in a same rotational phase position and (ii) the pair of distinctive record marks formed in different rotational phase positions.

3. The recording medium according to claim 2, wherein the pair of distinctive record marks formed in the same rotational phase position is formed (i) such that a signal level of a push-pull signal obtained by irradiating the pair of distinctive record marks with guide laser light, whose spot center matches the center track, has an absolute value which is less than or equal to a first threshold and (ii) such that a signal level of a push-pull signal obtained by irradiating the pair of distinctive record marks with the guide laser light, whose spot center matches another guide track other than the center track out of the plurality of guide tracks on each of which the information mark group is formed, has an absolute value which is greater than the first threshold.

4. The recording medium according to claim 2, wherein the pair of distinctive record marks formed in the different rotational phase positions is formed such that the signal level of the push-pull signal obtained by irradiating the pair of distinctive record marks with the guide laser light, whose spot center matches the center track has an absolute value which is greater than a first threshold.

5. The recording medium according to claim 1, wherein the distinctive mark group is formed such that there are (i) two or more first areas, (ii) two or more second areas, or (iii) one or more first areas and one or more second areas, in each of the plurality of guide tracks on which the distinctive mark group is formed,
the first area is an area in which a signal level of a push-pull signal obtained by irradiating guide laser light, whose spot center matches each of the guide tracks, has an absolute value which is greater than a first threshold,
the second area is an area in which the signal level of the push-pull signal obtained by irradiating the guide laser light, whose spot center matches each of the guide tracks, has an absolute value which is less than or equal to a second threshold which is less than the first threshold.

6. The recording medium according to claim 1, wherein the width of each distinctive record mark is half or more a width of a beam spot formed on the guide layer by guide laser light irradiated on the guide layer.

7. The recording medium according to claim 1, wherein
the guide tracks include groove tracks and land tracks alternately formed,
the distinctive mark group includes, as a distinctive mark group for distinguishing a groove center track located near a center out of a plurality of groove tracks on each of which the information mark group is formed, a pair of groove distinctive record marks which are shifted by a predetermined distance toward a right side and a left side, respectively, from a track center of the groove center track, a width of each groove distinctive record mark is twice or more a width of the groove track, and
the distinctive mark group includes, as a distinctive mark group for distinguishing a land center track located near a center out of a plurality of land tracks on each of which the information mark group is formed, a pair of land distinctive record marks which are shifted by a predetermined distance toward a right side and a left side, respectively, from a track center of the land center track, a width of each land distinctive record mark is twice or more a width of the land track.

8. The recording medium according to claim 1, wherein the information mark group is formed in the guide layer such that the same information mark group is formed in a same rotational phase position of each of at least two guide tracks out of a plurality of guide tracks included in a beam spot formed on the guide layer by guide laser light irradiated on the guide layer, the same information mark group including a pair of information record marks which are shifted by a predetermined distance toward a right side and a left side, respectively, from a track center of the each guide track.

9. The recording medium according to claim 8, wherein the same information mark group is formed in the same rotational phase position of each of the plurality of guide tracks.

10. The recording medium according to claim 8, wherein
the guide tracks include groove tracks and land tracks alternately formed,
the information mark group is formed in a same rotational phase position of each of a plurality of groove tracks which are included in the beam spot, the information mark group including a pair of information record marks which are shifted by a predetermined distance toward a right side and a left side, respectively, from a track center of the each groove track, and
the information mark group is formed in a same rotational phase position of each of a plurality of land tracks which are included in the beam spot, the information mark group including a pair of information record marks which are shifted by a predetermined distance toward a right side and a left side, respectively, from a track center of the each land track.

* * * * *